(12) United States Patent
Hinman et al.

(10) Patent No.: US 12,441,464 B1
(45) Date of Patent: Oct. 14, 2025

(54) ROTOR SYSTEM FOR ELECTRICALLY POWERED ROTORCRAFT

(71) Applicant: SiFly Aviation, Inc., Monte Sereno, CA (US)

(72) Inventors: Brian L. Hinman, Carmel Valley, CA (US); Muhammad Mubeen Javaid, Punjab (PK)

(73) Assignee: SiFly Aviation, Inc., Monte Sereno, CA (US)

( * ) Notice: Subject to any disclaimer, the term of this patent is extended or adjusted under 35 U.S.C. 154(b) by 0 days.

(21) Appl. No.: 18/537,397

(22) Filed: Dec. 12, 2023

Related U.S. Application Data

(63) Continuation-in-part of application No. 18/220,720, filed on Jul. 11, 2023, now Pat. No. 12,049,305, which is a continuation-in-part of application No. 18/306,108, filed on Apr. 24, 2023, now Pat. No. 11,964,771, which is a continuation-in-part of application No. 17/015,558, filed on Sep. 9, 2020, now Pat. No. 11,634,235.

(60) Provisional application No. 63/359,944, filed on Jul. 11, 2022, provisional application No. 62/897,688, filed on Sep. 9, 2019.

(51) Int. Cl.
*B64C 27/57* (2006.01)
*B64C 11/30* (2006.01)
*B64C 27/59* (2006.01)
*B64C 27/80* (2006.01)

(52) U.S. Cl.
CPC ............ *B64C 27/57* (2013.01); *B64C 11/308* (2013.01); *B64C 27/59* (2013.01); *B64C 27/80* (2013.01)

(58) Field of Classification Search
CPC ..... B64C 11/34; B64C 11/343; B64C 11/306; B64C 11/308; B64C 27/10; B64C 27/57
See application file for complete search history.

(56) References Cited

U.S. PATENT DOCUMENTS

| | | | |
|---|---|---|---|
| 2,350,962 | A | 6/1944 | Hayes |
| 2,707,601 | A | 5/1955 | Magill |
| 7,677,492 | B1 | 3/2010 | Carter et al. |
| 8,894,001 | B2 | 11/2014 | Calverley |
| 9,914,535 | B2 | 3/2018 | Paulos |
| 11,046,404 | B2 | 6/2021 | Lin et al. |

(Continued)

FOREIGN PATENT DOCUMENTS

JP 2012-11990 A 1/2012

OTHER PUBLICATIONS

Wu, "Design and Development of Variable Pitch Quadcopter for Long Endurance Flight", Oklahoma State University, May 2018, 154 pages.

(Continued)

*Primary Examiner* — Timothy D Collins
*Assistant Examiner* — Justin Michael Heston
(74) *Attorney, Agent, or Firm* — Sunstein LLP

(57) ABSTRACT

A rotor system for electrically powered rotorcraft is described, providing the benefits of fast thrust response, depending on rotor inertia. The rotor system includes a rotor hub and two or more rotor blades, and an electric motor driving the rotor hub. The rotor hub includes a mechanism which adapts the collective pitch of the rotor blades in response to the torque applied by the electric motor. When there is significant torque over a threshold, the rotor hub biases the blades to a higher collective pitch, which supports greater thrust, thus avoiding the lag in rotor thrust that would occur through RPM control.

20 Claims, 34 Drawing Sheets

(56) References Cited

U.S. PATENT DOCUMENTS

| | | |
|---|---|---|
| 11,174,016 B2 | 11/2021 | Carter et al. |
| 11,634,235 B1 | 4/2023 | Hinman et al. |
| 2005/0236518 A1 | 10/2005 | Scott |
| 2006/0231677 A1 | 10/2006 | Zimet et al. |
| 2007/0290563 A1 | 12/2007 | Zhao et al. |
| 2014/0097290 A1 | 4/2014 | Leng |
| 2014/0131510 A1 | 5/2014 | Wang et al. |
| 2015/0028152 A1 | 1/2015 | Eller et al. |
| 2017/0166302 A1 | 6/2017 | Shiosaki |
| 2017/0210480 A1 | 7/2017 | Lauder et al. |
| 2017/0283029 A1 | 10/2017 | Weiner |
| 2017/0341733 A1 | 11/2017 | D'Anna et al. |
| 2018/0029694 A1 | 2/2018 | Vander Lind et al. |
| 2018/0086443 A1 | 3/2018 | Bourne et al. |
| 2018/0257761 A1 | 9/2018 | Oldroyd et al. |
| 2018/0297711 A1 | 10/2018 | Oldroyd et al. |
| 2018/0346136 A1 | 12/2018 | Arkus et al. |
| 2019/0023388 A1 | 1/2019 | Roberts et al. |
| 2019/0031361 A1 | 1/2019 | McCullough et al. |
| 2019/0084684 A1 | 3/2019 | Eller |
| 2019/0210717 A1 | 7/2019 | Lauder |
| 2019/0263515 A1 | 8/2019 | Karem et al. |
| 2020/0231275 A1 | 7/2020 | Groman |
| 2021/0101675 A1 | 4/2021 | Tsutsumi et al. |
| 2021/0276706 A1 | 9/2021 | Heironimus et al. |
| 2021/0291971 A1 | 9/2021 | Bernard |
| 2022/0011782 A1 | 1/2022 | Mikic et al. |
| 2022/0267016 A1 | 8/2022 | Lanzendoerfer et al. |

OTHER PUBLICATIONS

Harrison et al., "The Cierva Autodynamic Rotor", National Aeronautics and Space Administration, Mar. 2015, 66 pages.

Uber Elevate, "Fast Forwarding to a Future of On-Demand Urban Air Transportation", Oct. 27, 2016, 98 pages.

European Union Aviation Safety Agency, "Means of Compliance with the Special Condition VTOL", Issue 2, May 12, 2021, 89 pages.

Paulos, "Rotorcraft Blade Pitch Control Through Torque Modulation", University of Pennsylvania Scholarly Commons, 2017, 149 pages.

Hinman, U.S. Appl. No. 17/893,540 titled "Electric Rotorcraft Cyclic Control System", filed Aug. 23, 2022, 55 pages.

Hinman et al., U.S. Appl. No. 63/359,944, titled "Rotor System for Electrically Powered Rotorcraft", filed Jul. 11, 2022, 35 pages.

Johnson, W. and Silva, C., "Observations from Exploration of VTOL Urban Air Mobility Designs" Presented at the 7th Asian/Australian Rotorcraft Forum, Jeju Island, Korea, Oct. 30-Nov. 1, 2018, 15 pages.

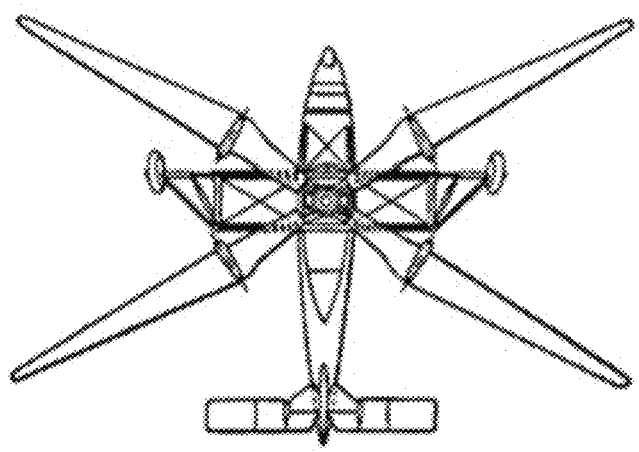
(Prior Art)
FIG. 21A
(Prior Art)
FIG. 21B
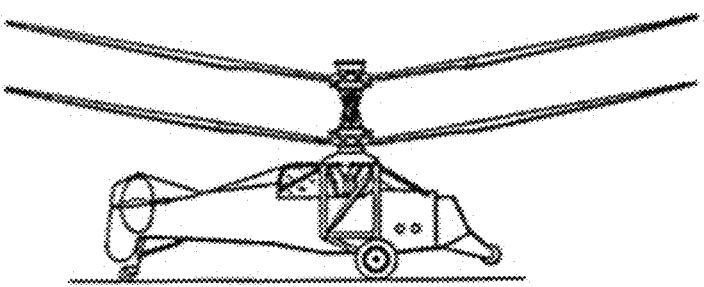
(Prior Art)
FIG. 21C

| Contra-rotating Electric Helicopter | | | | | | | |
|---|---|---|---|---|---|---|---|
| Aircraft Without Blades and Battery Module | 5.10 | lbs | 1.113 | kg | 29% | | |
| Blades | 2.65 | lbs | 1.200 | kg | 32% | | |
| Battery Module | 3.28 | lbs | 1.489 | kg | 39% | | |
| Total | 11.03 | lbs | 3.802 | kg | 37.26 | N | |
| Air Density | 1.225 | kg/m^3 | | | | | |
| | | | | | | | |
| Disk Loading | 0.140 | lbs/ft^2 | | | | | |
| Number of Blades | 4 | | | | | | |
| Blade Length | 1.476 | m | | | | | |
| Blade Chord | 0.162 | m | | | | | |
| Blade Length/Chord | 9.11 | | | | | | |
| Solidity | 13.1% | | | | | | |
| Mechanical Pitch Angle at Blade Tip | 11.0 | degrees | | | | | |
| delta, average drag coefficient | 0.0210 | | | | | | |
| Cl(ave), average lift coefficient | 0.70 | | | | | | |
| Ct/Solidity | 0.117 | | 0.120 is Max | 0.075 | Typical | | |
| Ct = Cl(ave) * Solidity / 6 | 0.01525 | | | | | | |
| Cp, Cq = (Ct^1.5/sqrt(2)) + (solidity*delta/8) | 0.00167 | | | | | | |
| Llambda-H, Induced Inflow Ratio | 0.06175 | | | | | | |
| Inflow Angle at Tip | 3.54 | degrees | | | | | |
| Inflow Angle at 75% Chord | 4.71 | degrees | | | | | |
| Induced Velocity | 1.44 | m/S | 3.2 | mph | | | |
| Tip Speed | 23.35 | m/S | 52.2 | mph | | | |
| Rotor rate (Upper and Lower Contra) | 15.30 | rad/S | 146.1 | rpm | 2.43 | rps | |
| Motor rate | 30.59 | rad/S | 292.1 | rpm | 4.87 | rps | |
| Low Speed, Mu = 0.15 | 3.50 | m/S | 7.8 | mph | | | |
| Cruise Speed, Mu = 0.23 | 5.37 | m/S | 12.0 | mph | | | |
| High Speed, Mu = 0.30 | 7.00 | m/S | 15.7 | mph | | | |
| | | | | | | | |
| Rotor Area | 78.78 | ft^2 | 7.32 | m^2 | | | |
| Rotor Radius | 5.0 | ft | 1.53 | m | | | |
| Rotor Diameter | 10.0 | ft | 3.05 | m | | | |
| Rotor Merit Factor | 80% | | | | | | |
| | | | | | | | |
| Idealized Hover Power | 53.7 | W | | | | | |
| Realized Hover Power | 67.5 | W | | | | | |
| Realized Cruise Power | 47.3 | W | | | | | |
| | | | | | | | |
| Batt. Energy Density | 265 | Wh/kg | | | | | |
| Cell Fraction / Total | 90% | | | | | | |
| Battery Energy | 355.1 | Whr | | | | | |
| Motor Efficiency, Including Gear Reduction | 52% | | | | | | |
| Controller Efficiency | 95% | | | | | | |
| Battery Hover Power | 136.7 | W | | | | | |
| Battery Cruise Power | 95.7 | W | | | | | |
| | | | | | | | |
| Hover Time | 155.8 | minutes | 2.60 | hours | | | |
| Cruise Time | 222.6 | minutes | 3.71 | hours | | | |

FIG. 28

ROTOR SYSTEM FOR ELECTRICALLY POWERED ROTORCRAFT

This application is a continuation in part of U.S. application Ser. No. 18/220,720, filed on Jul. 11, 2023, ("my '720 application") which claims the benefit of U.S. application Ser. No. 18/306,108 filed on Apr. 24, 2023, which claims the benefit of U.S. application Ser. No. 17/015,558 filed on Sep. 9, 2020, Issued on Apr. 25, 2023 as U.S. Pat. No. 11,634,235, which claims the benefit of U.S. Provisional Application No. 62/897,688, filed Sep. 9, 2019, and also claims the benefit of U.S. Provisional Application No. 63/359,944, filed Jul. 11, 2022. This application is also a continuation in part of U.S. application Ser. No. 17/983,111, filed on Nov. 8, 2022, ("my '111 application") which claims the benefit of U.S. Provisional Application 63/276,891, filed on Nov. 8, 2021. Each of my '720 application and my '111 application, along with each one of its corresponding parent applications, is hereby incorporated herein by reference in its entirety.

TECHNICAL FIELD

The present invention relates to aircraft design, and more specifically to the design of a rotor system supporting autorotative descent and rapid thrust response, having minimal complexity and high reliability.

BACKGROUND ART

Rotorcraft became practical almost one hundred years ago. The first rotorcraft were autogyros, a predecessor to the modern helicopter. The autogyro is characterized by a free-spinning rotor that turns because of the passage of air through the rotor from below. The aerodynamic reaction of the rotor gives lift to the vehicle, sustaining it in the air. A separate propeller provides forward thrust, and can be placed in a puller configuration, with the engine and propeller at the front of the fuselage, or in a pusher configuration, with the engine and propeller at the rear of the fuselage. Juan de la Cierva of Spain is credited as the inventor of the autogyro, with his first successful prototype flying in January 1923. He was motivated to develop the autogyro following an airplane crash, resulting from a stall condition. The autogyro allows very slow forward flight, an inherent safety feature. By 1926, the term "autorotation" was first used, a description of the autogyro's main rotor turning without being directly powered. De la Cierva described autorotation as, "the process of producing lift with freely-rotating aerofoils by means of the aerodynamic forces resulting from an upward flow of air."

By the late 1930s, rotorcraft research and development had shifted from enhancements of autogyro designs, to the perfection of the helicopter. The key enabling technology for the helicopter was the swashplate, an innovation first proposed by Boris Yur'iev in Russia in 1911. In layman's terms, the swashplate resembles a "Lazy Susan," with the pitch of the rotor blades articulated by linkages that ride along the rotating portion of the swashplate. The swashplate allows for both cyclic (tilt) and collective (thrust) control of the rotor, typically with three push rods that articulate the lower stationary portion of the swashplate. When all three push rods are raised and lowered in unison, a change of collective occurs. When the rods move differentially, the swashplate tilts, causing the rotor blades to vary pitch as a function of angular position, which is cyclic.

Igor Sikorsky is credited with the development of the modern helicopter, consisting of a single main rotor having a swashplate, and a tail rotor to counter-act the torque resulting from the drag force of the main rotor acting upon the fuselage. Because the helicopter can take off and land from a stationary position, and hover indefinitely under full control, it was obvious that the helicopter was superior to the autogyro. Since the early years of helicopter research, autorotation was deemed a necessary feature, as the autogyro had demonstrated the safety benefits. In 1936, three years before Sikorsky flew his VS-300, Heinrich Focke and Gert Achgelis were the first to demonstrate helicopter autorotation, with the introduction of their Fa-61 tandem rotor helicopter. All helicopters developed following this early work have been capable of autorotative descent.

Since the earliest days of helicopter development, it has been known that the large inertia of the rotor system would not allow the engine RPM to be a means of adjusting the thrust. Collective is the sole means of adjusting the thrust, while the engine is typically governed to maintain a constant RPM throughout all phases of flight. The large rotor inertia becomes a desirable characteristic of the helicopter during an emergency loss of power, as it provides sufficient time for the pilot to respond to the situation, lowering the collective control, and thus entering autorotative descent before there is a catastrophic loss of rotor speed.

For a helicopter to emulate the graceful decent of the autogyro, several conditions must be met:

1) The swept rotor area needs to be sufficiently large, ensuring a safe rate of descent to the ground. In layman's terms, the rotor acts much like a parachute, and must have a sufficient area for a given weight.
2) The helicopter should have forward airspeed at the time when driving power is lost, allowing enough air to flow in a reverse direction through the rotor disk to ensure a safe rate of descent. Otherwise, the helicopter needs sufficient altitude for the pilot to push the cyclic forward when power is lost, a maneuver required to gain airspeed to sustain autorotation.
3) When power is lost, the rotor blades must quickly be brought to an incidence angle near zero degrees. Within a matter of seconds, a helicopter previously operating under power, with a blade incidence in the range of 5 to 15 degrees, will lose enough rotor speed to become irrecoverable, dropping uncontrollably to the earth. By reducing the rotor blade pitch, the drag forces of the rotor are reduced to an extent that they balance with the driving forces of reverse airflow brought about through autorotation.

While the detailed physics of autorotation is quite complex, a simple explanation follows from a consideration of how the portions of the rotor disk act during autorotative descent. In FIG. 1, we consider the three annular regions of the rotor disk. In each region, the speed of movement in rotation, relative to the air flowing through the disk, creates a different dynamic. In the innermost portion of the disk, Region A, near the rotor hub, the blade is moving slowly along the circular path, and the resulting airflow over the blade exceeds the stall angle for the airfoil. Region A is described as the "stalled region," and the drag force has the effect of reducing the rate of blade rotation. In the middle region of the disk, Region B, described as the "driving region," the aerodynamic force vector is inclined slightly forward with respect to the axis of rotation. This has the effect of providing lift while also increasing the rate of blade rotation. The outermost annular region of the disk, Region C, is described as the "driven region." With the increased rotational velocity, the aerodynamic force vector now acts behind the axis of rotation. The vertical component contributes to lift, at the expense of the horizontal drag component, which slows the blade rotation. Allowing nature to take its course, the rotor may achieve an equilibrium rate of rotation and descent such that the driven and drag forces are equal. Having a blade pitch near zero degrees generally ensures a large enough driving region to sustain autorotation.

The rate of descent in autorotation varies depending upon a number of factors, including forward airspeed and blade pitch. An important consideration is the design factor called "disk loading." Disk loading refers to the weight of the rotorcraft relative to the swept area of the rotor(s). Talbot and Schroers at NASA Ames Research Center wrote a paper in 1978 describing a simple calculation for the minimum rate of autorotative descent for single-rotor helicopters. As they described, the rate of descent grows in proportion to a ratio of the minimum power coefficient in forward flight, divided by the coefficient of thrust. For typical helicopters, the minimum power to sustain level forward flight is about 60% of the power necessary to hover out of ground effect. Rotor efficiency, called the "merit factor," has an inverse first order relationship with descent rate. For a modern helicopter, a merit factor of 75% is typical. With these rules of thumb, one can substitute and manipulate the Talbot and Schroers descent equation to find:

$$V_{min\_descent} = 0.336 \ m/s * \sqrt{D.L. \ N/m^2} + 2.30 \ m/s \quad (1.)$$

Disk loading, as indicated, is entered in SI units. For historical reasons, rotorcraft engineers continue to discuss disk loading in English units of pounds and feet. The form of the equation then becomes:

$$V_{min\_descent} = 2.330 \ m/s * \sqrt{D.L. \ lbs./ft^2} + 2.30 \ m/s \quad (2.)$$

While a subjective assessment of individual helicopter pilots, an autorotative descent rate greater than 9 m/s is considered unsafe, as it does not allow sufficient margin for pilot error in the final stages of the autorotation process. Substituting into equation (2.), we find a maximum disk loading of 8.3 lbs/ft$^2$ for a helicopter capable of safe autorotation. Correlating this estimate with industry practice, modern turbine-powered helicopters have a disk loading in the range of 3 lbs/ft$^2$ to 8 lbs/ft$^2$.

Throughout the twentieth century, rotorcrafts were powered by internal combustion engines. Early helicopters used Otto-cycle piston engines. The original Sikorsky helicopter, for example, was powered by a 75 hp piston engine. By 1948, the turboshaft engine was introduced, offering much higher power density than piston engines. Subsequently, most large helicopters, capable of carrying four or more people, employ turboshaft engines. Up to the present day, small helicopters continue to be powered by piston engines, reflecting the lower acquisition and maintenance cost of piston engines relative to turboshaft engines.

Electrically-powered ground vehicles have finally begun to displace fossil-fuel-powered ground vehicles. While the first electric automobile was demonstrated in 1881, four years before Karl Benz built the first practical automobile powered by an internal-combustion engine, the limited energy capacity of early batteries, combined with the inconvenience of charging, rendered electric automobiles impractical for widespread use. Although several automotive companies have attempted to revive the electric car over the century that followed, it was Tesla Motors, combining thousands of high-capacity consumer electronics Lithium-Ion batteries that brought the electric automobile into widespread use. With a range of more than 200 miles, and a recharge time of less than one hour, Tesla demonstrated the key requirements for market viability. Current circumstances, including rising oil prices, unfavorable climate change, political instability, and government incentives, will continue to accelerate the adoption of electric vehicles. Certainly by 2050, most ground vehicles sold worldwide will be electrically powered.

The adoption of electric power for airborne vehicles has been much slower than for ground vehicles. In October 1973, the world's first electrically powered airplane, the Austrian Militky MB-E1, was flown. Powered by Ni—Cd batteries available at that time, the aircraft could fly for just 12 minutes. Many years passed with minimal advancement of crewed electric aircraft. Electrically powered uncrewed quad-copter drones emerged in 1999, as a platform for a broad range of military, commercial, and consumer applications. In 2013, DJI introduced their first quad-copter drone, which subsequently became a mass-market success. While flight times of quad-copter drones are typically 20 minutes or less, there are numerous use cases, typically including video and still image capture.

Quad-copter drones differ from crewed helicopters in their basic means of control. Because the rotors have modest inertial energy relative to the driving power, the thrust response to changes in electric motor power is rapid, allowing RPM control of low-cost brushless DC (BLDC) motors. With the elimination of complex mechanisms for blade pitch adjustment, quad-copter drones have become extremely low-cost aircraft, often sold for less than $100 as a consumer device.

Renewed interest in crewed electric aircraft was sparked by the Uber Elevate white paper released in October 2016 entitled, "Fast-Forwarding to a Future of On-Demand Urban Air Transportation." The white paper makes the case for short-range, electrically powered, vertical-take-off-and-landing aircraft, capable of carrying passengers to and from urban centers to outlying areas, to reduce travel time and avoid congested freeways. Because the range and flight time for "urban air mobility" are short, the white paper argues that soon-to-be-available battery technology can meet the requirements. In the seven years since the Uber Elevate white paper, worldwide development of crewed electrically powered vertical take-off-and-landing aircraft (eVTOLs) has flourished, with more than 700 projects currently under development. Most of these eVTOL projects aspire to address the vision of "urban air mobility" first promoted by Uber.

Except for a small number of eVTOL projects resembling electric helicopters, autorotation is not a safety feature promoted by the eVTOL developers. Many of the eVTOLs are designed with very high disk loading, as they have optimized for forward speed at the expense of hovering efficiency. Such eVTOLs would be incapable of autorotation, per the physics described above. A few multi-rotor eVTOL designs have a disk loading of less than 81 bs/ft^2, which would allow auto-rotation if other design features were included. One of the recently introduced designs is said to support autorotation, while the other developers are either silent on the topic, or the developers specifically say that they will not support autorotation. In January 2019, Bell Helicopters, renown for traditional helicopters, announced an eVTOL with six ducted fans, called the Nexus. Shortly after the introduction, executives from Bell were asked whether the Nexus would support autorotation, to which the reply was, "We do not envision the Nexus landing under anything other than powered flight." A Bell executive elaborated by saying, "Power failure is prevented by a combination of redundancy and reliable systems. But [power failure] won't happen, because we're designing in appropriate redundancy and reliability."

Unlike quad-copter drones, many of the crewed eVTOL designs have rotor systems supporting both RPM control and collective control. Very few include cyclic control however, as a plurality of rotors typical of eVTOLs obviates the need. With rotor inertial energy becoming large relative to the driving power, the addition of collective control improves the thrust response time. Moreover, for tilt-rotor electric aircraft, adjusting collective pitch provides a means to optimize the propulsive efficiency as a function of airspeed. During hovering and low-speed forward flight, blade pitch is kept shallow, while at high-speed forward flight, blade pitch becomes steep.

To date, not a single eVTOL developer, of the more than 700 projects under development, has achieved certification under FAA or EASA rules. Under the EASA regulations published in May 2021, entitled "Means of Compliance with the Special Condition VTOL," the document instructs the reader, when referencing prior rotorcraft regulations, to substitute the word "Autorotation," with "Controlled Emergency Landing." As the general trend in updates to aviation regulations, the goal with the new language is to move from a prescriptive design requirement, of specifically requiring autorotation capability, to a performance-based airworthiness standard, requiring a means of controlled emergency landing. Certainly, it is possible to achieve the performance-based standard without autorotation, though it requires much more stored energy to achieve a controlled emergency landing, as Bell has proposed, through powered flight. If an emergency occurs at a high altitude, for example through a battery failure, the remaining stored energy requirement will become large to the extent that the eVTOL does not glide as an airplane, or autorotation as a helicopter.

The arguments cited by eVTOL developers opposed to the future use of autorotation are three-fold:

(1.) Large rotors require more landing area, limiting aircraft use in urban settings,
(2.) Aircraft in "edgewise flight" have too much drag to operate at high speeds,
(3.) Certification can be achieved without autorotation, so adding it will just slow the process.

The inventor respectfully disagrees with these arguments. Because noise scales as the sixth power of rotor tip speed, and rotor tip speed scales in inverse proportion to the rotor diameter, it is critically important for a rotorcraft intended for urban and suburban operation to have large diameter rotors, else the noise will limit the acceptance by those living and working in proximity to vertiports. Regarding aerodynamic drag, while it is generally true that large rotors have substantial drag in forward flight, much of that can be eliminated by compounding the aircraft with a propeller for horizontal propulsion, allowing the rotor(s) to remain in a plane that is generally parallel with the direction of forward flight. Sikorsky has successfully demonstrated this concept with a series of compound coaxial helicopters, including the SB-1 Defiant Raider jointly developed with Boeing, capable of cruising at 250 knots. Lastly, regarding the effort to achieve certification, one can argue that the ability to autorotate would simplify the certification cycle, as it does not require powered flight and hence battery power, rather using regenerative braking to control the rotors throughout descent.

While autorotation is a safety feature associated with crewed rotorcraft, it can also be applied to uncrewed rotorcraft. Such rotorcraft, commonly referred to as "drones," have widespread use in government, commercial and consumer applications. As drones begin to be flown over populated areas, under autonomous control, the risk to human life and property on the ground will receive increasing consideration. Drones, unlike type-certified aircraft that carry humans, are designed and manufactured with little regulatory oversight. Consequently, drones will have much lower reliability than certified aircraft. Combining the factors of many more drones in the air than type-certified aircraft and inherently lower drone reliability, autorotation may become a mandatory safety feature for multi-rotor drones in the future.

Juan de la Cierva and his contemporaries developed the foundational rotorcraft rotor hub technologies during the 1920s and 1930s. While initially targeting the perfection of the autogyro, many of the concepts carried through to helicopters and even to some electrically-powered eVTOLs under development today. Most notably, de la Cierva developed the articulated rotor, with flapping and lead-lag hinges. What de la Cierva called "Delta-3" hinge coupling, whereby the upward flapping of the blade results in a reduction of blade incidence angle, has become a standard feature in most helicopters, as it effectively compensates for the dissymmetry of lift during forward flight. Delta-3 coupling also reduces hub stress which could otherwise lead to mechanical failure. De la Cierva was firmly of the belief that the pilot should not require controls to manually adjust the blade incidence angle, rather having mechanisms in the rotor hub to automatically adjust the blade incidence angle with changing flight conditions. This philosophy gave rise to various combinations of hinge coupling mechanisms between feathering, lead-lag and flapping axes. De la Cierva also patented designs that varied the blade incidence angle as a function of rotor torque.

While the autogyro had a short-lived history for commercial and military use, it has continued to survive in General Aviation, often in the form of ultralight aircraft. Notably, Igor Bensen, a Russian immigrant to the United States, introduced the lightweight "gyrocopter" in 1955. He subsequently began production of the Bensen B-8M, which became quite popular with sport pilot enthusiasts. Similar designs to the Bensen gyrocopter remain in production to the current time.

In 1994, Jay Carter, a mechanical engineer with aircraft and wind generator design experience, took an interest in advancing the state-of-the-art in gyrocopter design. His foundational concept was to reduce the rotor speed and blade incidence with forward flight, transitioning the lift from the rotor to fixed wings mounted to the fuselage. He called his new architecture a "Slowed Rotor Compound" (SRC) aircraft, and he applied for several patents to protect his inventions. One of Carter's core patents was U.S. Pat. No. 7,677,492 B1, "Automatic Mechanical Control of Rotor Blade Collective Pitch," described in FIGS. 2 and 3. Through a governor mechanism relying upon centripetal force, the rotor blade incidence is increased in a linear relationship with the rotor speed. At take-off, operating with engine power applied to the rotor, Carter provides an example of a 600 rpm rotor speed giving rise to a 12-degree blade incidence. Once the aircraft reaches its cruising speed, Carter describes the rotor speed dropping to just 180 rpm, and the blade incidence being reduced to just 3 degrees. As Jay Carter discussed in an interview in 2014, a critical innovation was to adjust the rotor mast angle throughout flight, else the rotor would not naturally reduce in speed while in high-speed autorotative flight. With the goal of operating the aircraft at a forward velocity exceeding the rotor tip speed (Mu>1.0), the rotor must be designed to deal with a full stall condition on the retreating side of the rotor disk. One of Carter's solutions was adding rotor tip weights, which increases the rotor inertia, while maintaining the blades in a rigid state throughout flight.

Jay Carter publicly discussed the application of his SRC concept to electrically-powered aircraft through a partnership with Mooney, revealing his initial eVTOL concept at the Uber Elevate Summit in April 2017. While the Mooney relationship proved short-lived, Carter presented a refined design, with two propellers on either side of a fixed wing, at the Vertical Flight Society Forum in May 2018. He subsequently reached an agreement to license the SRC technology, including the application to eVTOLs, to a newly formed company, Jaunt Air Mobility LLC. Carter and Jaunt engineers have continued to seek US patent protection for their ongoing innovations of eVTOL SRC technology. FIG. 4 is an illustration from U.S. Pat. No. 11,174,016, with four exemplary propellers having distinct incidence angles relative to the longitudinal axis of the aircraft fuselage. As described in the patent, the varying incidence angles allows the flight control computer to apply slight pitch, roll or yaw moments to maintain a desired attitude in flight. As with original Carter SRC aircraft, the Jaunt eVTOL designs maintain the capability for autorotative flight, a key safety feature within an industry which has otherwise largely abandoned autorotation.

In 2017, James Paulos of Penn State published his PhD Dissertation entitled, "Rotorcraft Blade Pitch Control Through Torque Modulation." In 2018, Paulos received U.S. Pat. No. 9,914,535 protecting this novel technology. Paulos identified the opportunity to adjust BLDC motor torque through 360 degrees of rotation, and in conjunction with a novel rotor head, he demonstrated cyclic control without a swashplate. With an increase in torque, one of two rotor blades increases in blade incidence, while the other blade decreases in blade incidence. With a decrease in motor torque, the opposite occurs. Repeating this process each revolution of the BLDC motor, swashplate emulation is achieved. Of note, the Paulos rotor only provides cyclic control, and thus having an average blade pitch for powered flight, the aircraft he developed would not be capable of autorotative descent.

Contra-rotating helicopters may use cyclic pitch control on one set of rotors to adjust attitude of the helicopter in certain situations, such as a gust of wind. As the cyclic is adjusted in one set of rotors, it is advantageous to increase the thrust using a second set of rotors. This adjustment can be done through rpm control. Rpm control lags behind the cyclic pitch control by nature of its design.

Rotorcraft became practical almost one hundred years ago. The key enabling technology to rotorcraft was the internal combustion engine with adequate power-to-weight ratio. Early helicopters were powered by piston engines, while more recent helicopters tend to be powered by turboshaft engines, which offer a higher power-to-weight ratio. Helicopters have seen widespread use in military and industrial applications. During the 1950s and 1960s, helicopters were envisioned as a mass-market transportation modality, particularly from airports to downtown landing locations. Costs remained high however, limiting helicopter use to wealthy consumers and business executives. A turning point for commercial helicopter flights was the tragic accident of New York Airways on the roof of the PanAm building in New York in 1977. Five people died when a Sikorsky S-61 tipped over, killing four people on the roof of the building, and one person on the street below. The perception of helicopter travel being both expensive and unsafe has relegated consumer use primarily to niche applications such as sight-seeing tours.

Over the last decade, we have witnessed a gradual transition of ground-based transportation toward electrification and automation technologies. Electrification of automobiles reduces the dependence upon fossil fuels, while automation moves us toward a mobility network without human drivers. Multiple automobile manufactures have committed to producing only electric vehicles by the year 2035. These same macro trends are beginning to reshape aviation, bringing a range of benefits: reducing operating cost, reducing environmental impact, and enabling new applications.

Much recent development has focused on electric vertical take-off and landing (eVTOL) aircraft, principally to enable mass-market "urban air mobility." While these aircraft are capable of hovering for takeoff and landing, operating from locations without runways, most designs have been optimized for high-speed forward flight. The typical eVTOL has a modest physical span relative to an airplane, operating with a disk loading (weight divided by swept area of the rotors) of more than 8 pounds/square-foot. Efficiency in hovering flight tends to be quite poor, both because of the high disk loading, and the operation of the electric motors at a torque much greater than that required for optimal efficiency. In forward flight, however, the typical eVTOL has a lift-to-drag ratio of at least 17:1, and the electric motors operate at higher efficiency with lower torque. The most popular eVTOL architectures fit in two categories: tilt-rotors and lift-plus-cruise. The first architecture has a multiplicity of rotors which begin in a horizontal orientation for take-off, and transition to a vertical orientation for forward flight. Varying the rotor angular velocity and pitch provides attitude control during the hovering state, while airplane-like control surfaces provide attitude control during forward flight. Lift-plus-cruise architectures are those having rotors for hover, principally fixed in a horizontal plane of rotation, and at least one rotor that is fixed in a vertical orientation to provide thrust for forward flight. As with the tilt-rotor architectures, lift-plus-cruise eVTOLs include airplane-like control surfaces to achieve attitude control in forward flight. The mechanical and electrical complexity of eVTOLs targeting urban air mobility is quite high, resulting in extended and expensive development cycles, and likely high costs of manufacture and maintenance.

At this dawn of electric aviation, one can envision a number of applications for electric rotorcraft other than urban air mobility. For example, surveillance, photography, mapping, cargo delivery, aerial advertising and weapon delivery can all be addressed with new rotorcraft employing electrification and automation technologies. While high-speed forward flight is the most important attribute for eVTOLs targeting urban air mobility, other applications will require much longer flight times and lower noise. For any rotorcraft operating in a hovering state during a large fraction of its mission, the key to extending the flight time and lowering the noise is reducing the disk loading. Reduced disk loading translates to rotorcraft having larger and more slowly turning rotors, while opening the opportunity for simpler architectures relative to those required for urban air mobility. The purpose of embodiments of the invention described herewith is to introduce a new architecture for a contra-rotating electric helicopter with the unique attributes of being mechanically simple, highly reliable, extremely low noise, and offering long flight times with existing battery technology.

Leonardo da Vinci has been credited with the conception and testing of the first human-carrying helicopter. FIG. 17 illustrates a portion of da Vinci's notebook sketch for what he called an "aerial screw." From da Vinci's notebook, historians have concluded that a prototype was constructed from a frame of pine wood, covered with silk fabric. This first helicopter had a rotor diameter of 33 feet, intended to lift off the ground under the power of four men who would turn the screw from the deck constructed at the base. The prototype was tested on Jan. 3, 1496, more than 407 years before the Wright Brothers made the first powered flight at Kitty Hawk, North Carolina.

For many reasons, da Vinci's aerial screw never became airborne. It lacked the power necessary for the weight of four men and a wooden aircraft, and there was no provision to overcome the rotor torque that would cause the base to spin in the opposite direction of the lifting "screw." It would be centuries before compact power sources would become available to solve the first problem. The second problem was arguably the easier to solve, though Newton had not established the foundational knowledge of classic physics until the publication of Principia Mathematica in 1687, 191 years after da Vinci tried to fly the first helicopter.

Approaching the 20th century, engineers and scientists began to find solutions to the key problems that needed to be solved for heavier-than-air vertical flight to become a reality. These problems included: developing dense power sources, devising systems to counteract rotor torque, developing systems to shift the center of thrust so as to stabilize the aircraft and allow movement in a horizontal plane, and creating flight controls that would allow a pilot to achieve stability and navigate a desired course.

The first helicopter to hover with a human pilot onboard was the tandem rotor helicopter developed and flown by Paul Cornu in 1907, shown in the photograph of FIG. 18. Having two horizontally displaced rotors spinning in opposite directions, Cornu effectively dealt with the main rotor torque issue, creating forces that cancel one another as applied to the fuselage. Cornu reportedly flew the helicopter for several seconds, at an altitude of less than 1 meter. A modern analysis of the design demonstrates that it had insufficient power to hover beyond ground effect. Moreover, the control system consisted of vanes to direct the downward airflow of the rotors, which proved to be ineffective. Cornu abandoned the design without improvement, though he earned credit as the first person to build and fly a helicopter.

By the 1920s, Etienne Oehmichen in France, as well as George de Bothezat, a Russian immigrant to the United States, had developed quad-rotor helicopters, today called quad copters, a new architecture to deal with both the torque issue as well as allowing lateral control. The Oehmichen quad copter is shown in FIG. 19, taking flight on May 8, 1924. Two of the rotors disposed on opposite sides of the center of gravity turned clockwise, and the other two rotors, also disposed on opposite sides of the center of gravity, turned counter-clockwise. Yaw control occurred by adjusting the blade pitch of the clockwise rotor pair relative to the blade pitch of the counter-clockwise rotor pair. Pitch and roll control occurred by adjusting the front-to-back or side-to-side pairings of rotor blade pitch. In the absence of computer control systems, the pilot workload in early quad-copters was very high, and thus these early designs never reached a point of viability for any application. Almost 80 years later, Draganfly introduced the first quad-copter drone for consumers, and the industry has since grown to many companies selling millions of quad-copters for consumer, commercial and military purposes. Unlike the early quad-copters that operated by adjusting blade pitch, modern quad-copters operate through an adjustment of angular velocity of four electrically-powered rotors. Onboard computers with inertial sensors allow stable flight, addressing the pilot workload issue of early attempts.

Though it was not the first to fly, the helicopter perfected by Igor Sikorsky is considered the classical helicopter. FIG. 20 is a photograph of Igor Sikorsky test flying his prototype single-rotor helicopter on Sep. 14, 1939. Even today, the design is the most common configuration of human-carrying vertical flight aircraft. In brief, the single-rotor helicopter design includes a main rotor with a swashplate, and a vertically disposed tail rotor to counteract the torque created from drag forces on the main rotor. Though little known, a Russian engineer named Yuriev first proposed the use of the swashplate for a helicopter. He constructed the first prototype of a helicopter that looks similar to the classic helicopter in 1912. The swashplate is the critical sub-system for a classic helicopter, as it allows both "collective" and "cyclic" control of the main rotor. "Collective" refers to an adjustment of the average pitch of the rotor blades, resulting in an increase or decrease of the integrated thrust magnitude, while "cyclic" refers to a variation of blade pitch as a function of angular position, resulting in a shifting of the integrated thrust center. When in a stable hovering state, the thrust of the tail rotor, multiplied by the distance from the main rotor hub, creates a torque which exactly counteracts the drag-induced torque of the main rotor.

The tail rotor of a classic helicopter is sometimes replaced by a ducted fan, often described as a Fenestron, a trademarked term of Airbus SE. The Fenestron offers improved safety compared with an exposed tail rotor, and greatly reduced noise, by including a multiplicity of rotor blades, typically with unequal spacing. Another substitute for a tail rotor is the use of entrained turboshaft exhaust gases to create thrust through the Coanda effect. This approach was successfully adopted by McDonnell Douglas Helicopter in their "NOTAR" (no tail rotor) helicopters.

Other rotorcraft configurations include intermeshed rotors, spinning in counter rotation to one another, tip-jet helicopters, whereby the thrust is applied at the tips of the rotor blades, eliminating torque to the helicopter fuselage, and ducted fan aircraft with twisted stators, counter-acting the torque of the of the powered rotor with stators that redirect the airflow. Recently, there have been a number of multi-copter configurations that include many rotors. Most of these configurations have an equal number of rotors turning clockwise and counter-clockwise, as a means to counteract the torque applied to the fuselage. However, there are designs with an odd number of rotors that achieve the same effect, and certainly stacking rotors that are in contra-rotation has become a popular solution to the fuselage torque problem.

Of particular association with the contra-rotating electric helicopter disclosed herein are those helicopters described as either contra-rotating or coaxial helicopters. All of these designs share a common physical characteristic of having two rotors stacked in the vertical direction. The rotors typically share a common axis of rotation, and the physical size of the rotors is usually similar. Most of the contra-rotating or coaxial helicopters have the rotors placed above a fuselage, which remains in a non-rotating frame of reference. This configuration was the first practical proposal to solve the rotor torque problem inherent with the da Vinci aerial screw. It was first described by a Russian scientist named Mikhail Lomonosov, who developed a small helicopter model with contra-rotating rotors in July 1754, and demonstrated it to the Russian Academy of Sciences. The first patent for a coaxial helicopter was awarded to Henry Bright by the British Patent Office in 1859. The first practical coaxial helicopter to fly was developed by the Frenchmen, Louis Breguet and Rene Dorand. FIGS. 20A, 20B and 20C are line drawings for the Breguet/Dorand coaxial helicopter from 1933. Their "Gyroplane Laboratorie" first flew on Jun. 26, 1935, more than four years before Igor Sikorsky flew the VS-300, considered by many as the first practical helicopter. While not as well-known as the Sikorky helicopter, the Breguet/Dorand coaxial helicopter achieved flights of more than one hour over a 44 km closed course by November of 1936. Development of the Breguet/Dorand helicopter was halted with the outbreak of World War II.

There are several benefits of the contra-rotating helicopter configuration. First, it solves the torque problem inherent with a rotor powered from a motor in the stationary frame of the fuselage. Second, it eliminates the power loss associated with a tail rotor, which by itself does not provide lift. Third, it requires less induced power than a single-rotor helicopter having the same rotor diameter, making it more efficient in hover. Fourth, it eliminates the human hazard of the tail rotor, which spins at a height where passengers may inadvertently make contact. And fifth, it solves the dissymmetry asymmetry of lift problem that occurs in forward flight for a single-rotor helicopter. That is, the advancing blade creates more lift than the retreating blade, due to the differential airspeed of the blade on either side of the rotor, which requires a cyclic response to effectively counteract the shift of the thrust center. Ultimately, single rotor helicopters with non-rigid rotor systems are limited to a cruise speed of about 30% of the rotor tip speed, due to the stalling of the blades on the retreating side of the rotor disk. With contra-rotating rotors, the clockwise rotating rotor has its advancing blade on the left of the fuselage, while the counter-clockwise rotating rotor has its advancing blade on the right of the fuselage. Because the combined lift of the rotors remains relatively constant in forward flight, contra-rotating helicopters can fly stably to a higher airspeed relative to the rotor tip speed, as compared with a single-rotor helicopter. The tradeoff, however, is that the contra-rotating helicopters require greater power in high-speed forward flight than an equivalently sized single-rotor helicopter, due to the increased parasitic drag of two rotor systems.

With so many advantages of the contra-rotating helicopter configuration, the question arises, why has it not become the dominant helicopter design? The common answer of engineers is one of mechanical complexity. Because the angular velocity of both rotors is typically held constant throughout flight, due to the slow response of internal combustion engines, both the upper and lower rotors have collective control and cyclic control. Hence, the design of the typical contra-rotating helicopter requires two interconnected swashplates, one for each of the two rotors, and a complex transmission, driving coaxial rotor shafts in opposite directions. While Igor Sikorsky's first experimental helicopters were both contra-rotating configurations, his early work was unsuccessful, due in part to the complexity of the contra-rotating design. He ultimately perfected the first commercial helicopter, the VS-300, with a single main rotor, including a swashplate, and a vertically disposed tail rotor with collective control. There were others who achieved early commercial success with contra-rotating helicopters, including JSC Kamov, a Russian rotorcraft manufacturing company established in 1940. However, the contra-rotating helicopter remains a small fraction of all helicopters manufactured today.

The introduction of electric propulsion and automation systems raises the opportunity to revisit many of the original rotorcraft concepts, applying these new technologies to solve problems in ways never before possible. The incredible recent success of quad-copter drones is a perfect example. Electric motors, having fast response and virtually constant torque capability over angular velocity, allow rotors to be controlled by angular velocity variation instead of blade pitch control, greatly simplifying mechanical design. Low-cost and light weight inertial sensors and computers allow rotorcraft stabilization in ways that would have seemed like science fiction in 1940.

With regard to contra-rotating helicopter designs employing electric motors, there have been proposals to simplify their construction, for example by attaching the motor housing to one rotor, and the output shaft of the motor to the other rotor. In a Japanese patent application from 2010, Takeshika disclosed a "Contra-rotating Propeller Motor," published in JP 2012011990A. He describes "a propeller, rotor and fan on the rotor and field (case) of at least one electric motor to counter torque." Takeshika states the advantages of: "(1.) not requiring a gearbox, (2.) the reverse torque can be completely cancelled, (3.) there is no reverse torque at any number of revolutions and (4.) lightweight and compact." However, to power his contra-rotating propeller motor, Takeshika describes the use of brushes and slip rings to convey power from a stationary frame to the rotating frame of the motor. Thus, while he eliminated the transmission of a typical coaxial rotor helicopter, he introduced a friction-based power interface that likely has lower reliability than the transmission which he eliminated. More recently, Groman has disclosed a "Dual Rotor System" through the publication of his patent filing, US20200231275A1. He describes a contra-rotating dual rotor system to be driven by an electric motor disposed outside the rotor system. Groman conceives of a first rotor to be driven from the central shaft of the motor, and a second coaxial shaft, via an extension of the motor housing. He states that "when the motor is powered, the rotors rotate in opposite directions."

Moreover, Groman describes the shifting of the motor mass through a universal joint as this "allows for the rotors to easily be tilted," without recognizing that the inertial moment of the rotor makes this completely impractical.

SUMMARY OF THE EMBODIMENTS

The present rotor system for electrically powered rotorcraft includes a rotor hub mechanism that adapts the rotor blade incidence angle in response to the torque applied from the drive motor, and a means of electrically braking the motor, typically in the absence of drive power, such that the rotor continues to spin at a controlled rate during autorotative descent. Thus, some embodiments of the rotor system do not require explicit collective blade pitch control, either from the pilot or flight computer, such as disclosed in U.S. Pat. No. 11,634,235.

In an illustrative embodiment of the rotor system, the blade incidence angle has two states, one for powered operation, and one for autorotative operation. During powered operation, when the driving torque exceeds a threshold magnitude, the blade collective incidence angle becomes 11.0 degrees. During a loss of power, when the driving torque to the rotor approaches zero, the blade collective incidence angle becomes 1.0 degrees. The low angle of incidence ensures that the rotor will continue to turn in a windmill state, with reverse flow through the rotor disk, whereby the driving region of the rotor is sufficiently dominant over the driven and stall regions, to cause acceleration of the rotor speed beyond its normal rate. As a governing methodology, to maintain the rotor speed within a safe range and to control thrust relative to other rotors, electrical braking of the motor is applied. The energy derived from braking can be dissipated through resistance, or it can be regenerated into a battery or super-capacitor. Regeneration is advantageous, so as to allow power recovery during the final stages of autorotative descent.

In other embodiments of the rotor system for electrically powered rotorcraft, the blade incidence does not modally transition with applied motor torque. Rather, the blade incidence increases in proportion with applied motor torque, either through a linear or non-linear relationship. Through the inclusion of a loading spring, some embodiments hold the blade incidence at approximately 0.0 degrees until a threshold torque is applied, at which point the blade incidence linearly increases with torque until 13.0 degrees is reached. In this position, a hard stop prevents further increases.

While the proportionate relationship between torque and blade incidence has no particular benefit nor detriment in the autorotative state, since blade incidence is held near 0.0 degrees throughout autorotation, it can provide benefit during normally-powered flight. For example, as rotors become large, the inertia contributed by the rotor blades makes RPM control impractical due to the resulting sluggishness of the thrust response when modulating motor power. However, if a change in motor torque results in an almost immediate change in blade incidence, then rotorcraft with large rotor inertia, employing certain embodiments of the rotor, can exhibit the rapid response characteristic of rotorcraft with explicit collective control.

Refined embodiments of the rotor system provide a non-linear response of blade incidence as a function of applied torque. Because torque and thrust do not have a linear relationship, attempting to force such a relationship with a linear spring results in an initial thrust response that is linear, followed by a slowing of the rotors to compensate for applying too much blade incidence for a given rotor torque. We mathematically show that a non-linear spring, designed to have an angular displacement following the torque raised to the ($\frac{2}{3}$)-power, allows the rotor to maintain relatively constant RPM throughout variations in drive motor torque and the resulting change in blade incidence and rotor thrust.

Many embodiments of the rotor system are driven by brushless DC (BLDC) motors. As with any BLDC motor, it is powered from a motor controller, often called an electronic speed control (ESC). The ESC takes a DC power source, such as a battery, and creates commutation power signals to drive three sets of motor windings within the BLDC motor. Certain models of existing commercial ESCs provide a programmable braking functionality, which can be advantageously used to implement autorotative descent with the rotor system. Though certain embodiments of the rotor system, such as those having a non-linear spring resulting in constant rotor RPM, cannot be controlled by the commercially available ESCs, which adjust the motor speed in accordance with an input signal. Rather, a form of motor controller is described, which takes a throttle input, and modulates the motor torque rather than the motor RPM. We refer to this as an electronic torque control (ETC). Moreover, some embodiments of the motor controller include both the braking functionality and the torque-control functionality, to realize the rotor benefits of both autorotative descent and rapid thrust response.

In one embodiment of the invention a rotor system for a contra-rotating rotorcraft is disclosed. The rotor system includes a rotor hub coupled to an electric drive motor, a first set of rotor blades, and a second set of rotor blades. The rotor system also includes a cyclic pitch adjustment mechanism coupled to the first set of rotor blades and configured to cause adjustment of the cyclic pitch of the first set of rotor blades. The rotor system further includes a torque activated biasing mechanism configured to cause mechanical adjustment of a collective pitch of the second set of rotor blades based on a function of a torque applied to the rotor hub by the electric drive motor; wherein the function has a threshold torque such that when the applied torque is greater than the threshold torque adjustment of the collective pitch of the second set of rotor blades occurs.

Optionally, the threshold torque is based on a required torque to drive the second set of blades at a specific rotations per minute. Further optionally, the specific rotations per minute is the rotations per minute average during forward flight. Also optionally, the function has an upper threshold such that when the applied torque is at the upper threshold an increase of the applied torque will not cause adjustment of the collective pitch of the second set of rotor blades. In another option, the function is non-linear.

Optionally, the function is designed such that the increase in pitch causes an increase in thrust proportional to the applied torque raised to the two thirds power. Optionally, the torque activated mechanism is a torsion spring.

Also optionally, the rotor system further comprises a set of linkages configured to articulate a set of blade mount stems to cause the mechanical adjustment of the collective pitch of the second set of blades. Also optionally, the rotor system further comprises an electric pitch motor configured to drive the cyclic pitch adjustment mechanism. Also optionally, the rotor system further comprises a cyclic control computer, configured to cause the cyclic pitch adjustment of the first set of rotor blades.

BRIEF DESCRIPTION OF THE DRAWINGS

The foregoing features of embodiments will be more readily understood by reference to the following detailed description, taken with reference to the accompanying drawings, in which:

FIGS. 21A, 21B, and 21C are line drawings of the Breguet/Dorand Coaxial Helicopter, "Le gyroplane," circa 1933.

FIG. 28 is a tabular summary of the calculated performance of an exemplary contra-rotating electric helicopter in accordance with an embodiment of the present invention.

FIG. 30A shows the helicopter with pilot onboard and the canopy closed, while FIG. 30B shows the helicopter without the pilot onboard and the canopy openS

DETAILED DESCRIPTION OF SPECIFIC EMBODIMENTS

Definitions. As used in this description and the accompanying claims, the following terms shall have the meanings indicated, unless the context otherwise requires:

A "Delta-3" coupling of a rotor blade to a hub is a coupling that adjusts blade incidence in relation to blade flapping angle in a manner tending to reduce dissymmetry of lift during forward flight.

A "set" includes at least one member.

Figure 1:
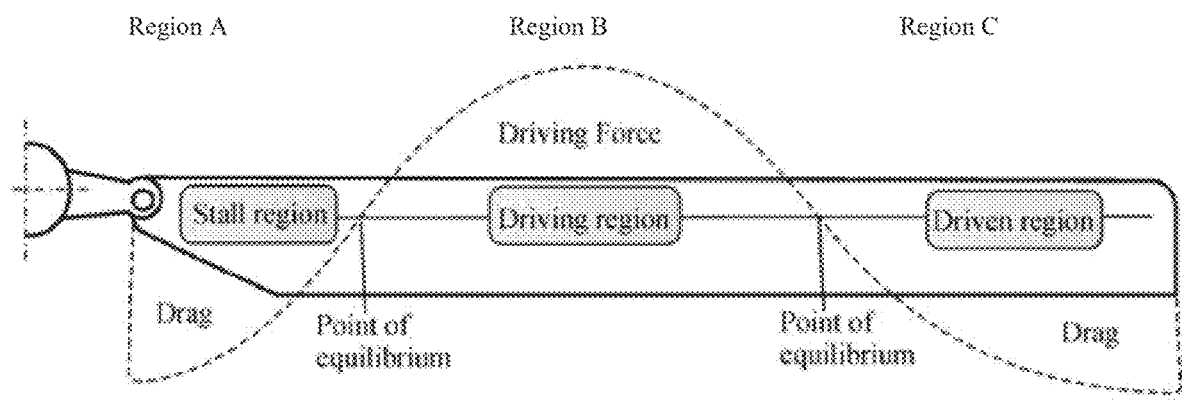
FIG. 1 shows three regions of a rotor in autorotative descent:
- (a.) Stall region—Rotor blade operates above its stall angle, resulting in drag, and reducing the rate of rotation.
- (b.) Driving region—The aerodynamic force vector is inclined slightly forward with respect to the axis of rotation, providing thrust that leads to the acceleration of the blade rotation.
- (c.) Driven region—The aerodynamic force acts behind the axis of rotation, creating lift that is offset with a drag force that decelerates the blade rotation.
Figure 2:
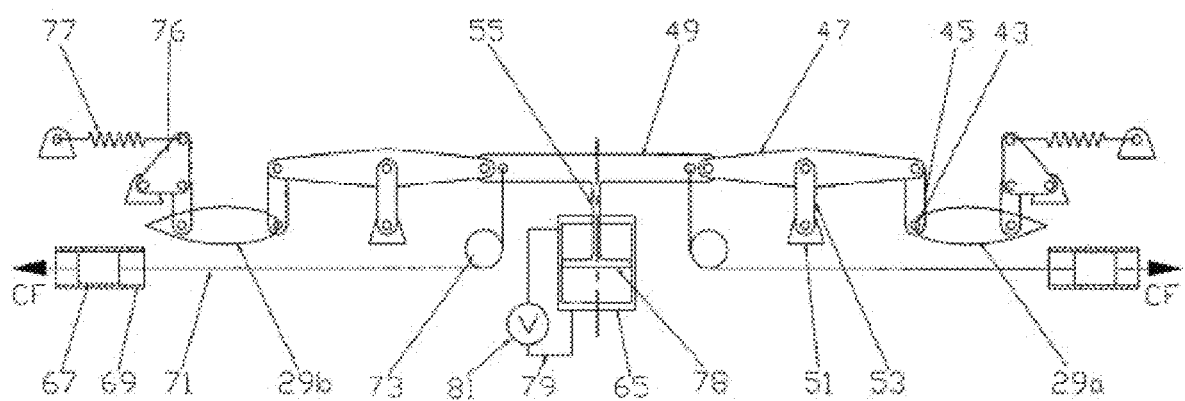
FIG. 2 is a schematic view of an automatic pitch controller.
Figure 3:
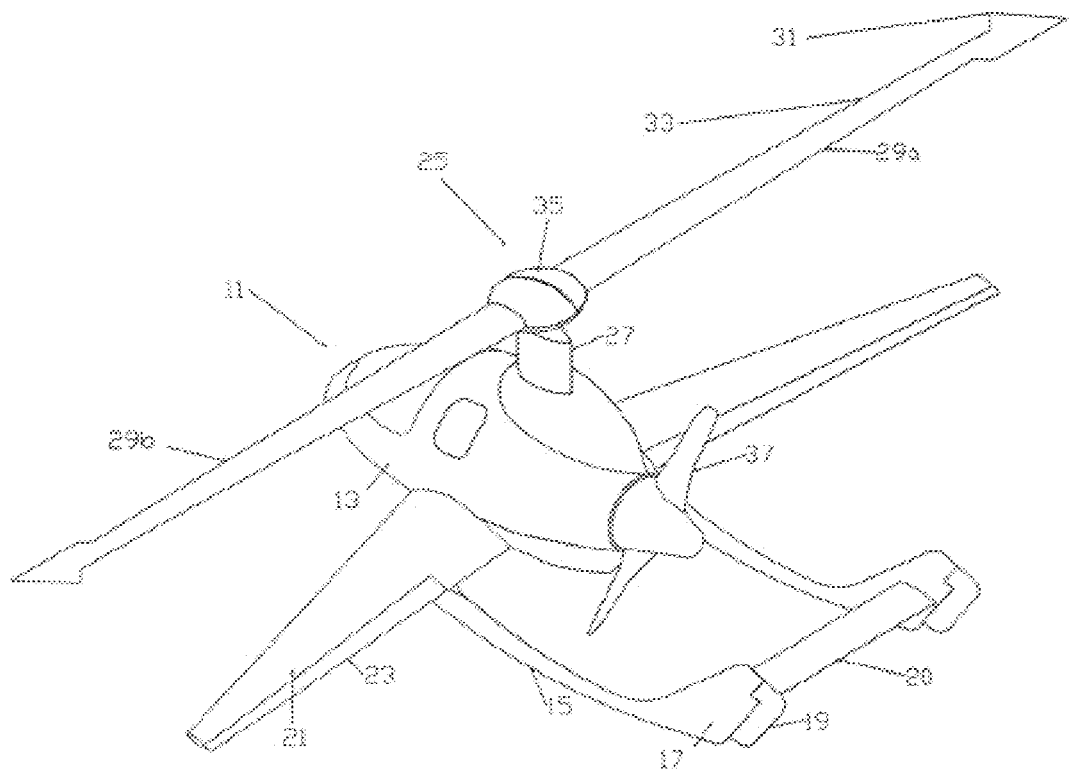
FIG. 3 is a perspective view of rotor aircraft including an automatic pitch controller.
Figure 4:
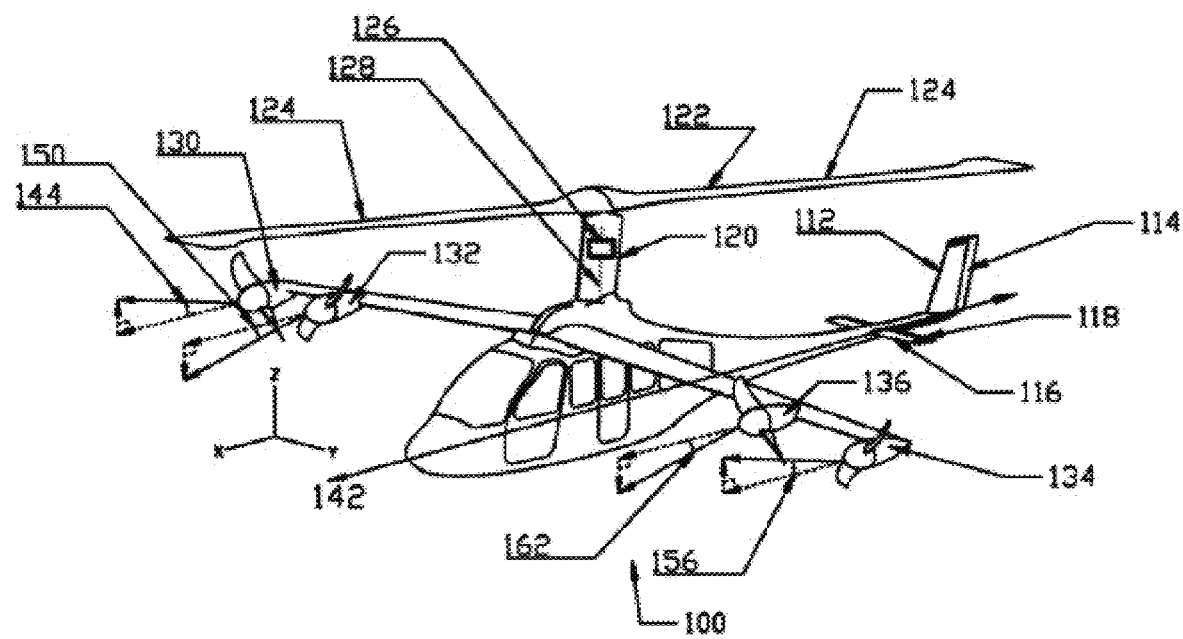
FIG. 4 is an illustration from U.S. Pat. No. 11,174,016, "Compound Rotorcraft with Propeller," commercially described as the Jaunt Mobility ROSA (Reduced-rotor Operating Speed Aircraft).
Figure 5:
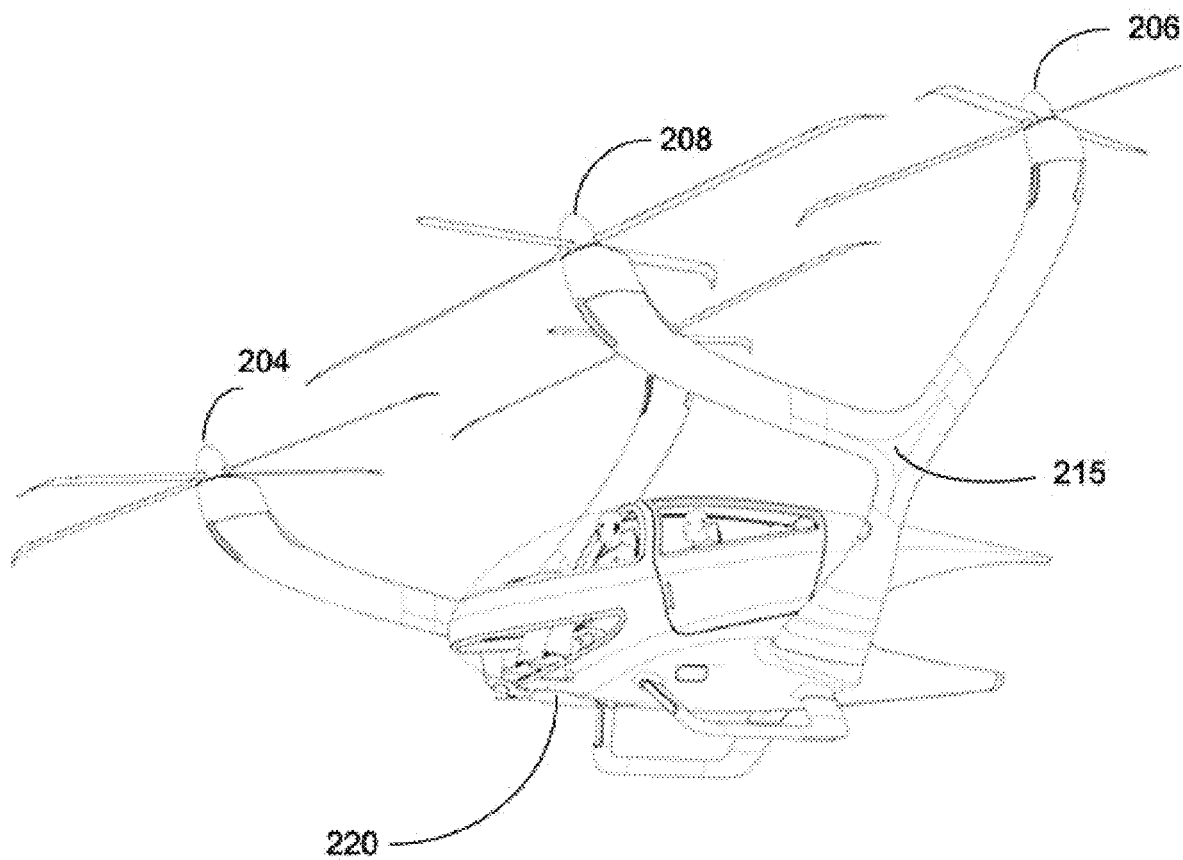
FIG. 5 is an illustration from U.S. Pat. No. 11,634,235, "Electrically Powered Rotorcraft Capable of Autorotative Landing," issued to the inventor of the presently disclosed invention.

U.S. Pat. No. 11,634,235, "Electrically Powered Rotorcraft Capable of Autorotative Landing" describes methods of achieving controlled autorotative descent for an electrically-powered rotorcraft having four or more rotors. These methods include the use of active collective adjustment for pitch and roll control, and the use of electrical braking for yaw control. FIG. 5 illustrates an embodiment of such a rotorcraft, a four-rotor eVTOL capable of controlled autorotative landing. In the more recent U.S. patent application Ser. No. 18/306,108, "Rotorcraft Autorotation Control Through Electrical Braking," methods of achieving controlled autorotative descent by first reducing collective on all rotors, and then using electrical braking alone to achieve roll, pitch and yaw control are disclosed. The "Rotor System for Electrically Powered Rotorcraft" described herein is an enabling technology for autorotation control utilizing electrical braking.

Figure 6:
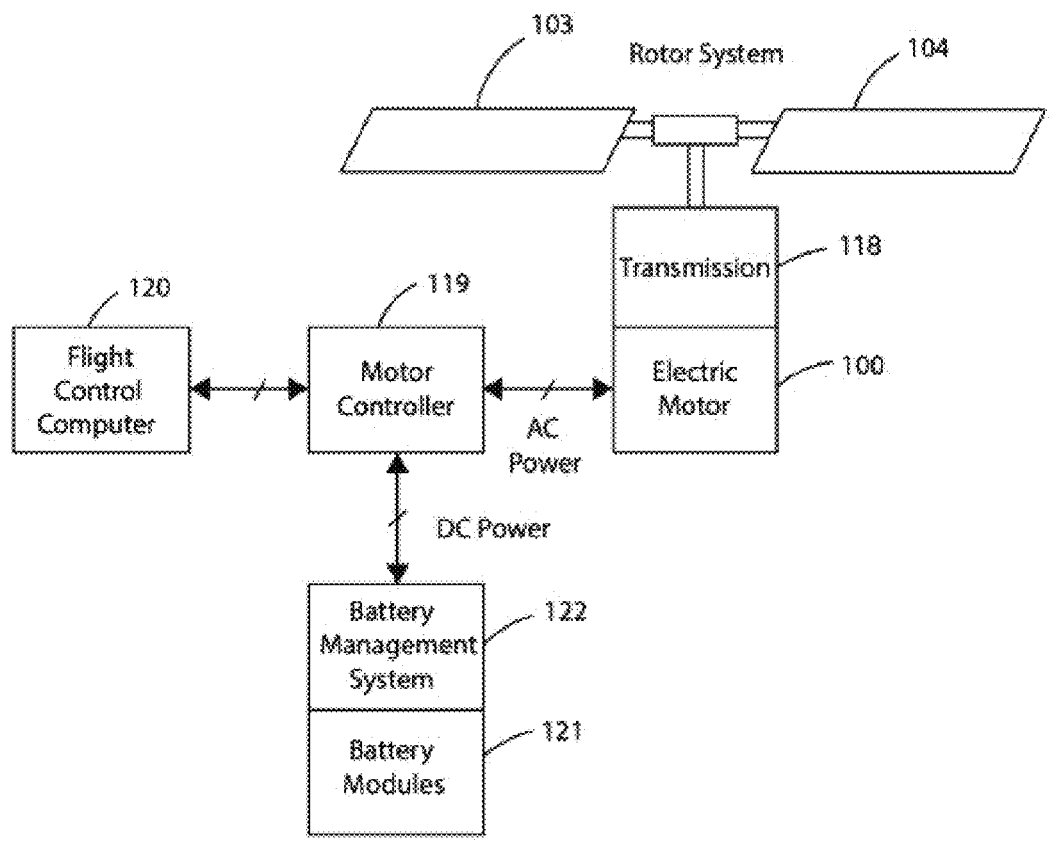
FIG. 6 is a block diagram of a rotor system in accordance with one embodiment of the invention.

FIG. 6 is a block diagram of a rotor system in accordance with one embodiment of the invention. The rotor is driven by an electric motor 100 reduced in speed through an optional transmission 118. While some embodiments do not include the transmission, it serves an important function, of allowing the electric motor 100 to operate at a high speed, albeit at a modest torque. For example, typical BLDC motors operate with their best efficiency when the torque is in the range of 10% to 15% of the stalled-motor (maximum) torque. While some electric aircraft developers have attempted to overcome this issue by increasing the diameter of the motors and the permanent magnet mass, it has been shown to be more weight effective to include a transmission, allowing a lower mass motor to spin at a higher speed.

BLDC motors are commonly employed for electric rotorcraft. While the name implies constant DC power being applied, they are in fact run with an alternating voltage, typically with three phases. Much like the original 3-phase permanent magnet motors created by Nikola Tesla in the 1880s, BLDC motors turn in a synchronous fashion with the 3-phase power applied, whereby the voltage and commutation frequency scale in proportion to the speed of the motor. Electrical current has an affine relationship with the resulting time-averaged torque, offset by the minimum current necessary to begin turning the motor. The device that powers a BLDC motor is called a motor controller 119, also referred to as an electronic speed control (ESC). Low-cost ESCs use square-wave signals for the three phases and higher performing ESCs provide signals of varying amplitude, such as sinusoidal signals. Those with varying amplitude signaling typically include "field-oriented control" (FOC), and thus the signals are generated through a control loop to avoid some variation in torque during rotation. FOC ESCs offer the highest efficiency and the lowest acoustic and electromagnetic noise. They have thus become common when designing electrically-powered aircraft.

In FIG. 6, motor controller 119 is controlled by the flight control computer 120. Signaling between the flight control computer 120 and the ESC 119 can be any number of schemes, most typically involving digital signaling. Model aircraft typically control the ESC speed through a form of pulse width or pulse position modulation. Larger uncrewed or crewed aerial vehicles have adopted serial communication interfaces such as CAN-bus, which has been widely used in the automotive industry. In many embodiments, the desired motor speed and torque are computed through a control state machine running on the flight control computer 120. Inputs to the state machine may include inertial, magnetometer, barometric, air speed, radar, lidar, and GPS/GNSS sensor data, and other inputs as appreciated by one having skill in the art, along with flight path instructions. In some embodiments the flight path instructions come from a human pilot, either through flight controls onboard the aircraft or remotely conveyed pilot controls. Alternatively, the flight path instructions may have been stored onboard the aircraft prior to flight, allowing fully autonomous operation.

Power for fully-electric aircraft is usually derived from batteries. In the present era, lithium-ion batteries offer the highest practical energy density, and they have become common for electric vehicles. Similar batteries are used for fully-electric aircraft. Alternative sources of energy for electrically propelled aircraft include fuel cells, most often converting hydrogen and oxygen into water, and hybrid power generators, whereby an internal combustion engine drives an electrical generator, which then powers the aircraft. Hybrid power aircraft often include batteries, which allows a short-term disparity between the rate at which power is generated, and the rate at which power is consumed. The other advantage of the batteries is to serve as an emergency energy source should the hybrid power generator fail.

Batteries are arranged in an array to form battery modules 121, including series connections to increase the voltage, and parallel connections to increase the current capability. While the battery modules 121 may have a direct connection to the motor controller 119 and other onboard electronics, it is most common to include battery management system 122 between the battery module 121 and both onboard and offboard connections. The battery management system 122 has several functions, both to maintain the health of the individual battery cells, as well as to prevent potentially catastrophic failure conditions, including deadly fires. During charging, for example, the battery management system 122 maintains a balancing of the voltages across all cells within battery modules 121 array, which is essential to fully charge the battery module 121 without overcharging any individual cells. Battery management system 122 will prevent the battery modules 121 from being overcharged, as well as preventing battery module 121 from being over-discharged. For example, many battery management systems disconnect the battery array from continued discharging once cell voltages drop to a threshold of 2.5V. Preferred embodiments of battery management system 122 also monitor temperature, only allowing charging or discharging when temperatures are maintained within a safe range. Some embodiments of battery management system 122 comprise one or more super capacitors. The super capacitors may provide short-term energy during an emergency event, for example, if battery modules 121 fail or become fully discharged.

Figure 7:
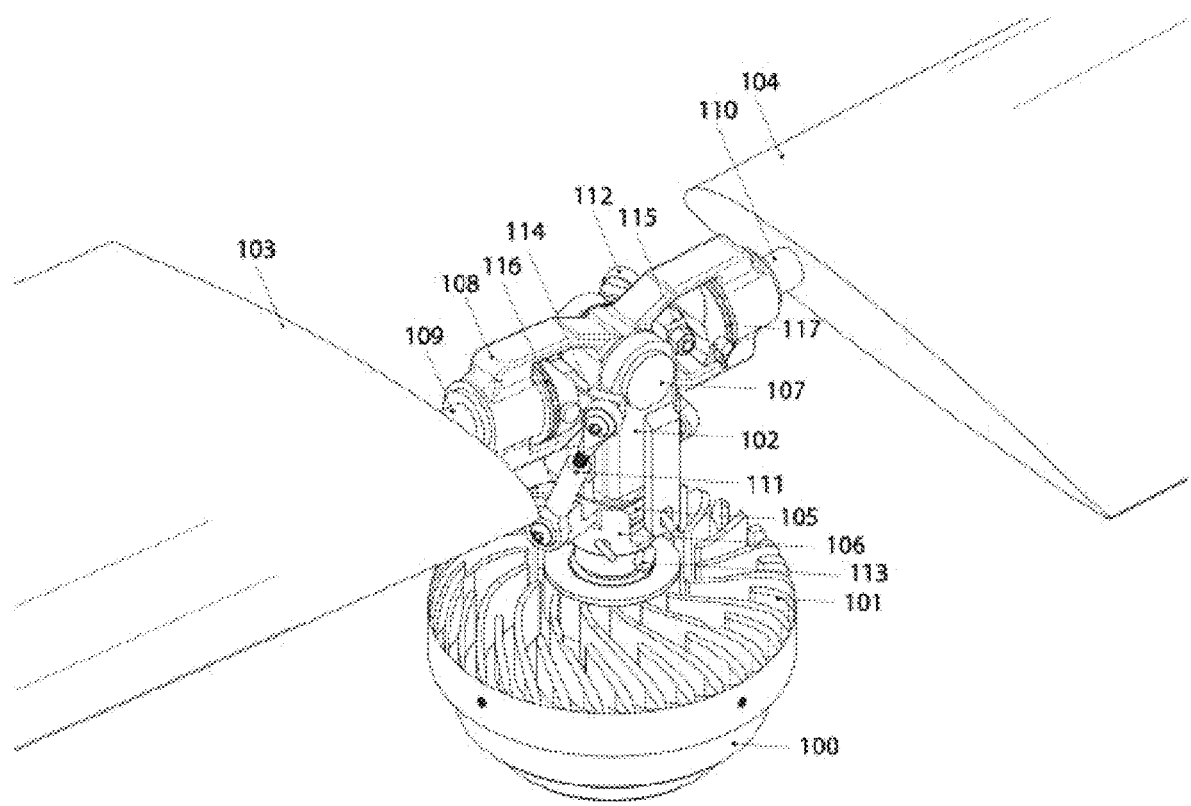
FIG. 7 is an isometric view of rotor hub 102 and drive motor 100 for an electrically-power rotorcraft in accordance with one embodiment of the invention.

FIG. 7 is an isometric view of rotor hub 102 and drive motor 100 for an electrically-power rotorcraft in accordance with one embodiment of the invention. To improve motor cooling, ensuring long-term reliability, heat sink 101 is mounted to the top of drive motor 100. Rotor hub 102 operates with two rotor blades 103, 104 mounted on teetering hinge 107 and offset by 180 degrees. Such a two-bladed configuration has become common for helicopter design, first adopted by Juan de la Cierva in his gyrocopter designs of the 1920s. Rotor hub 102 includes a Delta-3 coupling. As described earlier, Delta-3 coupling reduces the blade incidence with upward flapping, while increasing blade incidence with downward flapping. Delta-3 coupling reduces the dissymmetry of lift during forward flight and reduces mechanical stress that could otherwise result in mechanical failure. Rotor hub 102 also comprises torque-activated mechanism 105, 106, mounted at the base of the rotor hub.

Figure 8:
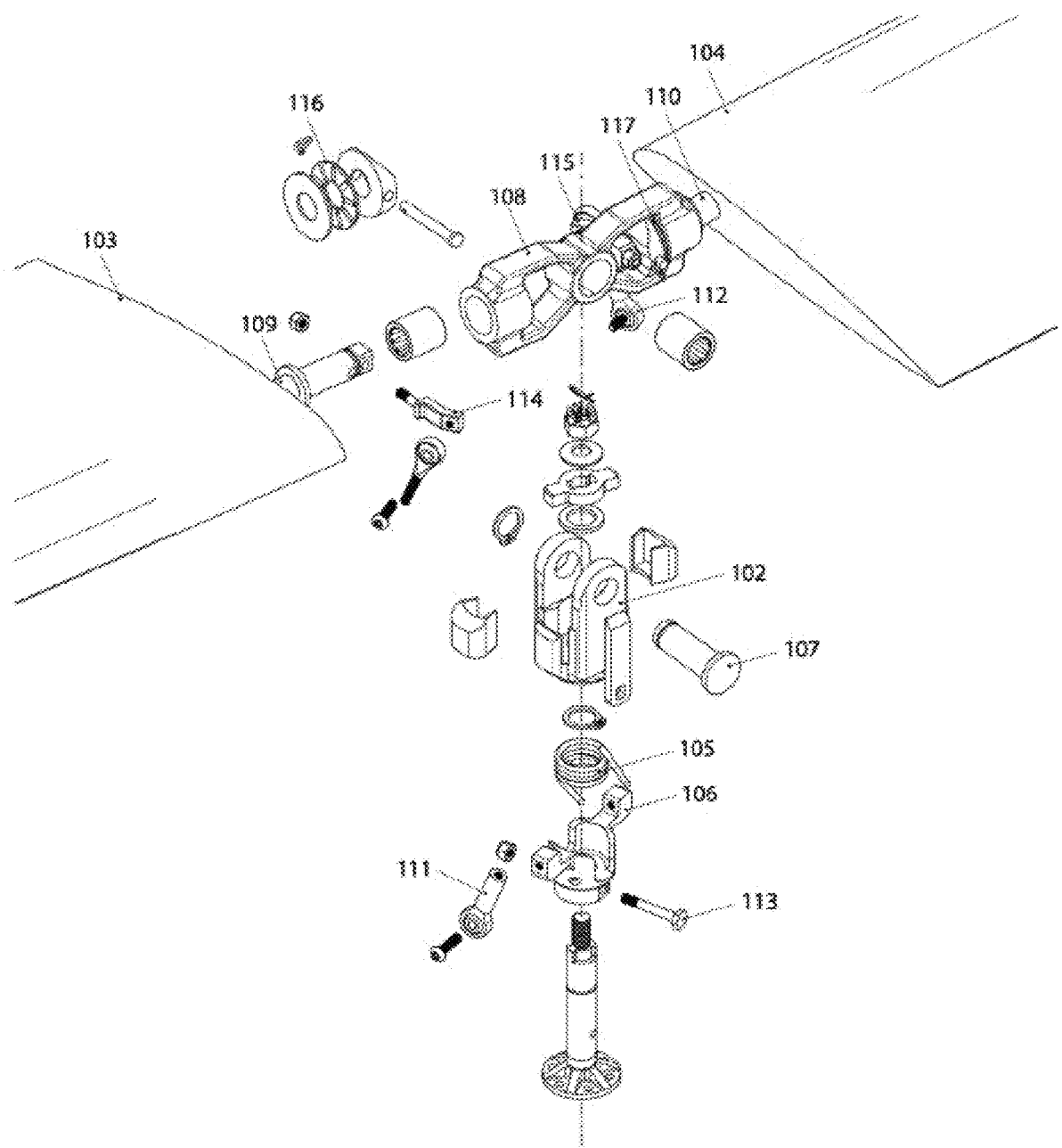
FIG. 8 is an exploded view of rotor hub 102 of FIG. 7.

FIG. 8 is an exploded view of rotor hub 102 of FIG. 7. Each rotor blade 103, 104 has a blade shaft 109, 110, inserted through bearings and guides in the teetering blade mount 108. Each shaft is retained by actuator arms 114, 115, and thrust bearings 116, 117, providing low-friction adjustment of the blade incidence angle, as the blades exert centripetal force through rotation, driven by the electric motor 100. While the drive shaft from the motor 100 is secured to the base actuator 106 with the base lock bolt 113, the rotor hub 102 can move over a limited angle with respect to the drive shaft and base actuator 106. Torsion spring 105 applies a force that rotates the rotor hub 102 into an inactive state when the electric drive motor 100 is unpowered or lightly powered. The spring 105 is designed such that when the electric drive motor 100 exerts a torque greater than some fraction of its normal operating torque, for example 50%, the motor torque overcomes the spring 105 force, and the rotor hub 102 rotates into an active position. The rotation of the base actuator 106 with respect to the rotor hub 102 causes the ball linkages 111 and 112 to push upward on the actuator arms 114, 115, which in turn rotates the blades 103, 104, increasing their angle of incidence.

Figure 9A:
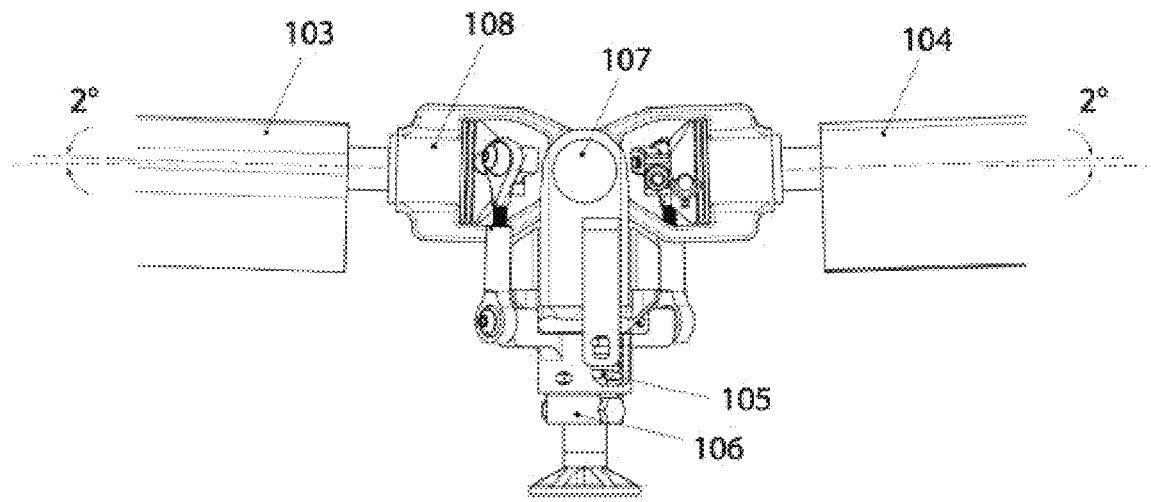
FIG. 9A is an isometric side view of rotor blades 103, 104 and rotor hub 102 of FIG. 7 showing teetering hinge 107 in a neutral state.
Figure 9B:
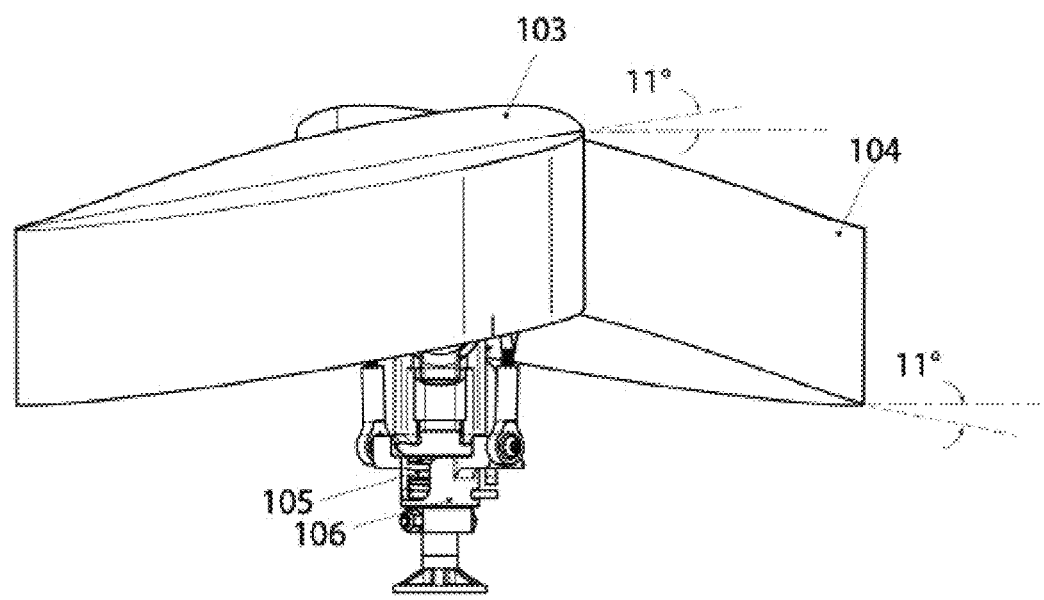
FIG. 9B is an isometric end view of rotor blades 103, 104 and rotor hub 102 of FIG. 7 showing teetering hinge 107 in a neutral state.

FIG. 9A is an isometric side view of rotor hub 102 of FIG. 7 showing teetering hinge 107 in a neutral state. FIG. 9B is an isometric end view of rotor blades 103, 104 and rotor hub 102 of FIG. 7 showing teetering hinge 107 in a neutral state.

In FIG. 9A, there is 2 degrees of pre-coning for each blade 103, 104 built into the teetering blade mount 108. Pre-coning is a common feature of many helicopter rotors, as it relieves the stress at the blade root, because the blades naturally move toward a similar coning angle under loaded flight conditions. With teetering hinge 107 being in a neutral state, both blades 103, 104 have an incidence angle of 11 degrees. Thus, when the teetering hinge 107 is in a neutral state, there is no Delta-3 adjustment to blade incidence angle.

Figure 10A:
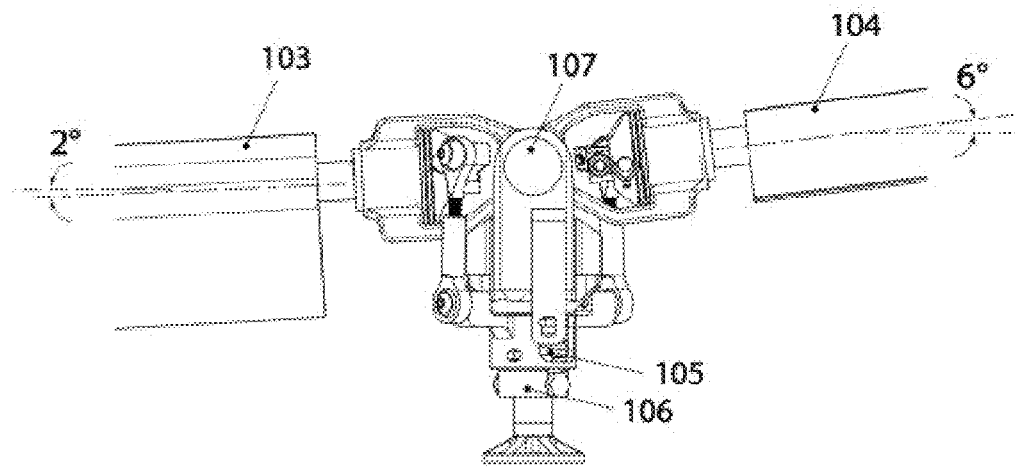
FIG. 10A is an isometric side view of rotor blades 103, 104 and rotor hub 102 of FIG. 7 showing teetering hinge 107.
Figure 10B:
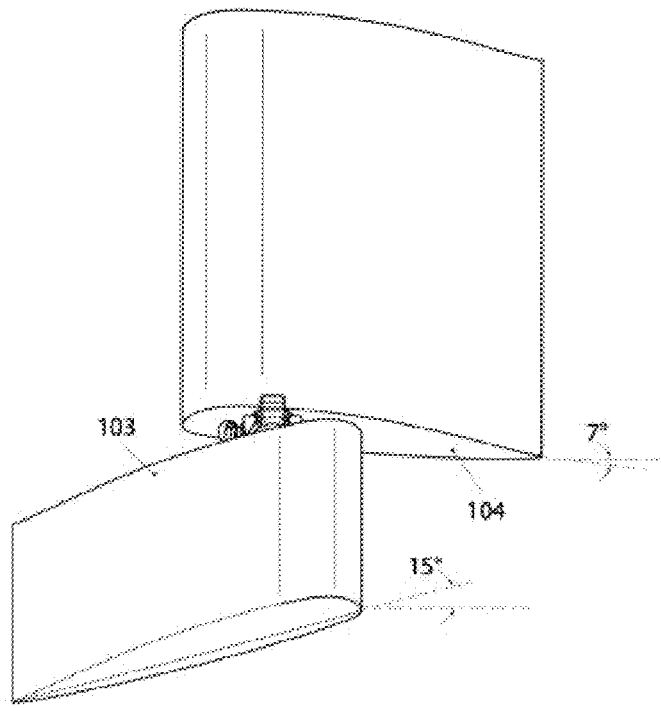
FIG. 10B is an isometric view of rotor blades 103, 104 and rotor hub 102 of FIG. 7 showing teetering hinge 107 in an active state.

FIG. 10A is an isometric side view of rotor blades 103, 104 and rotor hub 102 of FIG. 7 showing teetering hinge 107 in a flapped state. FIG. 10B is an isometric end view of rotor blades 103, 104 and rotor hub 102 of FIG. 7 showing teetering hinge 107 in a flapped state. The teetering hinge 107 shows flapping, with blade 104 raised by 6 degrees with respect to the horizon, and blade 103 drooping by 2 degrees with respect to the horizon. In this embodiment, the mechanical geometry provides a 45-degree Delta-3 coupling between the flapping and feathering axes. Such coupling results in a degree-for-degree adjustment of the blade incidence angle relative to the teetering/flapping angle. FIG. 10B is an isometric view of rotor blades 103, 104 and rotor hub 102 of FIG. 7 showing teetering hinge 107 in an active state. As can be seen in FIG. 10B, blade 103 has increased blade incidence angle to 15 degrees, from a nominal 11 degrees, while blade 104 has decreased blade incidence angle to 7 degrees, from a nominal 11 degrees.

One should note that the effect of the Delta-3 coupling upon blade incidence is additive to the effect induced by the torque-activated mechanism 105, 106. Consequently, the beneficial effects of Delta-3 coupling are realized for both powered flight, when the average blade incidence is 11 degrees, for example, as well as for autorotative flight, when the average blade incidence is 1 degree, for example. Thus, the design emulates the effect of dropping collective in a traditional helicopter, wherein the rotor includes a swashplate, and the teetering rotor hub has Delta-3 coupling.

Figure 11A:
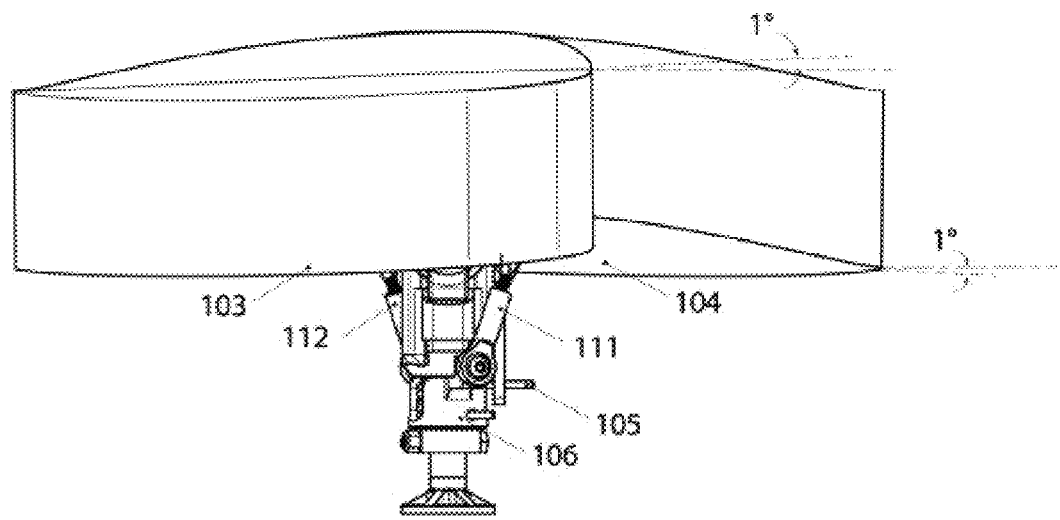
FIG. 11A is an isometric view of rotor blades 103, 104 and rotor hub 102 of FIG. 7.
Figure 11B:
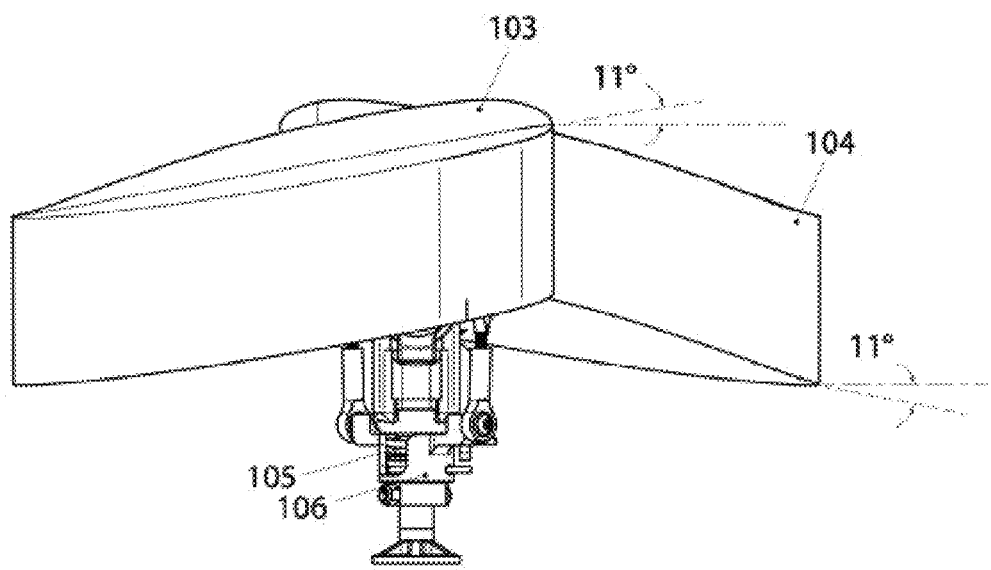
FIG. 11B is an isometric view of rotor blades 103, 104 and rotor hub 102 of FIG. 7.

FIGS. 11A and 11B are end views of the rotor blades 103, 104, to illustrate the change in incidence angle brought about through the torque-activated mechanism 105, 106. In FIG. 11A, the electric drive motor is unpowered, and thus no torque is applied to base actuator 106. Because there is no torque being applied, the spring 105 forces the rotor hub 102 into the inactive state. The rotor hub being in the inactive state causes a reduction of blade incidence angle through linkages 111, 112, and actuator arms 115, 116. In FIG. 11A, each blade has a 1 degree incidence angle, having opposing slope with respect to the direction of view. A shallow incidence angle is beneficial for autorotative flight. In FIG. 11B, the electric drive motor 100 is applying torque to overcome a threshold into the torque-activated mechanism 105, 106. The presence of torque sufficient to overcome the spring 105 moves rotor hub 102 into the active state, coupling through linkages 111, 112, and actuator arms 115, 116, increasing blade incidence. In FIG. 11B, viewing from the end of the blades 103, 104, with the blades 180 degrees apart in azimuth, there is a 11-degree active incidence angle, typical of powered rotor flight conditions.

The rotor system can be adopted for benefit in many different electric rotorcraft architectures. One exemplary application would be as a replacement for the fixed propellers and single-quadrant ESCs typically used for quadcopters. Another application of the present rotor system is for use in combination with systems that provide electrical braking. When there is no torque being applied to the rotorcraft, the rotorcraft might enter a mode of autorotative descent. In such a mode, electrical braking can recharge a dead battery and control the yaw of the vehicle among other benefits that may help one having ordinary skill in the art.

In FIG. 5, each rotor 204, 206, 208, includes a mechanism to allow adjustment of the blade pitch, the mechanism electrically controlled from a flight control computer. The safety issue inherent with such a solution is relying upon the ongoing operation of the collective control, during a period when power has been lost from the drive motor. Certainly, one can envision back-up power and control schemes to allow the collective control to operate, even when the drive motor, motor controller, or battery system have failed. However, such back-up schemes add complexity, weight, cost, and certification time, while most certainly resulting in a less reliable solution than a passive mechanism can offer. Consequently, the inclusion of the torque activated rotor system in the present application provides a benefit. More generally speaking, any multi-copter design with sufficiently low disk loading would benefit from the torque activated rotor system, as it provides a mechanical means to ensure autorotative descent in an absence of power. Moreover, embodiments which include the teetering hinge with Delta-3 coupling would have reduced mechanical stress, compared with rigid rotors that are otherwise used in multi-copters.

Another use of the torque activated mechanism, is in a rotorcraft having contra-rotating rotors with fixed collective pitch, propelled into vertical flight with a single drive motor. Without a means to reduce the collective blade pitch, for at least one rotor, the Contra-Rotating Electric Helicopter cannot achieve or sustain autorotation. This becomes a key safety issue for larger embodiments, especially when they are crewed.

Figure 12A:
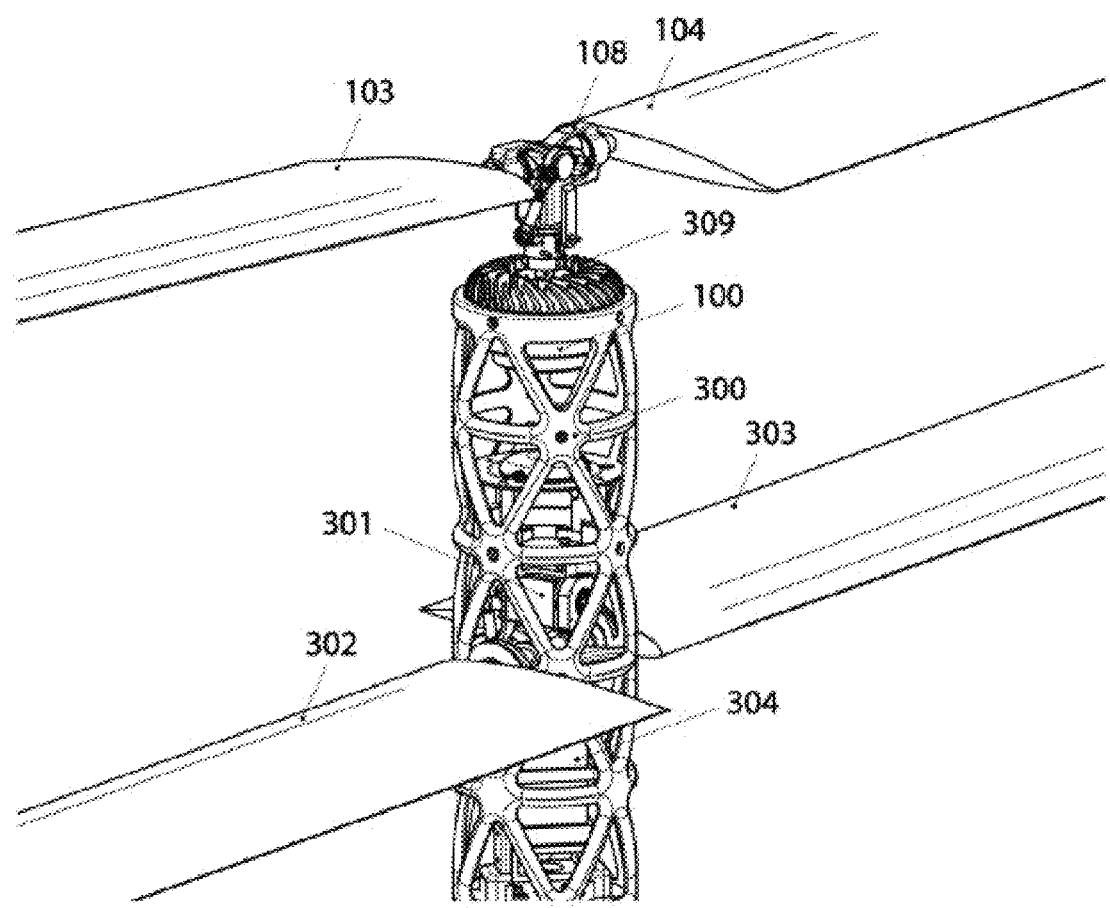
FIG. 12A is an isometric view of a rotor system integrated with Contra-Rotating Electric Helicopter in accordance with one embodiment of the invention.
Figure 12B:
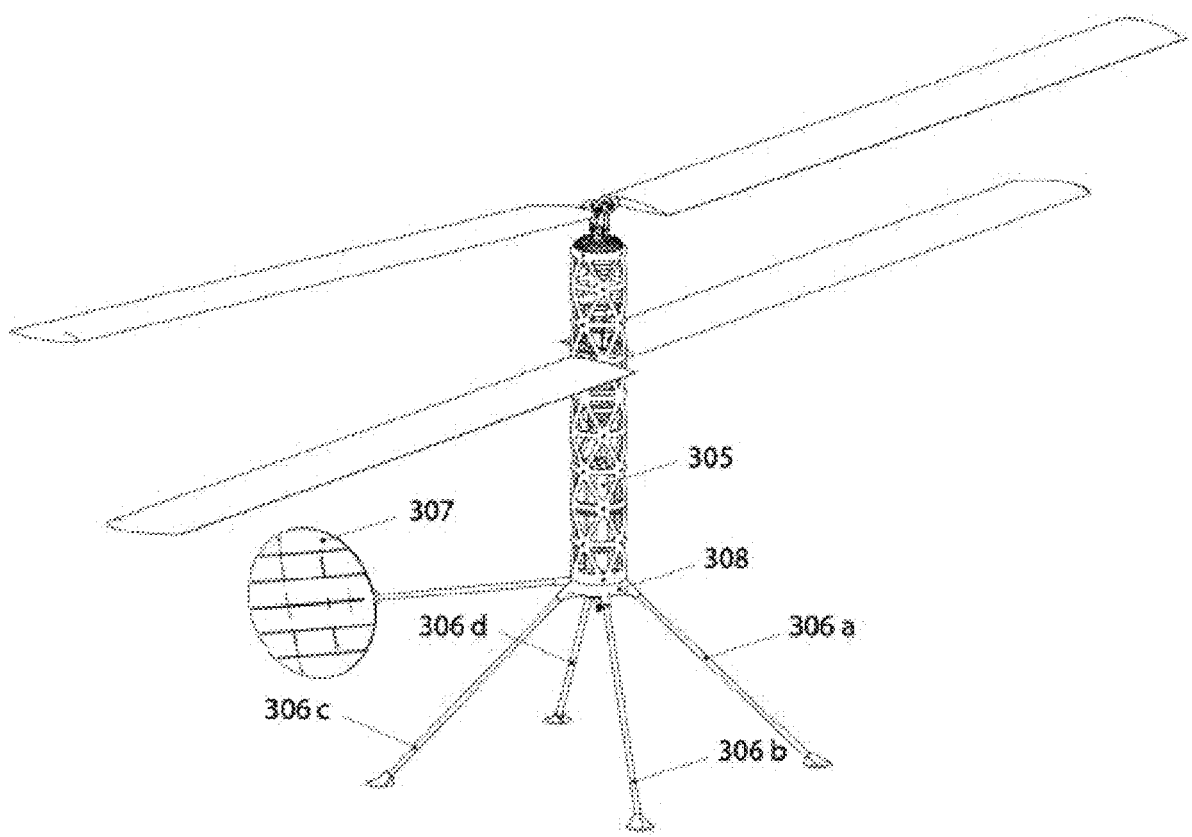
FIG. 12B is a zoomed out view of the rotor system of FIG. 12A.

FIGS. 12A and 12B illustrate an embodiment of a Contra-Rotating Electric Helicopter including a torque activated pitch adjustment mechanism. The rotor system in FIGS. 12A and 12B has been employed for the upper rotor coupled to the output shaft 309 of the electric drive motor 100. The isogrid truss cylinder 300, containing the flight controller 304, battery system 305, drive motor 100, cyclic mechanism 301 and lower rotor with blades 302, 303, is driven into a clockwise rotation by the counter-torque resulting from the gear-reduced electric drive motor 100 turning the upper rotor, with teetering blade mount 108, and rotor blades 103, 104, in a counter-clockwise direction. The battery system 305 includes both the battery management system 122 and battery modules 121. In this embodiment, the battery management system 122 also includes super capacitors, with a purpose of providing short-term power during an emergency loss of power from the battery modules 121.

In one embodiment, the Contra-Rotating Electric Helicopter of FIGS. 12A and 12B has two contra-rotating sections, without the necessity for a stationary frame of reference, such as a typical fuselage. To allow the helicopter to take off and land from locations not having infrastructure specifically designed for the Contra-Rotating Electric Helicopter the lower portion of the helicopter has been included. FIG. 12B illustrates the embodiment to include a swivel base 308, with landing legs 306a, 306b, 306c, 308d, and a tail 307. The swivel base 308 can turn freely from the isogrid truss cylinder 300, and various components mounted within 300, which are normally spinning in a clockwise direction during flight. The tail 307 remains aligned with the airflow during forward flight, similar to the tail of a weathervane. Thus, the swivel base 308, to which the tail 307 is coupled, becomes aligned with the airflow, as do the landing legs 306a, 306b, 306c, and 306d. Regardless of whether the helicopter is undergoing powered flight or autorotative descent, the landing legs remain in a non-rotating frame of reference, enabled by forward airspeed, easing the process of both take-off and landing the Contra-Rotating Electric Helicopter.

Upon a sudden loss of power, for example from a battery module 121 failure, the incidence angle for the upper rotor blades 103, 104 becomes reduced to 1 degree, due to the torque activated mechanism, supporting an immediate transition to autorotative descent. The ESC 119 for the electric drive motor 100 is integral to the motor housing in this embodiment. Acting as a speed governor for the upper rotor with blades 103, 104, during autorotative descent, the braking function of the ESC 119 recovers a portion of the rotor energy and transfers it to the battery management system 122 and the super capacitors contained within it. As the Contra-Rotating Electric Helicopter approaches the ground, power recovery is initiated by the flight computer 120, using the stored energy from the super capacitors within the battery management system 122, allowing the aircraft to execute a flare procedure and controlled touchdown, either autonomously, or under pilot control.

The torque activated mechanism can also be used in contra-rotating helicopters to adjust pitch during periods requiring more than average torque. In one example, when a gust of wind hits the helicopter, cyclic pitch in one of the sets of rotors can be adjusted to put the attitude of the aircraft into the wind. A greater thrust will be required to keep a level altitude of the helicopter during cyclic adjustment. Other causes for increased torque can also occur. In the embodiment of FIG. 12A, the cyclic pitch is adjusted in the lower set of blades 302, 303. A larger torque is applied by drive motor 100, to increase the thrust. As the torque increases, a torque activated biasing mechanism, such as torque spring 1403, is configured to mechanically adjust the collective pitch of blades 103, 104 to a higher collective pitch, allowing them to generate more thrust. By increasing the power provided to the motor, more torque is applied to the rotors to help increase thrust. A torque activated mechanism can be attached to the upper rotors causing an adjustment of pitch as the torque increases above a threshold. A torque required to reach a certain rpm, such as 1500 rpm, is a threshold. The torque activated mechanism can have a maximum torque, after which a further increase in torque above a second threshold does not increase the blade pitch. The torque activated mechanism may be created such that an increase in torque corresponds to an increase in pitch angle. The increases in torque and corresponding increases in pitch angle can be linear or non-linear. The function of the corresponding pitch angle adjustment can be dependent on the design of the torque spring, which is well known in the art.

The increase of pitch angle can be based on a function of the torque applied. In one embodiment, the function has a threshold of applied torque at which adjustment of the pitch angle occurs. Therefore, if the operator does not want pitch adjustment during the normal torque required by forward flight, the function would be designed so there is no adjustment of pitch until the torque is above the normal torque applied for forward flight. In one example, this is the torque required to drive the blades at an rpm of 1500. When the torque exceeds the threshold, the function can be linear or non-linear. Because the coefficient of torque is proportional to the thrust$^{3/2}$, the function may increase the pitch such that the thrust gained by such increase in pitch is proportionate to the torque$^{2/3}$. In other embodiments, if the torque grows faster than the thrust, it may be ideal to increase the thrust gained by a greater factor than the torque, for example, by the torque$^{3/2}$. The function can also have a maximum pitch angle, such that once the pitch is at the maximum pitch angle, an increase in torque will not increase the pitch angle.

Figure 13:
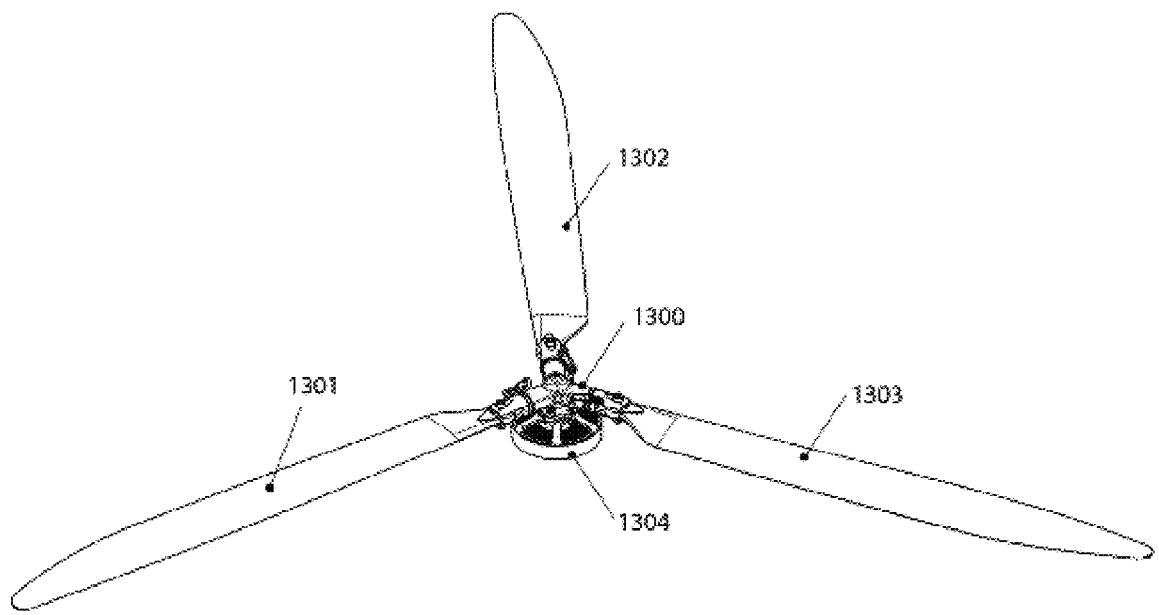
FIG. 13 is an isometric view of a three-bladed rotor system for a UAV in accordance with an embodiment of the invention.

The torque activated pitch adjustment mechanism can be applied to Uncrewed Aerial Vehicles (UAVs), such as multicopters generically described as drones. Incorporating the torque activated pitch adjustment mechanism in UAV designs enables autorotation as a safety feature to protect life and property on the ground. An exemplary torque activated pitch adjustment mechanism designed for UAV applications is shown in FIG. 13. Three blades are included in the exemplary design, though other embodiments include any number of blades. The rotor assembly 1300 will be described in more detail in the paragraphs to follow. The rotor is driven by a BLDC motor 1304. This exemplary motor has a KV170 speed rating, 14 pole pairs, and a mass of 130 g. Each of the three rotor blades 1301, 1302 and 1303 are designed with the OA209 airfoil, having a length of 360 mm and an average chord width of 36 mm. The blade design utilizes an optimized planform and twist to maximize the rotor merit factor in forward flight. This rotor system embodiment operates in a counter-clockwise direction. Another embodiment of the rotor system is designed to operate in a clockwise direction. Each of the rotor blades 1301, 1302 and 1303 are attached to the rotor assembly 1300 using a single nut and bolt, which allows movement of the blades in the lead/lag axis to relieve mechanical stress during flight. There is no provision for flapping relief in this embodiment, which is typical of low-mass UAVs. Articulation of the blades in the feathering axis is the made possible by the mechanism within assembly 1300.

Figure 14:
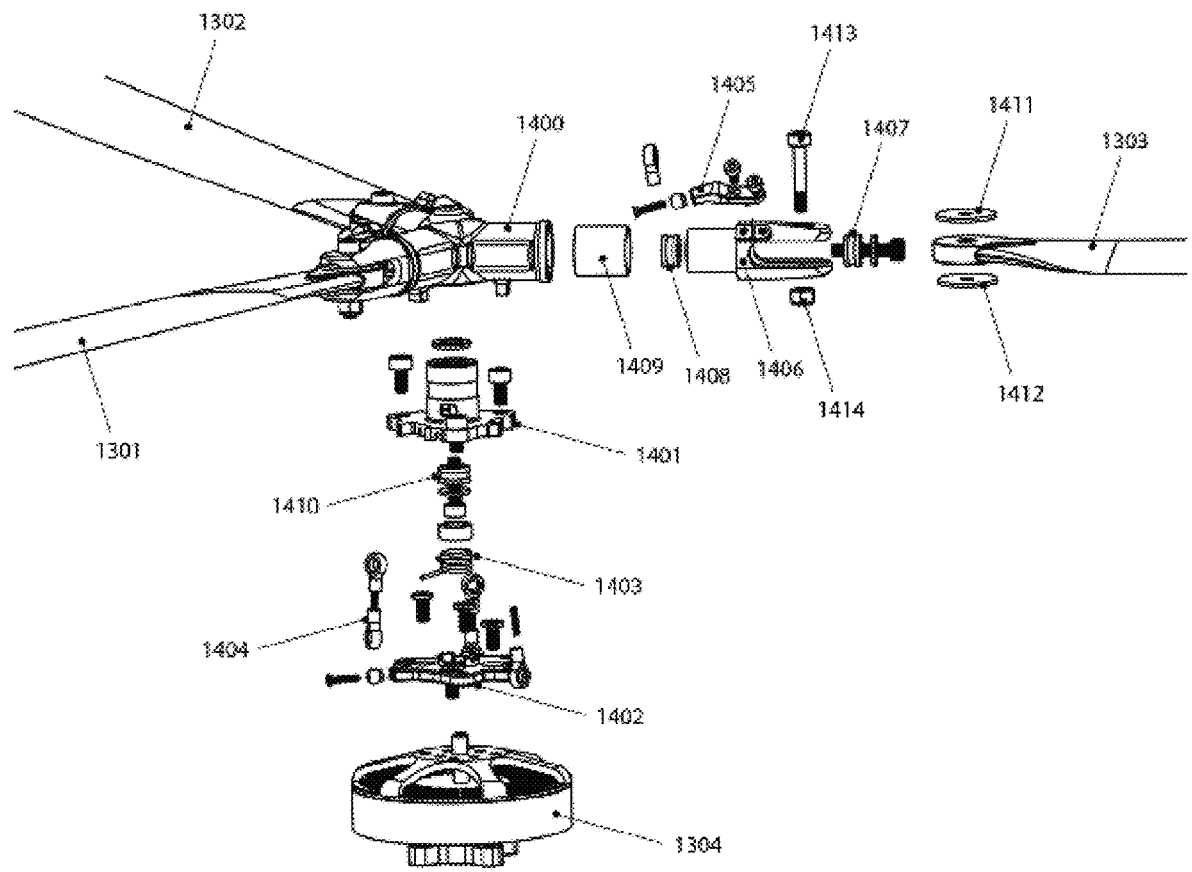
FIG. 14 is an exploded view of the three-bladed rotor system of FIG. 13.

FIG. 14 illustrates an exploded view of the rotor assembly 1300, the brushless DC motor 1304, and the rotor blades 1301, 1302, and 1303. The rotor hub 1400 has blade sub-assembles rotably mounted to it, while the rotor hub 1400 is rotably mounted to the hub mount 1401 and articulation plate 1402. The articulation plate 1402 is mounted to the top of the BLDC motor 1304 using screws. The hub mount 1401 and articulation plate 1402 are then affixed to one another with screws. The rotor hub 1400, including rotor blades 1301, 1302 and 1303, are coupled to the hub mount 1401 and articulation plate 1402 through the torsion spring 1403. The torsion spring 1403 is a coil fabricated from spring steel, including tails that project from the top and bottom in lateral directions. The lateral directions of the tails have an angle relative to each other. The lower tail is held tightly between hub mount 1401 and articulation plate 1402, while the upper tail is held by the rotor hub 1400.

When the BLDC motor 1304 applies torque through 1402 and 1401, the entire assembly from 1304 and above begins to spin in a counter-clockwise direction about the Z-axis. In addition, spring 1403 becomes compressed, in a rotational direction, as a function of the applied motor torque, causing the angle between the lateral directions of the tails to decrease. The compression of spring 1403 therefore allows the articulation plate 1402 to adjust its angular orientation about the central axis of rotation relative to the rotor hub 1400, which lags due to the transient rotor inertia and subsequent aerodynamic forces on rotor blades 1301, 1302 and 1303. Ball linkage 1404 is one of three that couple the articulation plate 1402 with the three pitch horns, such as pitch horn 1405. Limited movement of the articulation plate 1402 about the Z-axis causes limited movement of each rotor blade 1301, 1302 and 1303 about its feathering axis, through ball linkage 1404. For example, as 1402 advances relative to 1400, pitch horn 1405, attached to blade stem 1406, pulls downward, causing the incidence of blade 1303 to increase.

In the embodiment of FIG. 14, the angular articulation of 1400 with respect to hub mount 1401 is limited, as with the articulation of each blade stem with respect to 1400, and thus several bearings are included to reduce friction forces and mechanical wear. Bearing 1410, for example, provides a low-friction interface between 1400 and 1401. Similarly, blade stem 1406 is mounted to the rotor hub 1400 through a pair of bearings 1407 and 1408. A brass sleeve 1409 prevents abrasion between the blade stem 1406 and the rotor hub 1400. Because each rotor blade can lead and lag during flight, the mounting of rotor blade 1303, for example, includes the shoulder bolt 1413, lock nut 1414, as well as washer bearings 1411 and 1412, fabricated from PTFE.

In the rotor system illustrated in FIG. 14, mechanical hard stops limit the rotation of 1401 and 1402 with respect 1400. However, unlike the prior embodiment, wherein the change in blade incidence from the autorotative state to the powered state occurs over a narrow range of drive motor torque, this embodiment enables variable blade incidence over a broad range of drive motor torque. In this embodiment, the incidence of all three rotor blades 1301, 1302 and 1303 are held at 0.0 degrees when BLDC motor 1304 applies zero torque, and blade incidence cannot go beyond 0.0 degrees when motor 1304 applies negative torque through electrical braking. When BLDC motor 1304 applies positive torque, spring 1403 gradually compresses, allowing an increase in blade incidence proportionate with the required flight torque. In this embodiment, 0.67 Nm of torque causes the maximum rotation of 1401 and 1402 with respect to 1400, which results in a maximum blade incidence of 13.0 degrees. If the motor torque exceeds 0.67 Nm, the blade incidence is limited by the mechanical hard stop to 13.0 degrees. Between the two extremes, for example, the hovering flight torque of BLDC motor 1304 is 0.47 Nm, resulting in a blade incidence of 9.1 degrees. In other various embodiments, the torque spring 1403 compresses as various functions of motor torque applied to the spring. A near step-like function can be used to flip to a low angle of attach under a complete loss of power and a high angle of attack when power is being used to torque the rotor. In other embodiments, the function of torque is linear, parabolic, or any other function desired by one having skill in the art to control collective pitch as a function of the torque applied by the motor.

As described above, motor 1304 applies torque through spring 1403, causing counter-clockwise rotation of the rotor hub 1400 and the coupled rotor blades. When the motor torque changes, and the aerodynamic and friction forces do not provide a balancing torque, acceleration or deceleration of rotor speed occurs, until a new equilibrium rotor speed is reached. In equilibrium, the torque from motor 1304 is balanced with the sum of the aerodynamic drags of blades 1301, 1302 and 1303 moving about the Z-axis, and the sum of the blade pitching moments translated through the ball linkages to articulation plate 1402. The rotor system embodiment depicted in FIG. 14 uses mechanical leverage to couple the torque from 1402 into the feathering axes of the rotor blades. 20 degrees of twisting displacement of 1402 relative to 1400 results in a 10 degree increase in blade incidence. With three rotor blades and said leverage, approximately 1.5× the pitching moment of a single rotor blade is combined with the aerodynamic drag moments. The pitching moment of each blade depends upon the angle of attack, which is a function of both blade incidence and the induced velocity through the rotor. In general, airfoils designed for rotorcraft, such as OA209 in this embodiment, have low pitching moments. Consequently, the dominant torque balancing with the motor torque occurs through the aerodynamic drag of the blades spinning about the Z-axis.

Figure 15:
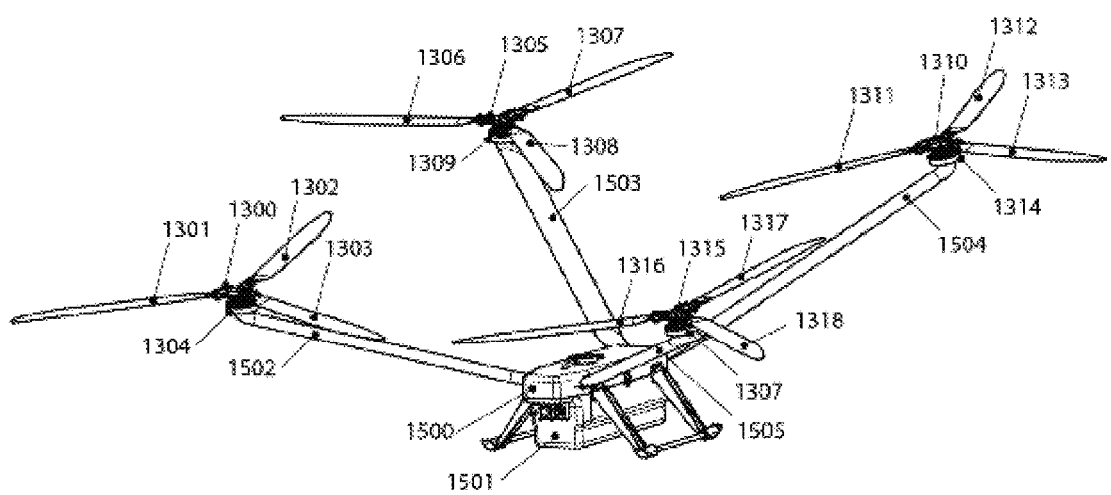
FIG. 15 is an isometric view of UAV quad-copter in accordance with one embodiment of the invention.

FIG. 15 illustrates a UAV quad-copter with a total mass of 5.5 kg. Each of the rotor systems are of the type illustrated in FIG. 13 and FIG. 14. Rotor assemblies 1300 and 1310 are of the variety described in the preceding paragraphs, turning in a counter-clockwise direction. Rotor assemblies 1305 and 1315 are designed to turn in a clockwise direction. Rotor assembly 1300 includes rotor blades 1301, 1302 and 1303, with drive power provided by BLDC motor 1304. Rotor assembly 1305 includes rotor blades 1306, 1307 and 1308, with drive power provided by BLDC motor 1309. Rotor assembly 1310 includes rotor blades 1311, 1312 and 1313, with drive power provided by BLDC motor 1314. Rotor assembly 1315 includes rotor blades 1316, 1317 and 1318, with drive power provided by BLDC motor 1319. The electronic speed controls (ESCs) for each motor 1304, 1309, 1314 and 1319 are mounted within the fuselage 1500. The ESCs can operate in a powered mode or in a braking/regeneration mode. Throttle commands from the flight controller, typically in the form of pulse-width or pulse-position modulation, indicate the degree of throttle or braking to be applied. Three-wire connections for each motor run through the corresponding airfoil struts 1502, 1503, 1504 and 1505. As was described in U.S. Pat. No. 11,597,505, "Rotorcraft Optimized for Forward Flight," the airfoil struts are mounted with an incidence angle to provide augmented lift when at the cruising speed. The airfoil shape is NACA0024, with a thickness of 24% relative to the chord width. To avoid stall conditions, the angle of attack for the airfoil struts is 5 degrees when the fuselage is in level flight. As the UAV depicted in FIG. 15 is designed for long range and endurance, the battery module 1501 represents 52% of the total UAV weight.

A key issue in efforts to scale a quad-copter drone to become a crewed eVTOL, or even to reduce the disk loading of a drone below industry practices, is dealing with rotor inertia. Computing swept rotor area, while maintaining constant disk loading, requires the blade length to scale with the square-root of the aircraft weight, since area equals π times radius squared. However, the mass of a rotor blade, presuming constant material density, grows with the cube of the blade length. This means the rotor blade mass grows with the aircraft mass raised to the (3/2)-power. Consequently, the rotor blades become an increasing percentage of the overall aircraft weight, and the response of the rotor systems to changes in motor power becomes muted by the increasing angular momentum. We define a time parameter t to provide an intuitive understanding for the control system challenge:

$$\tau = \frac{E_r}{P_r}$$

$E_r$ is the rotational kinetic energy within the rotor system, and $P_r$ is power necessary to sustain the rotor speed for a given flight condition, such as hovering.

Presuming rotor blades of constant chord width, it can be shown that:

$$E_r = \frac{1}{6} n_b m_b (\Omega R)^2$$

Where $n_b$ is the number of rotor blades for the rotor, $m_b$ is the mass of a single blade, R is the rotor diameter, and $\Omega$ is the angular velocity of the rotor, in radians per second.

During hovering flight, $P_r$ is computed as follows:

$$P_r = \frac{T^{3/2}}{M\sqrt{2\rho A}}$$

Where T is the thrust of the rotor, M is the merit factor of the rotor, $\rho$ is the density of air, and A is the swept area of the rotor, or $\pi R^2$.

Because the ratio of the rotational kinetic energy to the rotor power has the units of Joules in the numerator, and Joules per second in the denominator, $\tau$ has the units of seconds. In essence, $\tau$ represents the amount of stored energy that would sustain the rotorcraft in flight, in the absence of additional power. This is a rough idea however, because the rotor speed would decay exponentially in the absence of shaft power. From another perspective, $\tau$ also represents the time it takes the rotorcraft to respond to changes in shaft power applied to a rotor having fixed pitch propellers or rotor blades.

A commercially successful quad-copter drone is the DJI Mavic 3. Based upon available data for this drone model, we compute a value of $\tau$=314 mS. With a response time of a fraction of a second, one can intuitively reason that the DJI Mavic 3 will be highly responsive to RPM control. Moreover, DJI is known to employ electrical braking in their ESC designs and control methods, which allows the rotational energy to be depleted faster than nature would otherwise provide, thus improving the drone responsiveness. At the other extreme, we consider the Bell 407 helicopter, a 7-passenger turbine-powered helicopter having four rotor blades. Based upon available data, we compute a value of $\tau$=12.7S. Such a large time constant allows the human pilot two or three seconds to identify an engine-out condition and drop collective before the rotor speed has irrecoverably decayed. On the other hand, one can clearly see that RPM control of a 7-passenger helicopter is a physical impossibility.

Crewed helicopter designers have understood that RPM control was not feasible since the earliest research efforts. In fact, one of the first quad-copters, designed by Etienne Oehmichen in 1923, utilized wing warping to adjust blade incidence, while leaving the motor speed constant. Today, all commercial helicopters maintain constant motor RPM, while adjusting collective blade incidence to modulate the aircraft thrust. When collective incidence is increased, the motor must respond with increased torque, else rotor speed decays.

Certain embodiments of the rotor system achieve an improvement in the responsiveness of rotor thrust, by adapting the blade incidence as a function of the applied electric drive motor torque. In essence, the mechanism within the rotor head provides collective control without the usual mechanisms required. For a typical electrically-powered rotorcraft, adding collective control to a rotor typically involves a separate servo actuator, a driving circuit for the servo actuator, and a rotor pitch control assembly. Beyond the cost associated with the electrical and mechanical components, the compounded risk of failure is much greater than for a purely mechanical solution.

The linear response of blade incidence relative to motor torque has been described for the embodiment of FIG. 14. Because blade incidence results in a roughly linear response of lift coefficient, we can expect a roughly linear response of blade lift coefficient relative to motor torque. Rotor thrust is computed with the following:

$$T = c_t \pi R^2 \rho (\Omega R)^2$$

Where $c_t$ is rotor system coefficient of thrust. A common approximation of $c_t$ is:

$$c_t = \frac{\sigma}{6} \overline{C}_l$$

Where $\sigma$ is the rotor solidity and $\overline{C}_l$ is the average coefficient of lift for the rotor blade. Thus, we can conclude that a linear response of blade incidence relative to drive motor torque causes a transient linear response of thrust.

However, we must observe that the rotor torque is computed with the following:

$$Q = c_q \pi R^2 \rho (\Omega R)^2 R$$

Where $c_q$ is the rotor system coefficient of torque. Thus, a linear increase in torque, under a condition of constant rotor speed, results in a linear increase in the coefficient of torque. Next, we consider the relationship between $c_q$ and $c_t$ for a rotor composed of ideally-twisted rotor blades of constant chord:

$$c_q = \frac{c_t^{3/2}}{\sqrt{2}} + \frac{\sigma \delta}{8}$$

Where $\delta$ is the average profile-drag coefficient. The second term in the equation for $c_q$ represents the contribution of rotor drag when the rotor provides no thrust, for example when the collective blade pitch is near 0 degrees. Ignoring this contribution to the torque coefficient, we observe that $c_q$ scales with $c_t^{3/2}$. We can thus conclude that $c_t$ scales with $c_q^{2/3}$. Hence, for the embodiment of the rotor represented in FIG. 14, the transient rotor thrust will increase in proportion to the motor torque, though the steady-state rotor speed must then slow to satisfy the relationship between the coefficient of thrust and the coefficient of torque. This is less than ideal from a control system perspective, because the thrust does not follow a monotonic time progression.

Alternatively, consider a non-linear spring with a response that scales blade incidence in proportion to the motor torque raised to the (⅔)-power. Now, the resulting $c_t$ scales in proportion to $c_q^{2/3}$, which implies a constant rotor speed over variation in motor torque. More generally describing the physics, an exponent greater than ⅔ for the spring response results in a reversal of thrust change following the transient response (underdamped response), while an exponent lesser than ⅔ results in a monotonic change in thrust following the transient response (overdamped). Because the goal of the design is to maximize the short-time control authority, many embodiments adopt the largest exponent that would not cause a subsequent reversal in thrust (critically damped), which is adapting collective blade incidence in proportion to the motor torque raised to the (⅔)-power. Certainly, many other embodiments with non-linear spring responses are feasible, including those accounting for the zero-thrust drag contribution, those with adjustment mechanisms to be useful for various aircraft, and those with dynamic adjustment of the spring characteristics during flight.

Figure 16:
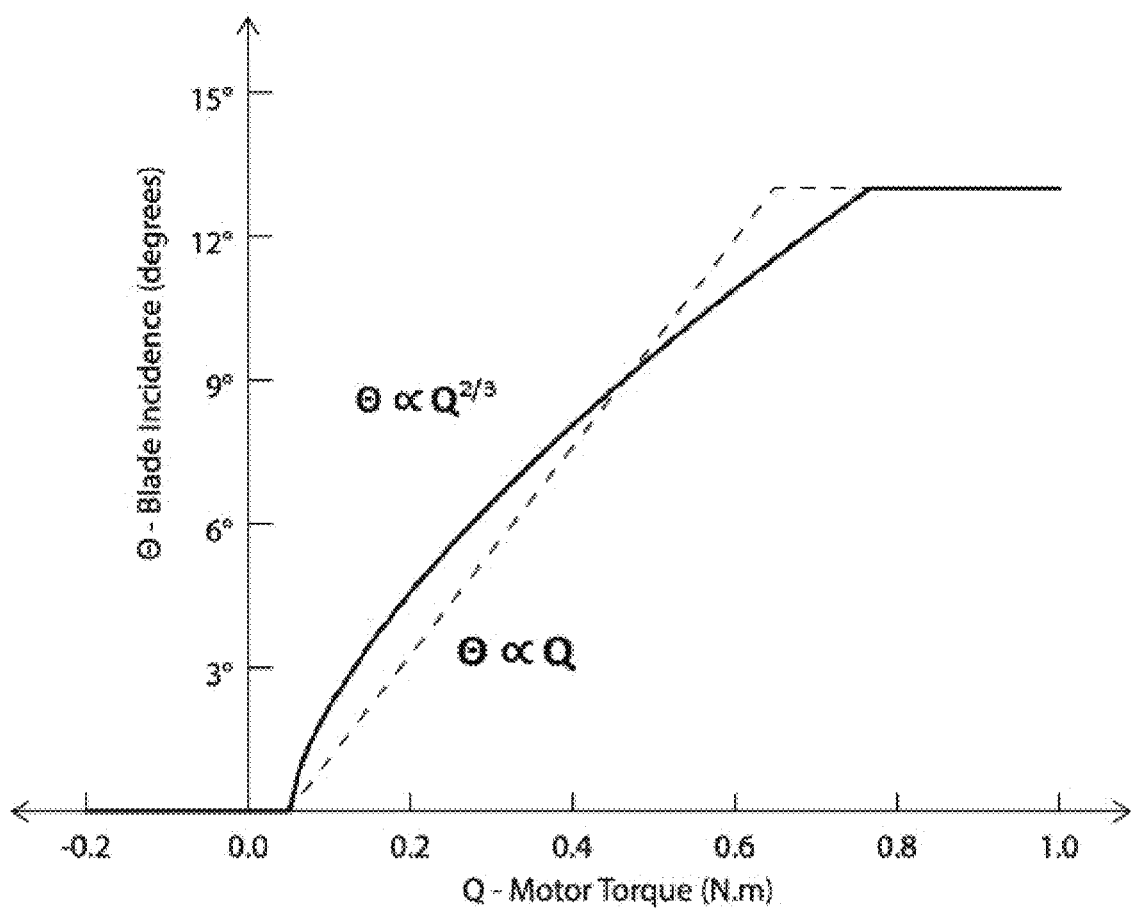
FIG. 16 is a graphical comparison of linear and non-linear spring mechanisms responding to drive motor torque.

FIG. 16 illustrates a comparison of the linear and non-linear spring responses. In both instances, the rotor mechanism is held at the 0.0-degree blade incidence hard stop for autorotation purposes, offset with 0.05 Nm of spring-induced torque. Once this spring torque is overcome with motor torque, the linear spring progresses through blade incidence until the 13.0-degree hard stop is reached with 0.648 Nm of motor torque. The embodiment with the non-linear spring progresses from 0.0-blade incidence to the 13.0-degree hard stop with 0.767 Nm of motor torque. Between the two extremes, both the linear and non-linear embodiments are designed to reach the nominal hovering blade incidence of 9.1 degrees with 0.470 Nm of motor torque.

Non-linear springs have been studied for many applications. Embodiments of the rotor system employing non-linear springs include those using rubber elastomers, wherein the tension or compression occurs over a large enough range to elicit a non-linear response. Other embodiments use flexures fabricated from metal or plastic, such as pin flexures, blade flexures and notch flexures.

In FIG. 6, electric motor 100 is powered from motor controller 119. As previously mentioned, motor controller 119 would normally be described as an "electronic speed control" (ESC). For electrically powered rotorcraft utilizing RPM control of the electric motors, the ESC descriptive naming is appropriate. Rotorcraft employing bi-modal embodiments of the rotor system would be controlled by ESCs. However, rotorcraft employing the rotor system embodiments wherein blade incidence varies through the range of operating motor torque values, particularly with designs explicitly targeting constant rotor RPM, a form of motor controller is required. In the position of motor controller 119, said motor controller would be described as an "electronic torque control" (ETC). In certain embodiments of the ETC, a range of input values from the flight controller 120 command the ETC to operate in a braking state, whereby the input values signify the negative (braking) torque to be applied from the motor to the rotor. Over another range of input values from the flight controller 120, the ETC operates in a powered state, whereby the input values signify the positive (driving) torque. Such embodiments of the ETC support both the autorotative functionality of the rotor, wherein the blade incidence is shallow, as well as the powered variable blade incidence functionality of the rotor.

The embodiments of the invention described above are intended to be merely exemplary; numerous variations and modifications will be apparent to those skilled in the art. All such variations and modifications are intended to be within the scope of the present invention as defined in any appended claims.

Contra-Rotating Helicopter

Disk loading is defined as the weight of the rotorcraft divided by the swept area of the rotor(s). Designing with low disk loading is particularly critical during the current era, wherein commercially available battery energy density is approximately 265 Wh/kg. By comparison, gasoline has an energy density of 12.8 kWh/kg. After accounting for the superior efficiency of electric motors and motor controllers relative to Otto-cycle engines, gasoline powered aircraft currently have a stored energy advantage of 24× to electric aircraft powered by lithium-ion batteries. Such modest battery energy density limits electric aircraft flight times, impacting the market demand relative to similar aircraft powered by fossil fuels. The inventor observes that a reduction in disk loading provides the benefits of increased flight time and reduced noise, whilst reducing the forward speed in flight and making the rotorcraft more sensitive to wind gusts. Such a design trade-off, combined with the novel architecture of the contra-rotating electric helicopter, creates a new class of rotorcraft that the inventor postulates will address applications receiving little attention to date.

The basic equations describing the Power (P) and Thrust (T) of rotorcraft have been known since the 1940s:

$$P = c_P \pi R^2 \rho v_{tip}^3$$

$$T = c_T \pi R^2 \rho v_{tip}^2$$

In hover, $T = W$ $$DL = \frac{W}{\pi R^2}$$

Holding $T$ constant, $$v_{tip} \propto \frac{1}{R}$$

$$P \propto v_{tip}$$

$$\text{Flight Time} \propto \frac{1}{P}$$

$$\text{Flight Time} \propto \frac{1}{v_{tip}}$$

$$\text{Flight Time} \propto R$$

$$\text{Flight Time} \propto DL^{-0.5}$$

For a fixed rotorcraft weight (W), the thrust (T) required for hover must match the weight (W), and the tip speed ($v_{tip}$) of the rotor blades is inversely proportional to the radius (R) of the rotor(s). For a given ratio of tip speed and rotor radius, the power (P) is linearly proportional to the tip speed. Since the rate of power consumption has an inverse relationship with the maximum flight time, the flight time also has an inverse relationship with tip speed. One can therefore conclude that the flight time is linearly proportional to the rotor radius, and inversely proportional to the square root of the disk loading.

For a given blade profile and rotor solidity, the proportionality of rotorcraft noise has been shown to be:

$$\text{Noise} \propto v_{tip}^2 T^2$$

With $T$ held constant, $$\text{Noise} \propto v_{tip}^2$$

-continued $$\text{Noise} \propto \frac{1}{R^2}$$

$$\text{Noise} \propto DL$$

If we express T as a function of tip speed, we see that noise grows with the sixth power of the tip speed. However, holding T constant for the case of a fixed weight rotorcraft in hover, we see that the resulting noise grows as the square of the rotor tip speed. As we noted earlier, the tip speed is in inverse proportion to the rotor radius. Thus, noise scales in inverse proportion to the square of the rotor radius, or directly to the disk loading, DL.

As we have shown, rotorcraft designs with reduced disk loading offer an increase in flight time, while simultaneously reducing noise. Exploiting these advantages, the inventor describes embodiments of the contra-rotating electric helicopter with disk loading in the range of 0.14 lbs/ft^2 and 1.0 lbs/ft^2, which is well below that of commercial helicopters in the range of 2.5 lbs/ft^2 to 10 lbs/ft^2. Comparing two rotorcraft of the same weight, one with a disk loading of 0.14 lbs/ft^2, and the other with a disk loading of 10 lbs/ft^2, the mathematical analysis predicts the rotorcraft with the lower disk loading will offer 8.4× longer flight time and 19 dB/SPL lower noise.

Figure 22:
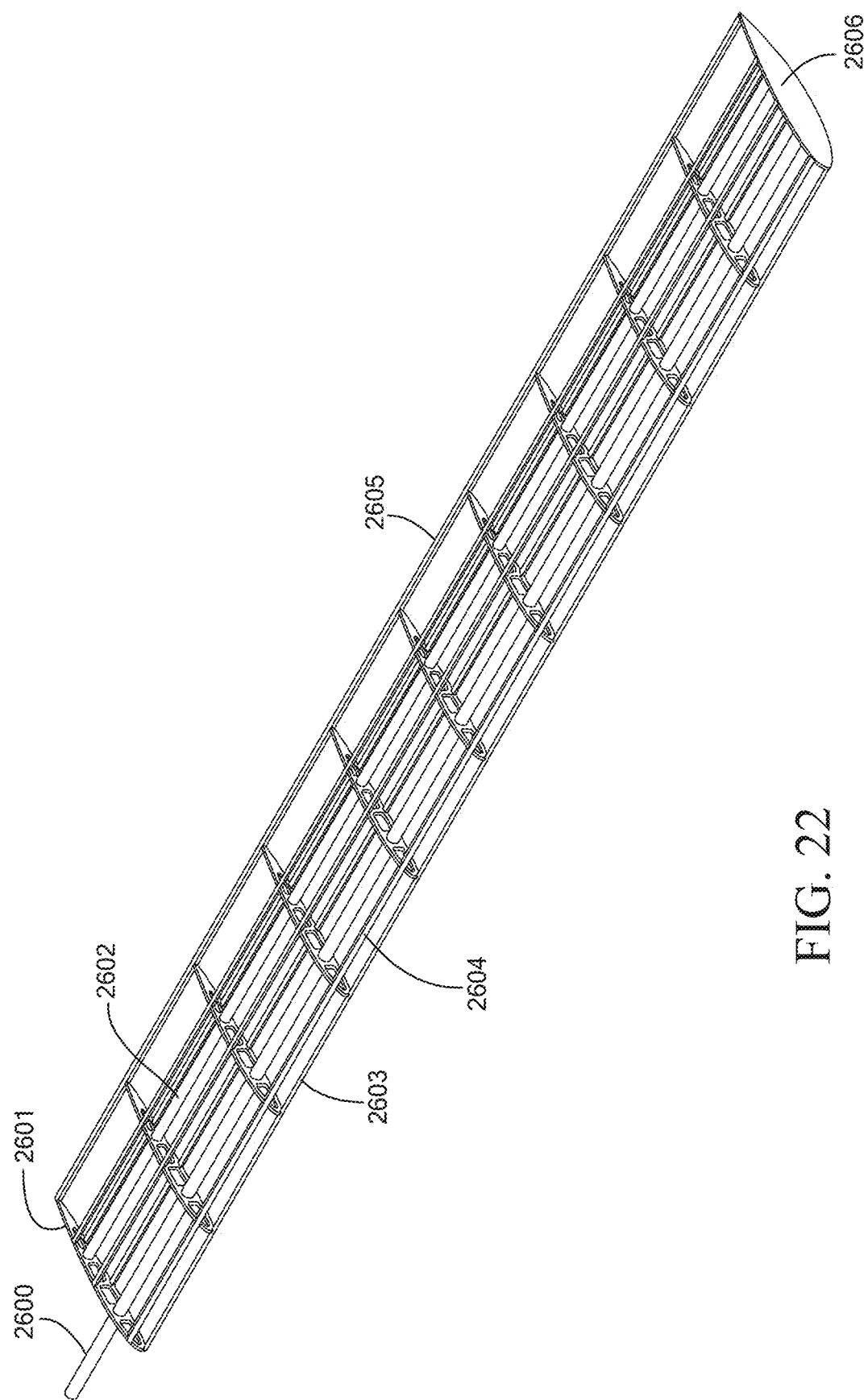
FIG. 22 depicts the space-frame structure of low-mass rotor blades in accordance with an embodiment of the present invention.

With low disk loading, rotor blade construction must accommodate the need for large spans and wide chords, albeit with reduced weight and structural load. Consequently, some embodiments of the present invention employ a space-frame design similar to an airplane wing. FIG. 22 depicts the space-frame structure of low-mass rotor blades in accordance with an embodiment of the present invention. The skeletal frame of these blades is covered with a thin plastic or fabric covering, such as Monokote. FIG. 22 depicts the internal skeletal structure of an exemplary space-frame rotor blade having a constant 162 mm chord, and a 1200 mm span in accordance with an embodiment of the present invention. Ribs 2601 with the desired airfoil profile are positioned at regular intervals along the span of the blade. For this embodiment, the eleven identical ribs 2601 are machined from PEEK plastic, though other embodiments utilize machined carbon-fiber sheet stock. Strength for the blade is principally derived from the primary spar 2600, and the secondary spar 2602, both made from carbon fiber tubing. The spars 2600, 2602, are attached to the ribs 2601 with epoxy. Thin and narrow carbon fiber stringers 2604, are then glued into the ribs 2601. The stringers 2604 help support the skin of the airfoil from sagging, though in this instance they also enhance the structural integrity of the wing. The leading edge for the wing 2603, is a carbon fiber tube glued to a slot in the leading edge of the ribs 2601. The trailing edge 2605 is formed with narrow carbon fiber material similar to the stringers 2604. An end cap 2606 is adhered to the last rib, providing protection for the end of the blade, while improving the aerodynamics.

The completed space-frame structure is skinned with a plastic material such as Monokote, or a fabric material such as Oratex. Both of these materials are specifically designed for model or manned aircraft construction. Once adhered to the frame, an iron or heat gun causes the skin material to shrink, creating a taut surface. The skeletal blades thus become rotating wings, looking less like traditional helicopter blades, which typically have solid construction. Such an approach has been used with success in other helicopters with very low disk loading, such as experimental human-powered helicopters.

For embodiments of the contra-rotating electric helicopter designed with higher disk loading, for example 1.0 pounds-per-square-foot or greater, the rotor blades are constructed using normal methods, such as a carbon fiber skin applied to an inner airfoil shape of lightweight foam. To reduce blade wear during flight, a protective metal leading edge is often applied.

Because the velocity of a rotor blade varies as a function of its position relative to the rotor hub, it has been known since the inception of rotorcraft design that blades with uniform chord and constant pitch-over-span (i.e., no "twist") are sub-optimal. Such blades have greater lift in the outer regions of the rotor, while having excessive span-wise flow due to centripetal force. That said, blades of uniform chord, without twist, are easier to construct, and hence an embodiment is described in connection with FIG. 6 that uses a common airfoil rib throughout the span of the blade, as well as spars of constant diameter and position along the chord. Other embodiments employ optimized blade designs, whereby the chord width, blade pitch, and airfoil profile all change as a function of radial position. Such embodiments improve rotor merit factor by as much as 7% relative to those with uniform blades without twist. Another consideration related to the choice of blade design is noise reduction. Certainly, reducing the tip velocity of the rotor is the primary determinant of noise, which comes naturally with the reduction of disk loading. A surprising physical fact is that rotor noise scales in proportion to the tip velocity to the sixth power. While this is the most critical design parameter, an understanding of the predominant sources of noise can provide insight into more subtle design refinements. For example, a key source of noise is the "blade vortex interaction," which occurs when a rotor blade repeatedly encounters the vortex of the blade that has swept the same area moments earlier. The vortex is caused by the spanwise flow off the end of the rotor blades, though such spanwise flow can be reduced by the application of sweep and anhedral to the outermost portion of the rotor blade shape. For helicopters operating in high-speed forward flight, the application of anhedral is minimized, as this can contribute to excessive aerodynamic drag. However, for some embodiments of the contra-rotating electric helicopter operating at low forward speeds, a substantial amount of anhedral is employed.

While the number of blades and blade area can vary with embodiment, a simple embodiment has two blades with shared cyclic control for the first rotor, and two fixed-pitch blades for the second rotor. Other embodiments can have a greater or lesser number of blades for the first and second rotors, and there is no requirement that both rotors have the same number of blades. The advantage of having a larger number of blades per rotor is the ability to further reduce the rotor tip speed, which results in a further reduction of both rotor noise and mechanical vibration. Disadvantages of increasing the number of blades include increased weight, increased parasitic drag, and increased mechanical complexity in the rotor hubs.

The physics of stacked rotor systems has been thoroughly studied by several research teams over the past century. In comparison to single-rotor helicopters having the same diameter, number of blades, and the same blade chord, contra-rotating helicopters have improved hovering efficiency by virtue of the fact that the lower rotor has increased mass flow compared with the upper rotor. This occurs due to the contraction of the flow of the first rotor, which entrains additional mass flow in an annular region around the perimeter of the lower rotor. While the stacked rotor design improves hovering efficiency, it has the detrimental effect of increased parasitic drag in forward flight, which requires greater total power once the advance ratio typically exceeds 0.15. The trade-off of hovering efficiency and parasitic drag can be somewhat adjusted through the choice of the rotor-to-rotor spacing. A spacing of 19% of the rotor radius has been reported to provide good results, both theoretically and experimentally. Many embodiments of the contra-rotating electric helicopter similarly benefit from such a spacing. For embodiments targeting hovering and slow-speed flight regimes, an increase in the spacing, for example 30% of the rotor radius, provides improved efficiency. For other embodiments intended primarily for high-speed flight, reduced spacing, for example 10% of the rotor radius, provides improved efficiency. An additional consideration for narrow spacing is the avoidance of rotor-to-rotor collisions. Depending upon the articulation of the rotor systems and blade construction, the limiting factor of rotor spacing may be mechanical rather than aerodynamic, as rotor collisions must be avoided as a basic safety principle.

Cyclic control is necessary to stabilize the contra-rotating electric helicopter in hover, and direct it during forward flight. While a traditional swashplate mechanism could achieve such a requirement and is incorporated in some embodiments, the inventor has disclosed a novel and simple cyclic control system ideally suited to many embodiments of the contra-rotating electric helicopter. In my Electric Cyclic Control Application (described above), the inventor describes a rotor system with a shaft shared between two rotor blades on either side of the rotor hub. Through limited-angle rotation of the shared shaft, cyclic control is applied to the feathering axis of the rotor blades. In various embodiments of the contra-rotating electric helicopter, the motor actuating the cyclic control is a stepper motor, limited-angle torque (LAT) motor or a brushless DC (BLDC) motor. In the latter case, the BLDC motor is advantageously powered through Field Oriented Control methods, resulting in an ability to hold the motor drive shaft in an arbitrary angular position.

Some embodiments of the contra-rotating electric helicopter include cyclic control in both the first and second rotor systems. For conventional contra-rotating helicopters, designs typically include collective and cyclic control of both the upper and lower rotors. However, for various embodiments of the novel contra-rotating electric helicopter of the present invention, one observes that the first rotor hub rotates within the frame of reference that advantageously includes the power source and likely the flight control computer, while the second rotor does not include power and other electronics. In embodiments that include cyclic control within the second rotor, a means to transfer power and signal between the first and second rotors is required, such as slip rings or a rotary transformer. As a simplification of the design, some embodiments of the second rotor are passive, having no cyclic control. The authority of the cyclic control is reduced in such embodiments, as the integrated center of thrust for the second rotor remains fixed, relying solely upon a shift in the integrated center of thrust for the first rotor to achieve attitude control. While rare, single-rotor cyclic control has been disclosed and reduced to practice in conventional contra-rotating helicopters. In 2001, Eugene Rock disclosed such a scheme, leading to the issuance of U.S. Pat. No. 6,886,777.

When single-rotor cyclic control is applied to the lower rotor, the interaction with the downwash from the upper rotor must be considered. In the instance of an upper rotor having blades of uniform chord, without twist, the inflow velocity through the upper rotor increases linearly with radial position. The consequence for the lower rotor is reducing the blade angle of attack for the outer portions of the rotor disk, which has the effect of reducing the cyclic authority. In some instances, the cyclic authority may be reduced to an extent that the helicopter cannot transition from hovering into sustained forward flight. To alleviate the issue, the upper rotor blades can be designed with taper, twist, or a combination thereof. The lower rotor blades in fact benefit from uniform chord, as the outer areas of the disk have increased lift relative to the inner areas, increasing the moment applied through the cyclic control.

For embodiments of the contra-rotating electric helicopter of a small scale, for example having a rotor diameter less than 3 meters, the rotor blades can be rigidly attached to the rotor hub, having only articulation along the feathering axis of the rotor blades, as necessary. With the appropriate choice of material and mechanical design, some degree of flexing will naturally occur in the rotation of the blades, relieving stress forces that could otherwise become unsafe. As the scale of the helicopter increases, however, the stress forces exerted upon rigidly attached blades, especially during forward flight, can increase to a degree that could cause structural failure. In traditional helicopter design, a number of mechanical solutions were developed to reduce the stress forces applied to the rotor hub, without severely reducing the rotor lift or cyclic control authority. For a two-bladed rotor, the classic and simple solution is a teetering hinge at the center of the rotor, allowing one blade to flap up, while the other blade flaps down. For example, in forward flight, the advancing blade achieves greater lift than the retreating blade, as a result of the dissymmetry of airspeed over the lifting surfaces. Consequently, with constant rotor blade pitch (neutral cyclic), the advancing blade of a teetering-hinge rotor would cause the advancing side of the rotor disk to lift relative to the retreating side. To moderate the flapping effect, by virtue of the pitch linkages between the blades and the swashplate, the angle-of-attack for the advancing blade is automatically reduced as the blade flaps upward, while the angle-of-attack for the retreating blade automatically increased as it flaps downward. The mechanical coupling of the flapping angle with blade incidence is commonly known as "Delta-3," named by rotorcraft pioneer Juan de la Cierva. More complex approaches to helicopter rotor design include fully articulated rotors, allowing individual blades to lead-and-lag, moving in the plane of rotation, while also flapping up-and-down. Articulation of the blades in the third axis of movement, the feathering axis, allows collective and cyclic input. Modern helicopters often have semi-rigid rotor heads, whereby flexures are carefully engineered to allow movement in the lead-lag and flapping axes, while maintaining control through the feathering axis. Various embodiments of the novel contra-rotating electric helicopter in accordance with the present invention incorporate rotors that employ each of the aforementioned mechanisms.

The rotating frame of reference for the cyclic control and flight control computer poses the unique challenge of synchronizing the cyclic response with the position of the rotor, lacking a fixed frame of reference afforded by a fuselage in many embodiments. In one embodiment of the contra-rotating electric helicopter, the flight control computer relies upon the input of a magnetometer within the same rotating frame, which senses magnetic field variation in the plane perpendicular to the axis of rotation. As one can rely upon the ever-present magnetic field of the earth, the magnetometer provides a sinusoidal response as a function of angular position, and hence serves as the source of synchronization information for the flight control computer implementing the required cyclic response. In the past, inertial sensors and magnetometers were large, heavy and expensive. Today, an inertial measurement unit with 6-axes of inertial sensing and 3-axes of magnetic sensing are available in a single MEMS-based chip that are integrated onboard the flight control computer. The entire flight control computer with 9-axis IMU typically costs less than US$200.

Using the 3-axis magnetometer periodicity about the Z-axis to synchronize the cyclic sinusoidal response provides a straightforward and cost-effective means of controlling the contra-rotating electric helicopter. However, there are potential situations that could cause this scheme to fail, including:

(1) failure of the magnetometer;
(2) unintentional magnetic interference; and
(3) intentional magnetic interference.

In such instances, other mechanisms can in some embodiments serve as back-up source of synchronization, and in other embodiments serve as the primary source of synchronization. To account for the first situation, some embodiments have a second magnetometer addresses the risk of failure, as the compound likelihood of two magnetometers failing simultaneously is very low. To account for the second and third situations, some embodiments incorporate other sensors including visible-light cameras, infrared cameras, LIDAR, or RADAR. In such embodiments, a repeating pattern of imagery provided by one or more such sensors rotating in the same rotating frame as the first rotor provides information to determine orientation relative to the ground, presuming the contra-rotating electric helicopter has distinct ground references, such as varied terrain, buildings and vegetation. Other benefits of incorporating such sensors include the ability to capture and interpret the imagery for surveillance, photography or mapping, as examples.

The novel architecture of the contra-rotating electric helicopter in accordance with embodiments of the present invention poses the unique circumstance of having two rotating frames of reference, with no necessary fixed frame of reference relative to the ground. As mentioned in the Summary, applications such as mapping do not necessarily require a fixed frame of reference, potentially benefiting from the continual panning of the horizon from the perspective of a centrally mounted sensor array. Since embodiments lacking a fixed frame of reference are the simplest to construct, we shall describe in detail variations of such an embodiment, having a total mass of approximately 3.6 kg, and a disk loading of approximately 0.14 lbs/ft^2. We will then consider five embodiments that create a stationary frame of reference through different means:

(1) Including a swivel at the base of the contra-rotating electric helicopter, along the axis of rotation of the first and second rotors, and attaching the swivel through a rope or similar means, to an object in a stationary frame of reference.
(2) Including a swivel at the base of the contra-rotating electric helicopter, attaching a fuselage below the swivel, and attaching an aerodynamically designed fin at the rear of the fuselage, such that the fuselage becomes naturally aligned with the forward direction of travel.
(3) As an elaboration on (2), allowing the fin to be articulated about a forward-backward axis such that the downdraft from the rotors moves the fuselage to a desired azimuthal orientation while in a hovering state.
(4) Including a gimbal-type motor at the base of the contra-rotating electric helicopter, along the axis of rotation of the first and second rotors, and connecting a rotating frame of reference to a fuselage frame having arbitrary azimuthal orientation.
(5) Including a gimbal-type motor/generator in the fuselage, along with a tail fin to align the fuselage during forward flight. Such configuration allows the gimbal motor to orient the azimuth of the fuselage during hover and slow-speed flight, while serving as a generator to recharge the local battery in the fuselage frame during high-speed flight.

Figure 23A:
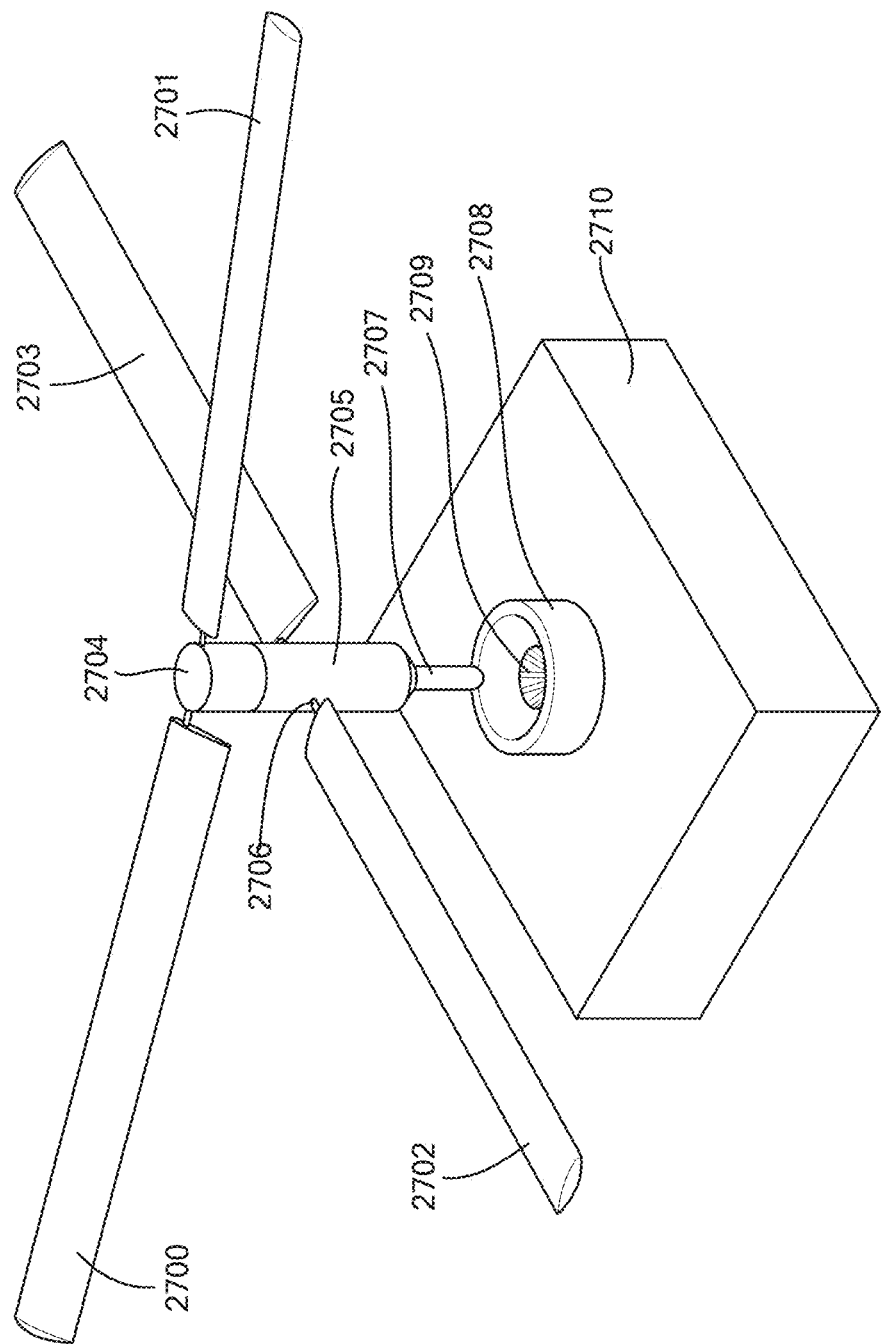
FIG. 23A is an isometric view of an exemplary contra-rotating electric helicopter, hovering over the launch base, in accordance with an embodiment of the present invention.

FIG. 23A is an isometric view of an exemplary contra-rotating electric helicopter, hovering over the launch base, in accordance with an embodiment of the present invention. FIG. 23A illustrates an embodiment of the contra-rotating electric helicopter of the present invention, without a fixed frame of reference. The first rotor includes rotor blades 2702 and 2703, articulated for cyclic control through the shared shaft 2706. Within the central cylinder 2705, all electrical components, drive motor, cyclic motor, and battery module are included. At the base of the central cylinder, a landing post 2707 projects downward. In flight, the blades 2702 and 2703, along with the central cylinder 2705 and landing post 2707 spin in counter-clockwise rotation. The second rotor, the upper rotor in this instance, includes the rotor hub 2704, with rotor blades 2700 and 2701. In contra-rotation with the first rotor, the second rotor spins in a clockwise direction. The choice of which rotor spins in which direction is completely arbitrary, as it has no effect on the aerodynamic performance.

The exemplary embodiment shown in FIG. 23A is unmanned, intended to operate as an autonomous vehicle from a terrestrial base of operations. To allow free contra-rotation of the upper and lower portions of the helicopter, the takeoff and landing base includes a set of roller bearings 2709, wherein the conical portion of the helicopter base nests against the bearings when in a landed position. The landing post 2707 at the bottom of the helicopter fits within a tube of the take-off and landing base 2708, preventing the helicopter from tipping over when not in operation. Upon the application of power to the drive motor of the helicopter, the upper and lower rotors begin to spin in contra-rotation, balancing the aerodynamic drag and friction forces to achieve a natural equilibrium. As sufficient power is applied such that the combined thrust of the upper and lower rotors exceeds the weight of the helicopter, the helicopter will gradually rise from the base 2710, sliding vertically until the bottom of the landing post 2707 clears the conical section 2708 of the take-off and landing base 2710. Referencing inertial sensors onboard the helicopter, the flight computer applies the necessary cyclic response to control the ascent of the helicopter, preventing unsafe lateral movement until well clear of the take-off and landing base.

Figure 17:
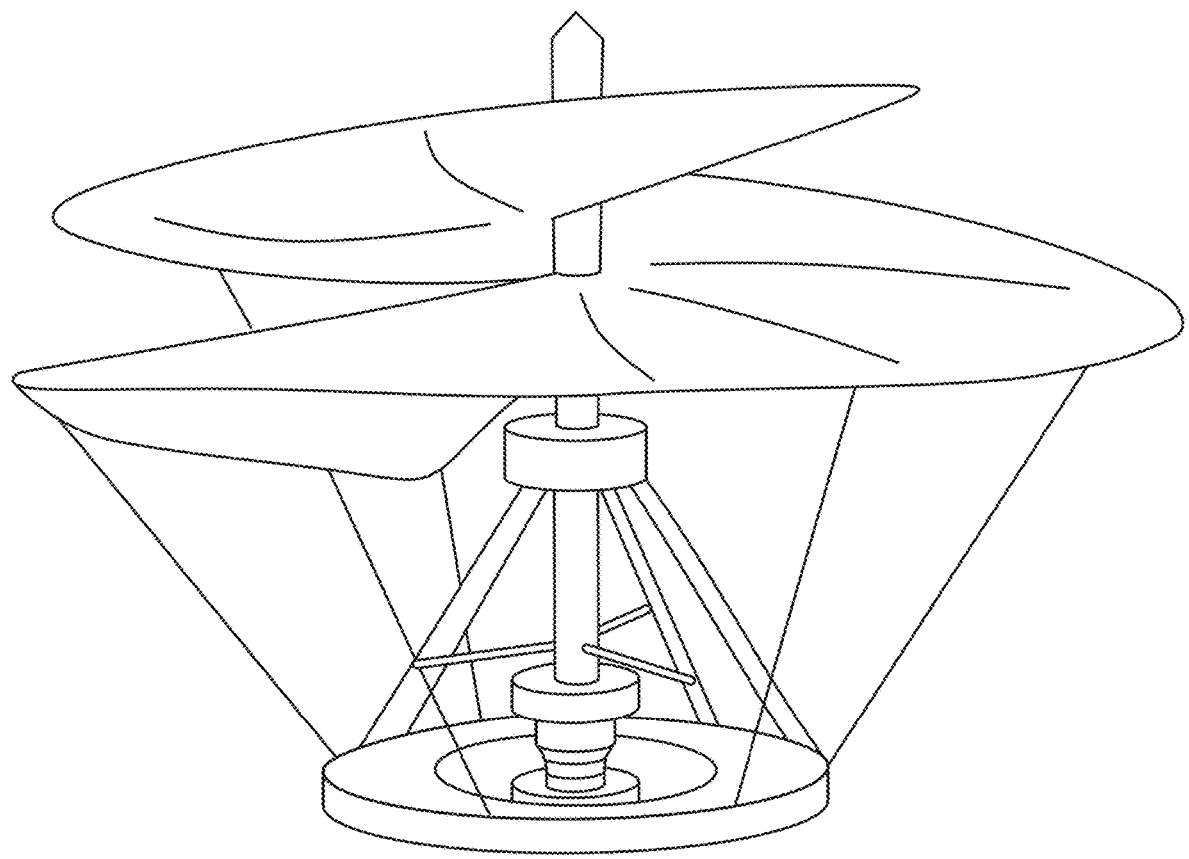
FIG. 17 is a line drawing of a sketch from Leonardo da Vinci's notebook, illustrating his conception of the "aerial screw," the first helicopter constructed to carry a human.
Figure 18:
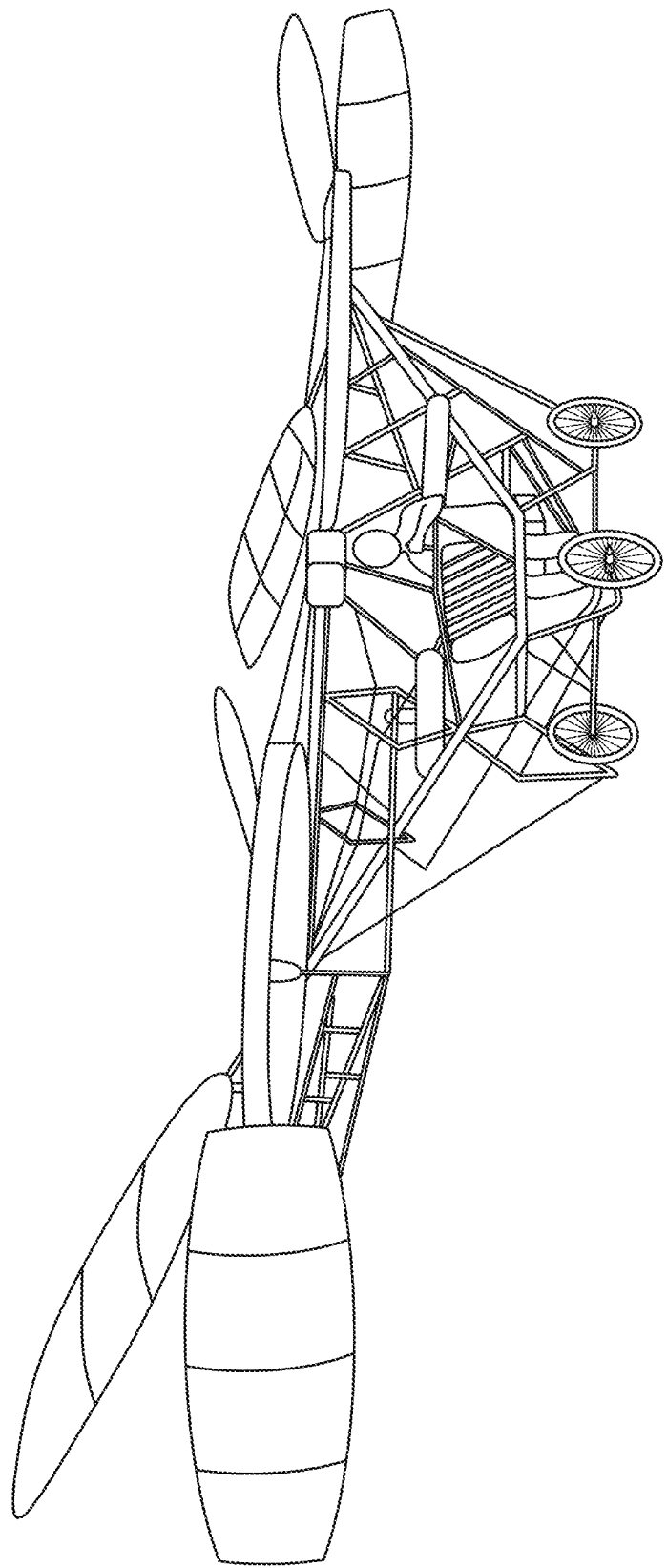
FIG. 18 is a line drawing of a photograph of Paul Cornu's Tandem Helicopter, shown with pilot onboard and ready to fly, in 1907.
Figure 19:
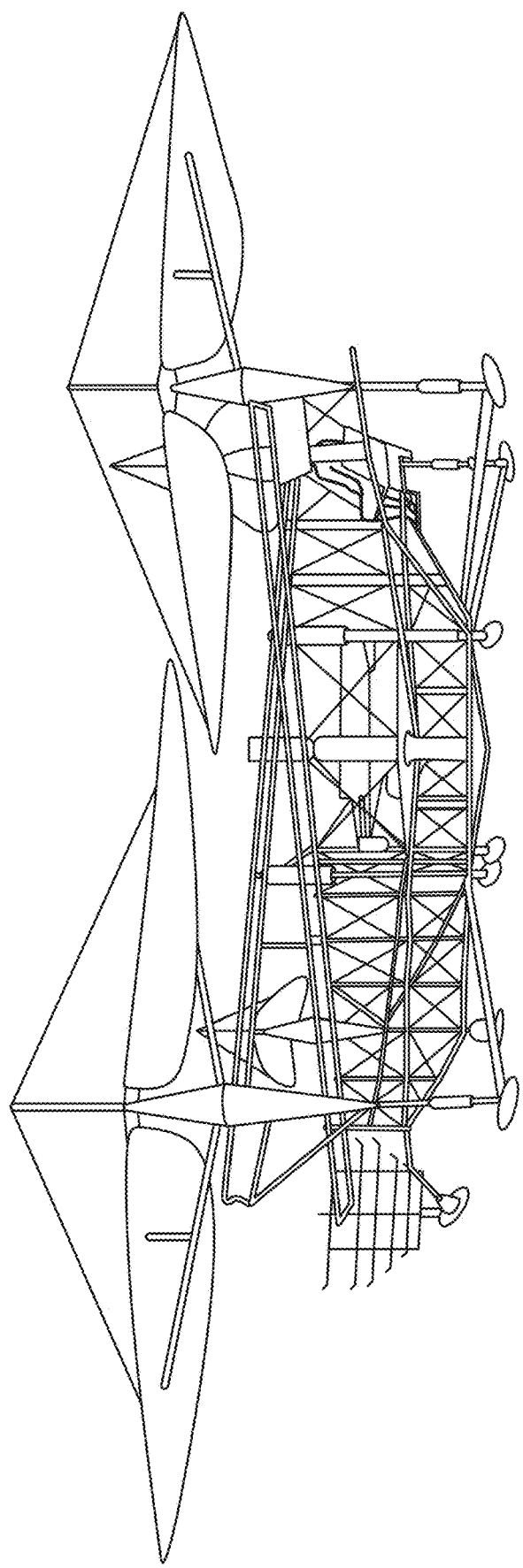
FIG. 19 is a line drawing of a photograph of Etienne Oehmichen's Quad-Rotor Helicopter flight, taking flight on May 8, 1924
Figure 20:
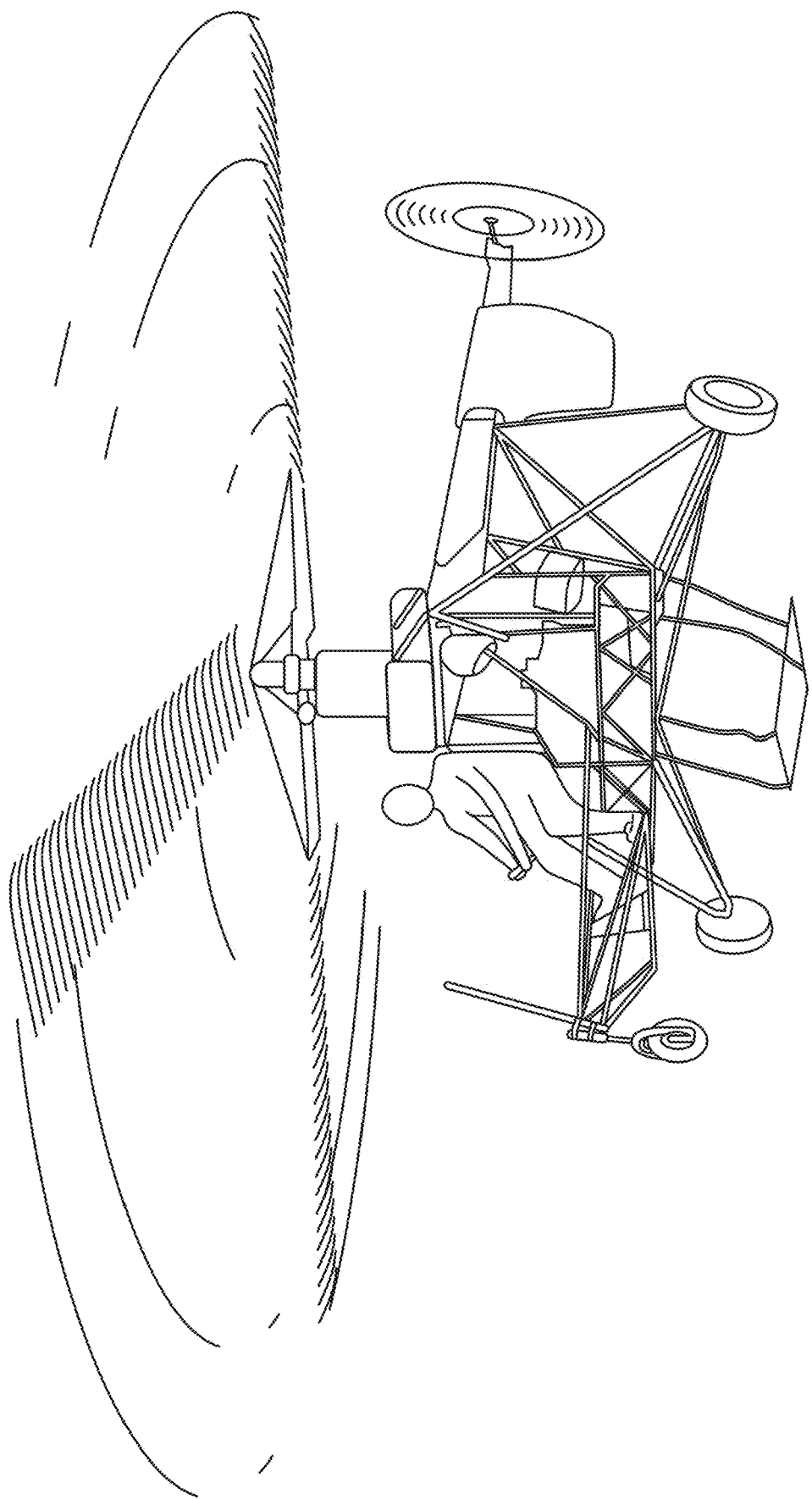
FIG. 20 is a line drawing of a photograph of Igor Sikorsky test flying his VS-300 Single-Rotor Helicopter, on Sep. 14, 1939.
Figure 23B:
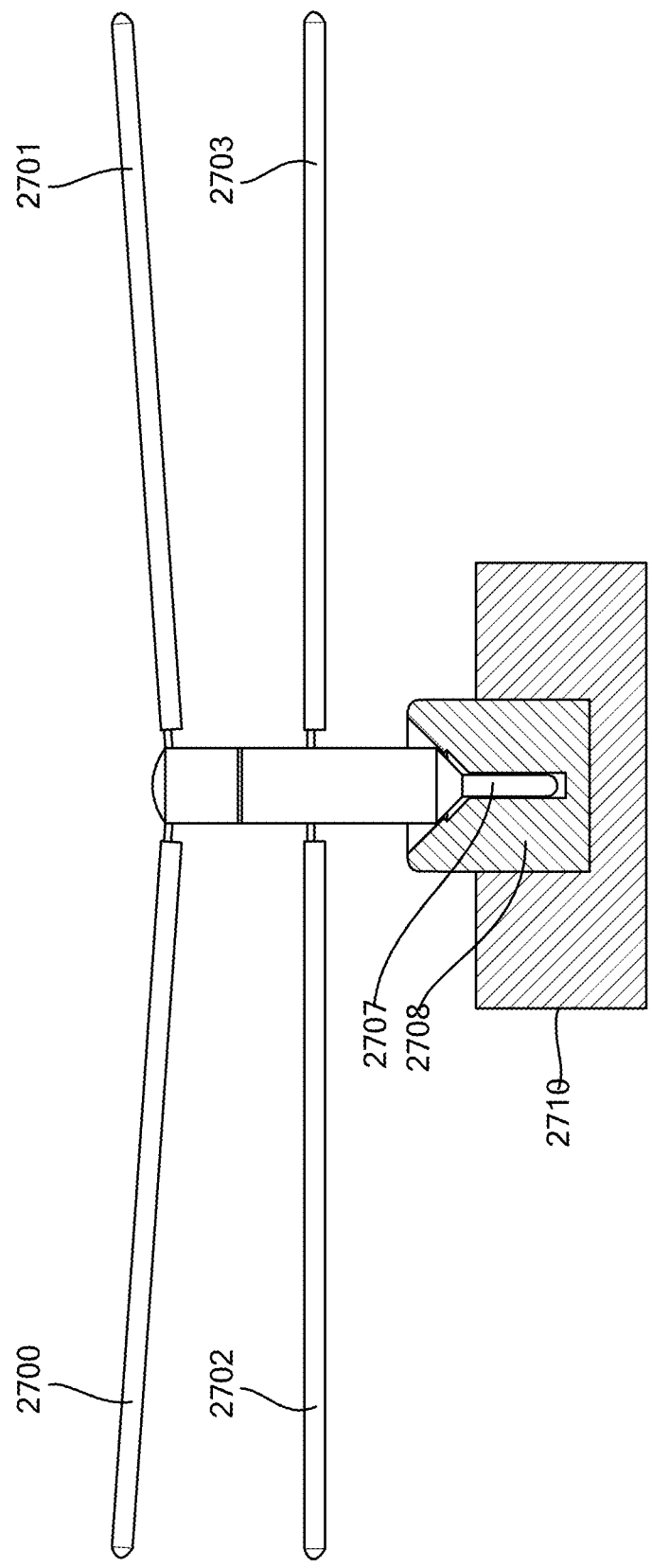
FIG. 23B is a side view of the exemplary contra-rotating electric helicopter of FIG. 1 and cross-sectional view of the launch base in accordance with an embodiment of the present invention.

FIG. 23B is a side view of the exemplary contra-rotating electric helicopter of FIG. 17 and cross-sectional view of the launch base in accordance with an embodiment of the present invention. The landing base 2710, illustrated in the FIG. 23B cross section, is specifically designed to accommodate landings of the exemplary contra-rotating electric helicopter. Using navigation methods such as augmented GPS, radar and video, a landing procedure begins by positioning the helicopter directly above the conical portion of the base. In slowly reducing rotor thrust to less than the weight of the helicopter, the aircraft will descend toward the landing base. Depending upon wind conditions, the axis of rotation for the helicopter may not be aligned with the vertical orientation of the orifice within the conical section 2708. However, the wide angle of the conical section 2708 allows the helicopter control system to place the landing post 2707 at the opening to the vertical orifice in 2708. Once laterally confining the landing post 2707, the helicopter control system can then apply cyclic to bring the axis of rotation vertical, since the force exerted by the wind can no longer cause lateral movement of the helicopter. Once the axis of rotation is essentially vertical, the helicopter controls reduce drive motor power, allowing the landing post 2707 to drop into the orifice in section 2708. In a fully descended position, the base of the helicopter comes to rest upon the roller bearings 2709 in the conical section 2708, which thus begin to spin. The spinning motion of the roller bearings 2709 prevent excessive wear to the based of the helicopter, which would otherwise occur through repeated takeoffs and landings. Once the helicopter rests upon the roller bearings 2709, rotor power is terminated, and personnel can approach the aircraft once the rotors have come to a stop. Ground operations, such as recharging of the helicopter batteries, can then commence.

The process of taking off during windy conditions follows a similar sequence, though in reverse. Upon the initiation of motor power, the rotors begin to turn in contra-rotation. In the early phase of takeoff, the reaching a point when the lift exceeds the helicopter weight, and the helicopter begins to rise from the launch base 2710. When the bottom on the landing post 2707 approaches the top of the orifice in section 2708, the helicopter begins to lean away from the direction of the incoming wind. The autonomous control of the helicopter then applies a counteracting cyclic response, causing the helicopter to lean into the wind. Once the wind force acting laterally upon the helicopter has been neutralized, the helicopter control system applies additional thrust to the drive motor such that it rises above the launch base 2710. When executed correctly, there is minimal lateral movement of the helicopter during ascent.

Figure 24:
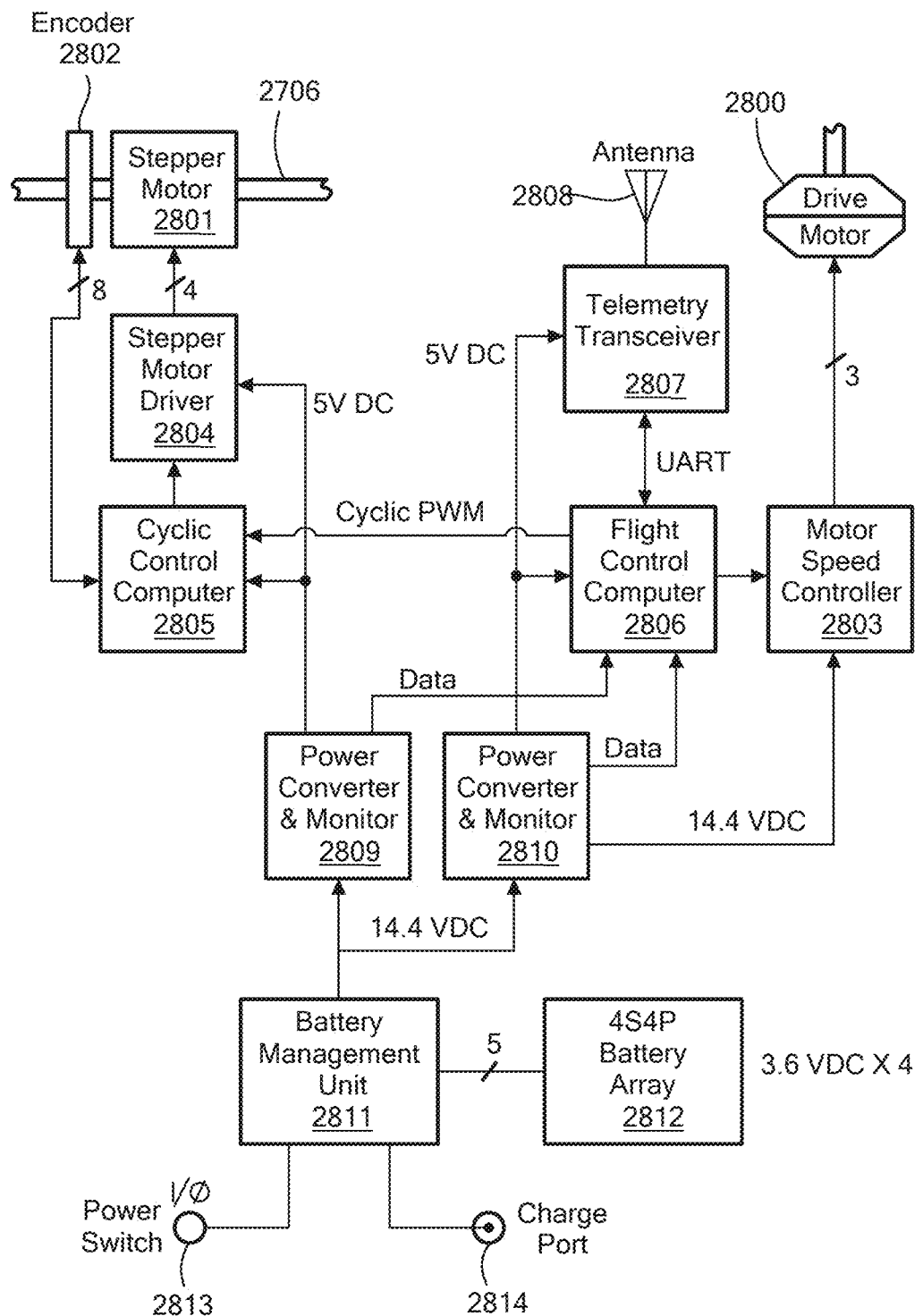
FIG. 24 is an illustrative electrical block diagram of major subsystems within the embodiment of the contra-rotating electric helicopter of FIG. 7A in accordance with an embodiment of the present invention.

FIG. 24 is an illustrative electrical block diagram of major subsystems within the embodiment of the contra-rotating electric helicopter illustrated in FIG. 23A. The exemplary helicopter is powered by an array of 16 lithium-ion batteries 2812, arranged as four cells in series, and four cells in parallel, producing a nominal potential of 14.4 volts. A battery management unit 2811 provides critical safety functions, such as preventing over charging, over discharging, and maintaining cell voltage balance. In this illustrative embodiment, the charging process occurs though the manual connection of an external charger to the charge port 2814. The power switch 2813 is moved to the "off" position for charging, removing power from the helicopter circuits, while coupling the battery array 2812 to the charge port 2814, through the supervision of battery management unit 2811. Once charging is complete, the charger is removed from charge port 2814, and the power switch 2813 is returned to the "on" position.

With power switch 2813 in the "on" position, power conversion and monitoring circuits 2809 and 2810 produce 5 volts, required to power the computers 2805 and 2806, transceiver 2807 and stepper motor driver 2804, while sensing current flow and providing this data to the flight control computer 2806. The flight control computer 2806 serves as the brain of the helicopter. While some embodiments operate fully autonomously, others receive commands from ground-based operations, using for example an onboard 900 MHz telemetry transceiver 2807 and antenna 2808. Like many modern flight control computers, some embodiments of the flight control computer 2806 include an accelerometer, gyroscope, and magnetometer within a single chip, with three-axes of data for each sub-system.

The flight control computer 2806 utilizes various sensor inputs to determine the drive motor 2800 speed or torque, and the cyclic shaft 2706 angle. The drive motor 2800 speed causes a monotonic increase in the integrated rotor thrust. The flight control computer 2806 signals changes in thrust by periodic commands to the motor speed controller 2803, which produces a change in the commutation voltages driving motor 2800. Many embodiments of the contra-rotating electric helicopter emulate a classic swashplate, whereby the angular motion of the cyclic motor 2801 follows a sinusoidal rhythm. In these cases, the flight control computer 2806 computes a cyclic phase angle and a cyclic amplitude. As the azimuthal position of the first rotor changes, flight control computer 2806 commands a changing cyclic shaft 2706 angle through a PWM signal to cyclic control computer 2805. The cyclic control computer 2805 remains aware of the cyclic shaft 2706 angle through feedback from encoder 2802. From the current state of the cyclic shaft 2706 angle, the cyclic control computer 2805 determines the movement required to achieve the commanded position from flight control computer 2806, signaling to stepper motor driver 2804 the necessary number of steps or fractional steps required of stepper motor 2801.

Some embodiments of the flight control computer 2806 use the Z-axis magnetometer sensor to synchronize the cyclic response to the azimuthal orientation of the helicopter. By analyzing the output signal from the magnetometer sensor at regular intervals, the flight control computer 2806 determines the orientation of the first (lower) rotor, which advantageously includes the cyclic mechanism. Determining the acceleration of the rotorcraft relative to the fixed frame of reference requires a first step of rotating the instantaneous acceleration measurements to account for the instantaneous orientation and angular acceleration of the rotorcraft. With rotorcraft acceleration estimates relative to azimuthal orientation and altitude, the flight control computer 2806 computes the required cyclic response and main drive motor 2800 throttle, to achieve attitude control. For a sinusoidal cyclic response, the shaft 2706 movement is described by an amplitude and a phase, as mentioned above. The phase in this case is a reference orientation within the azimuthal plane, such as magnetic North. In some embodiments, the cyclic response is periodic but not strictly sinusoidal, and in some such embodiments is encoded as the amplitude and phase of each of several harmonics. The main drive motor 2800 throttle is simply a scalar value that translates to a required angular velocity and power. As with other electrically-powered rotorcraft, many embodiments of the contra-rotating electric helicopter will utilize proportional-integral-derivative (PID) control methods. An excellent source of information regarding the tuning of the PID controls of several prior-art rotorcraft configurations can be found on the website: https://ardupilot.org/copter/docs/traditional-helicopter-tuning.html Tuning of the flight control firmware requires knowledge of the physics of the rotorcraft, and of the rotor system in particular. Traditional swashplate control requires a desired cyclic input to occur almost 90 degrees prior to the corresponding maximum blade pitch response, compensating for the effects of gyroscopic precession of the spinning rotor system. For a single-rotor helicopter, advancement of cyclic input is with respect to the direction of rotation. Gyroscopic precession is the result of angular momentum, and one must consider that angular momentum is a vector quantity, having both a magnitude and direction. The direction of angular momentum is the axis of rotation, though it can point in either direction of the axis, depending upon the direction of rotation. With the contra-rotating electric helicopter, however, we have what appears to be a cancellation of the angular momentum. If the angular momentum of the first and second rotor systems were identical, one might conclude that the phase lag would be eliminated, as the combined angular momentum of two identical rotors in contra-rotation at identical rotational speeds would cancel. In practice, realized embodiments of the contra-rotating electric helicopter will tend to have greater angular momentum in the first rotor, which includes the additional mass of the motor base and power source, presuming the aerodynamic and mechanical design achieves approximately equal and opposite rotational speed for the first and second rotors. Depending upon the disparity of the angular momentums and other details of the rotor system design, many embodiments of the contra-rotating electric helicopter will require a cyclic input to be applied 70 to 90 degrees in advance of the desired location of blade pitch response, with respect to the direction of rotation of the first rotor.

Figure 25:
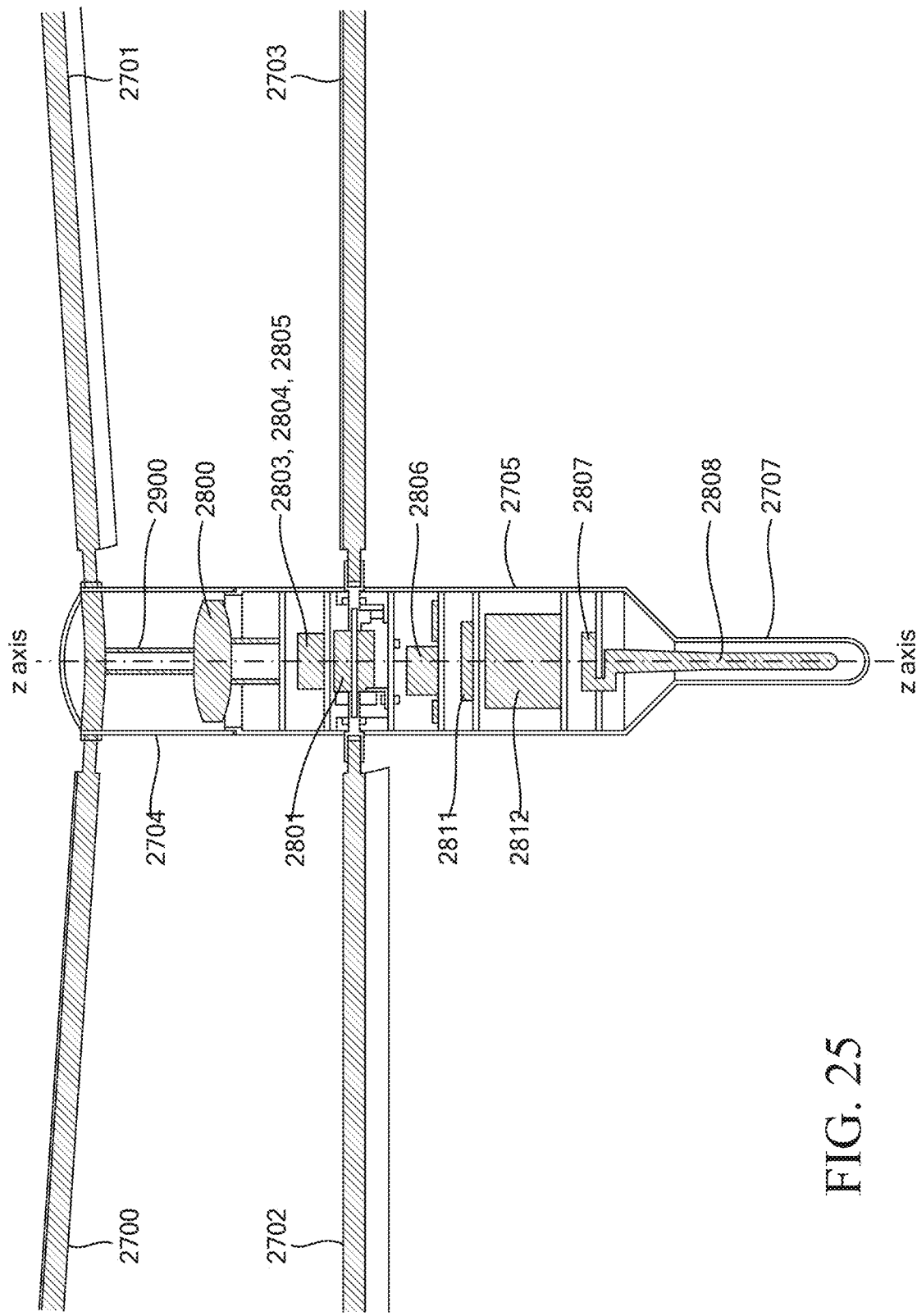
FIG. 25 is a view of a vertical section of a contra-rotating electric helicopter in in FIG. 7A illustrating placement of subsystems therein.

FIG. 25 is a cross-sectional view of the exemplary contra-rotating electric helicopter in FIG. 23A, illustrating placement of subsystems therein. One of the goals of the mechanical layout is to achieve a mass distribution such that the axis of rotation is as close as possible to the axis Z-Z through the center of the rotor hub, orthogonal to the plane of rotation. With such a mass distribution, the rotor hub 2704 and central cylinder 2705 will spin without wobbling and introducing undesirable mechanical stress. To simplify the design exercise, the inventor attempts to place the center of gravity for each vertical section of the helicopter as close as possible to the axis through the center of the rotor hub, orthogonal to the plane of rotation. In the launch peg 2707, at the base of the helicopter, the vertical dipole antenna 2808 for the telemetry transceiver 2807 is advantageously mounted. Because the antenna pattern for a vertical dipole antenna 2808 is uniform over azimuth, the antenna gain does not significantly vary as the lower section of the contra-rotating electric helicopter rotates. Mounted above the telemetry transceiver 2807 is the array of lithium-ion batteries 2812 that power the helicopter. The location of the battery array 2812 low in the helicopter helps to improve flight stability by positioning the center of gravity as far below the center of thrust as possible. With the center of gravity below the center of thrust, increasing the distance between the two points increases the stabilizing torque acting upon the rotorcraft. For this embodiment of the contra-rotating electric helicopter, a stepper motor with dual axles serves as the cyclic motor 2801. Avoiding the complexity of rotor hub hinges and flexures, the shafts for each blade 2702 and 2703 in the lower rotor are coplanar. Above the first rotor with cyclic control, the main drive motor 2800 is mounted. This motor includes vertical mounting spacers 2900, forming a lightweight driveshaft, such that the total distance between the upper and lower rotors is approximately 19% of the rotor radius. The upper rotor is passive for this embodiment. Without the need to articulate the two rotor blades 2700 and 2701 about their feathering axis, the upper rotor includes 2.5-degrees of coning angle, another feature to improve flight stability, while reducing the possibility of rotor-to-rotor collisions.

Figure 26:
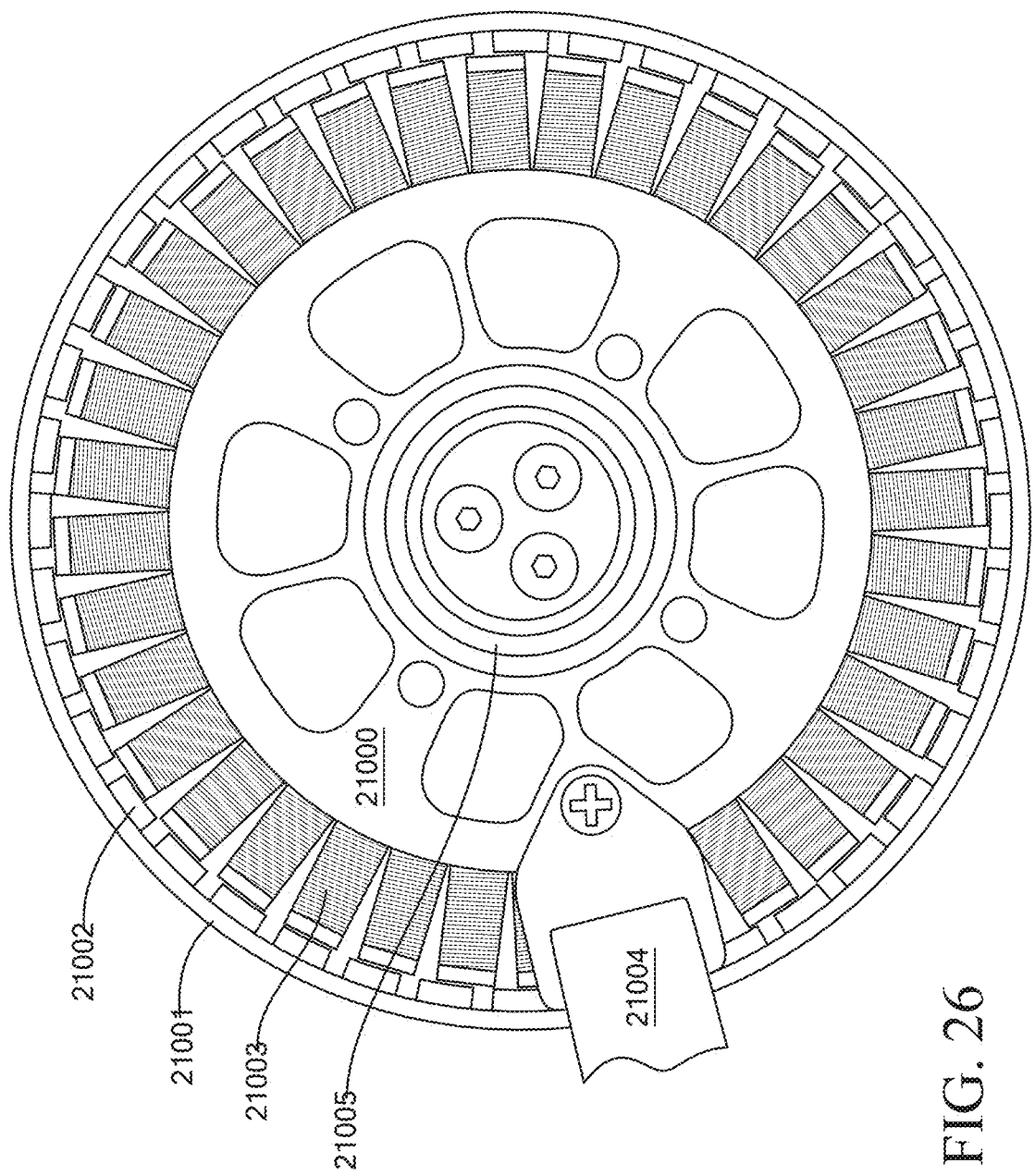
FIG. 26 is an axial view of an exemplary outrunner BLDC motor (here with with 36 armature coils and 42 permanent magnets) such as that suitable for drive motor 800 of FIGS. 8 and 9, in accordance with an embodiment of the present invention.

FIG. 26 is an axial view of an exemplary direct-drive BLDC motor, such as that suitable for drive motor 2800, shown in FIGS. 24 and 25, in accordance with an embodiment of the present invention. This BLDC motor operates as an "outrunner," meaning that the hub 21001, containing the magnets 21002, rotates about the stationary windings 21003 of the inner stator 21000. The windings 21003 are connected to form three phases, with the power cable 21004 exiting the stator 21000 on the lefthand side. To support direct-drive applications, the bearing 21005 is designed for both radial and axial loads. This particular motor has a 36N42P configuration, meaning that it includes 36 wire wound poles (N), and 42 permanent magnet poles (P). The ratio is derived from the popular 12N14P DLRK (Distributed-Lucas, Retzbach and Kuhfuss) configuration, offering high torque with smooth and quiet operation. The large number of poles translates to a low motor speed constant of 90 Kv (zero load angular speed of 90 revolutions per minute, per volt applied). The low motor speed constant makes this particular direct-drive motor well suited for the exemplary embodiment, as it can operate at a low RPM with adequate torque.

The choice of whether to incorporate a gear-reduction mechanism between the output shaft of the electric drive motor and the attachment to the second rotor depends upon the rotor diameter and disk loading (aircraft weight per swept rotor area) of a particular embodiment. Johnson and Silva, NASA Ames, analyzed the tradeoff for eVTOL designs by considering the power density as a function of rotor diameter. With a typical eVTOL rotor tip speed of 550 feet-per-second (Mach 0.5), they found that any rotor system larger than 4 feet in diameter could be reduced in weight with gear reduction, considering the tradeoff of the additional weight of the gear reduction mechanism versus the reduction in motor weight afforded through an increase in motor angular velocity. An additional consideration that Johnson and Silva did not analyze was the efficiency of an electric motor operating with or without gear reduction. As part of the development of contra-rotating electric helicopter embodiments, the inventor studied this particular issue with significant results.

Multiple embodiments of the contra-rotating electric helicopter have a rotor diameter of 8.7 feet, and a disk loading of approximately 0.14 lbs./ft^2. As described in the preceding paragraphs, an embodiment of the contra-rotating electric helicopter utilizes the direct-drive motor shown in FIG. 26. With only the rotor of the motor as a moving part, direct-drive designs are desirable for their simplicity, low noise, and high reliability. Having concerns for total mass and electrical efficiency, however, the inventor analyzed embodiments utilizing geared motors. The direct drive motor was compared with a derivative of a 6:1 gear-reduced BLDC robotic actuator, invented by Benjamin Katz at MIT in 2018. The outrunner BLDC motor in FIG. 26 is intended for large quad-copter and multi-copter drone applications, with direct drive to fixed-pitch rotors. In contrast, the Katz gear-reduced actuator is specifically designed for robotic applications, combining a motor, planetary gearbox, motor driver, control computer and CAN-bus interface in a compact package. These actuators emerged as an enabling technology in recent research demonstrating robotic power and agility similar to animals, such as the MIT "Mini Cheetah" project.

Figure 27:
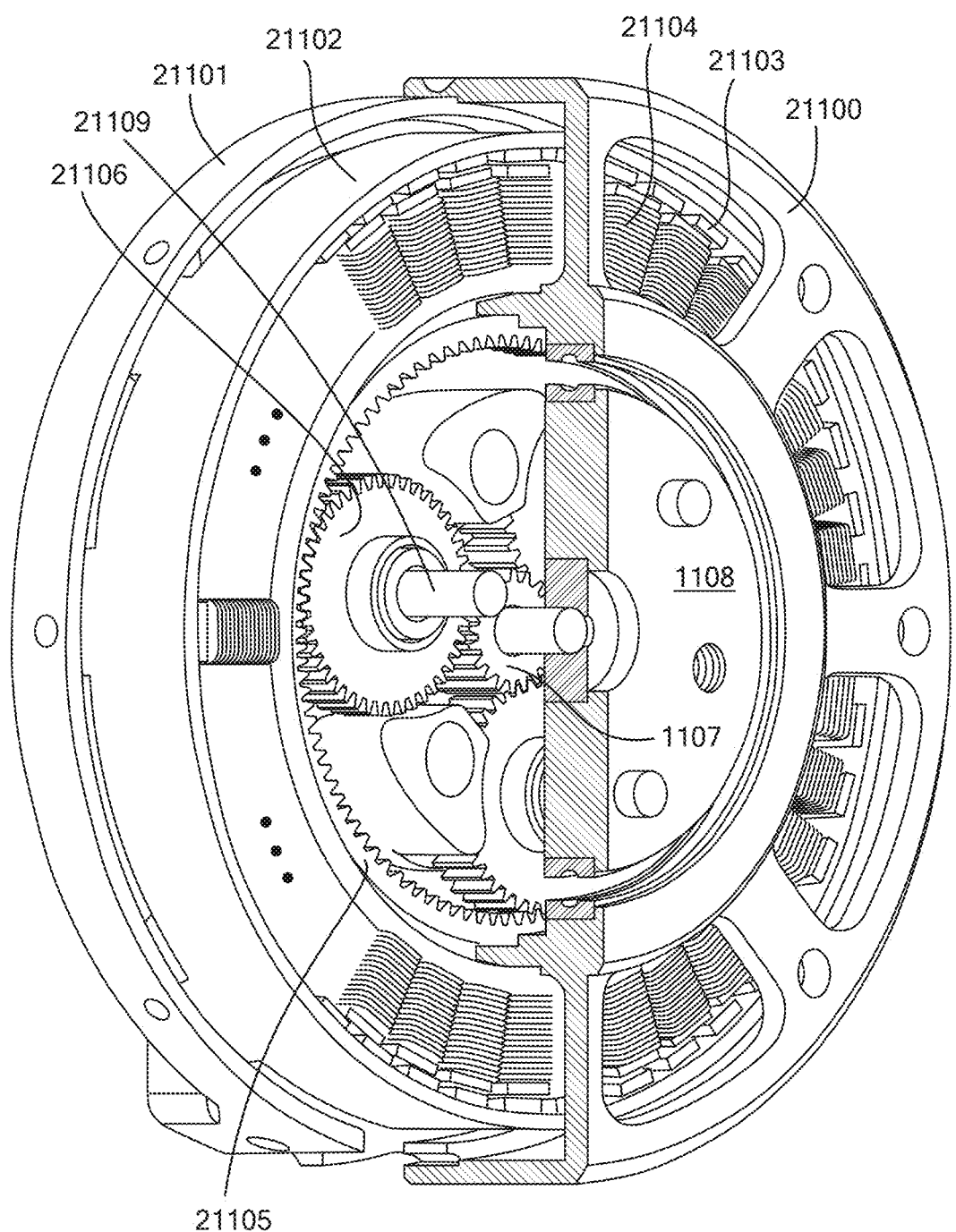
FIG. 27 is a perspective cut-away view of a robotic actuator combining an outrunner motor, planetary gearbox, motor controller, and central processor with CAN-bus interface in accordance with an embodiment of the present invention.

FIG. 27 is a perspective cut-away view of a robotic actuator combining an outrunner motor, planetary gearbox, motor controller, and central processor with CAN-bus interface, in accordance with an embodiment of the present invention. In this case, FIG. 27 is the actuator described in Katz' Masters Thesis. The prototype actuator was developed by modifying an off-the-shelf BLDC motor, inserting a planetary gearbox in the central volume normally occupied by the stator support structure. The case of the actuator includes the front cover 21100, and the back cover 21101.

The rotor 21102 has 42 permanent magnets 21103 mounted around the periphery. The stator has 36 wire wound poles 21104. As with the prior example in FIG. 26, the motor configuration is a multiple of the popular DLRK configuration. The ring gear 21105 is affixed to the front cover 21100, remaining stationary, while the sun gear 21107 and planet gears 21106 turn. The rotor 21102 is attached to the sun gear 21107, which drive the planet gears 21106. The output pins 21109, at the center of the planet gears 21106, cause the planet carrier 21108 to turn. The actuator output is the external surface of the planet carrier 21108.

Jiangxi Xintuo Enterprise Co., Ltd, a Chinese component manufacturer doing business as "CubeMars," licensed the design of the Katz actuator from MIT, and they began producing a line of actuators based upon this architecture. The particular actuator utilized in the exemplary embodiment is the AK60-6 KV140 model. The BLDC motor inside this actuator operates with a rated speed of 2400 RPM, limited by the internal 24V motor speed controller, which translates to an output speed of 400 RPM. With the rated torque of 3 Nm, the actuator has a power density of 395 W/kg (0.24 hp/lb). Though the power density is modest compared with other modern BLDC motors, the actuator includes the motor driver, gear reduction, processor and CAN-bus interface. By comparison, the higher speed BLDC motor in FIG. 26 offers an incredible power density of 3.6 kW/KW (2.2 hp/lb), more than 9 times greater than the actuator in FIG. 27. Upon cursory examination, one might conclude that the direct-drive motor from FIG. 26 is the obvious motor of choice. However, the exemplary embodiment of the contra-rotating helicopter requires high torque at low rotor speed, which skews the results in a surprising way.

The direct-drive BLDC outrunner motor in FIG. 26 has a mass of 280 g, and requires an electronic speed control module with an additional mass of 63 g, for a combined mass of 343 g. This motor operates with an efficiency of 52% in the helicopter embodiment, requiring 44% of the stalled-motor torque to allow hovering. The inventor took note that this torque is far beyond the highest operating efficiency torque, which occurs at 12.6% of the stalled-motor torque. The actuator in FIG. 27 has a mass of 315 g, and operates at an efficiency of 72% in the helicopter embodiment, including the loss from the gear reduction mechanism. With the benefit of gear reduction, the actuator operates at 7.6% of the stalled-motor torque, which is close to the highest efficiency torque setting of 11.7% of the stalled-motor torque.

As Johnson and Silva's analysis would suggest, the exemplary 8.7-foot rotor system indeed benefits from a weight perspective using a gear-reduced motor, shaving 8% off the combined motor and drive mass. More striking, however, is the improvement in motor efficiency, jumping from 52% to 72%, an increase of 38%. The flight time of the contra-rotating electric helicopter can thus improve by 39%, with most of the gain resulting from improved motor efficiency. The impact of the mass reduction is negligible, since the electric motor and drive are less than 10% of the total rotorcraft mass. Thus observed, while an electric motor has a virtually constant torque capability as a function of angular velocity, it is important to operate the motor near its point of optimal efficiency, else precious flight time will be lost to heating within the motor.

Utilizing the AK60-6 actuator as the drive motor, a refined embodiment of the contra-rotating electric helicopter, without a fixed frame of reference, is analyzed in FIG. 28, which is a tabular summary of the calculated performance of an exemplary contra-rotating electric helicopter in accordance with an embodiment of the present invention. The batteries are presumed to have the currently available lithium-ion energy density of 265 Wh/kg. Designed with a disk loading of 0.14 lbs/ft^2, and a battery module mass equal to 39% of the total helicopter mass, the exemplary embodiment has a hovering flight endurance of 2.6 hours, and a cruising flight endurance of 3.7 hours at 12 mph. In comparison, the commercially successful DJI Mavic 2 Pro quad-copter drone, with a battery module mass fraction of 33%, has a maximum hovering time of 29 minutes, and a maximum flight time of 31 minutes.

Figure 29:
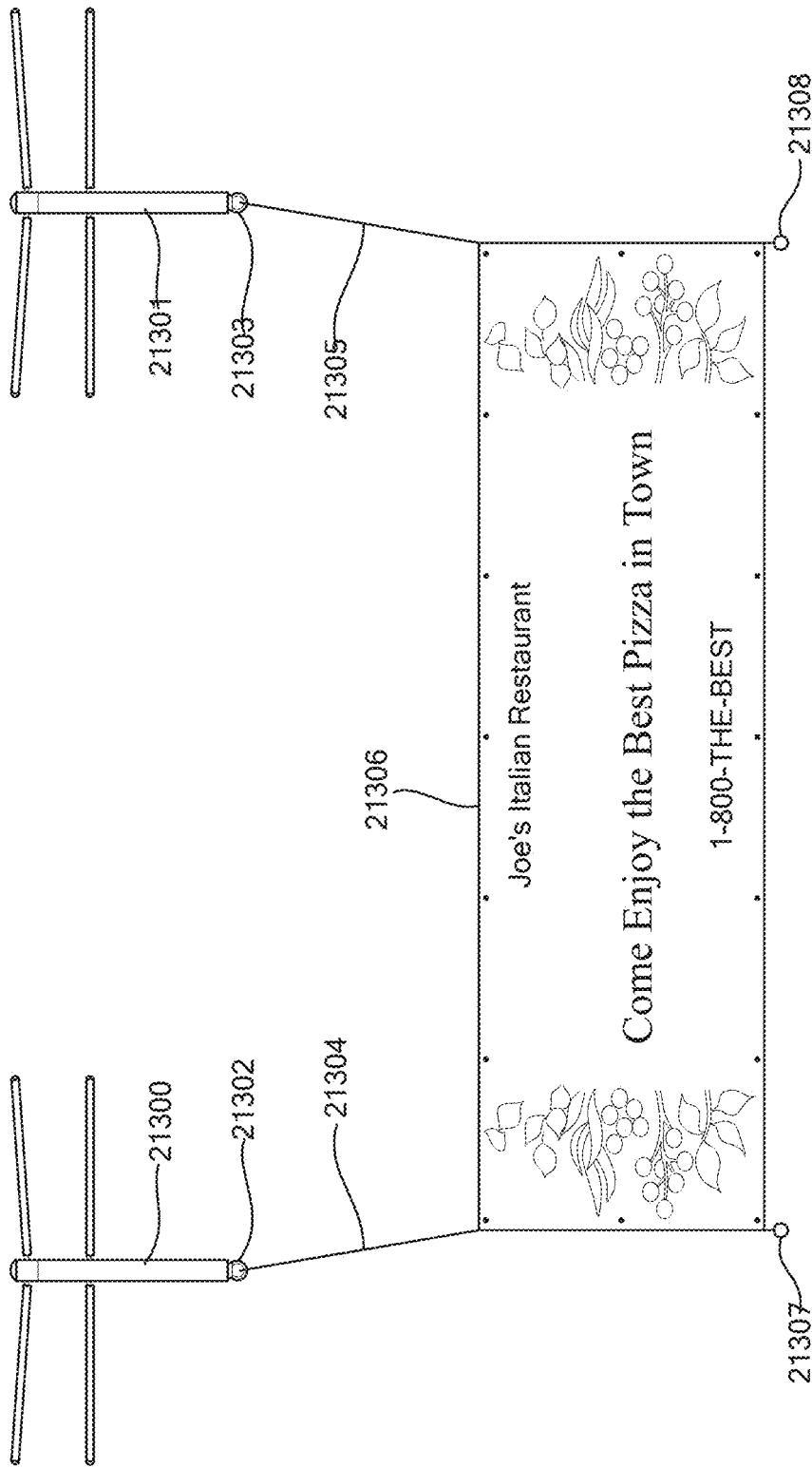
FIG. 29 is a perspective view showing a pair of exemplary contra-rotating electric helicopters, each with a swivel joint at the base, configured to support an aerial advertisement banner, in accordance with an embodiment of the present invention.

Having considered embodiments of the contra-rotating electric helicopter without a fixed frame of reference, we now turn our attention to five different architectures to augment the basic design of the contra-rotating electric helicopter with a fixed frame of reference. The first of these embodiments is exemplified in FIG. 29, which is a perspective view showing a pair of exemplary contra-rotating electric helicopters, each with a swivel joint at the base, configured to support an aerial advertisement banner, in accordance with an embodiment of the present invention. A potentially profitable application for the contra-rotating electric helicopter is aerial advertising. Traditionally, aerial advertising involves pulling a banner behind an airplane or helicopter, or a branded airship which may include animated lighting displays. In all cases, the aircraft are manned by human pilots, and the total operating costs are substantial relative to the advertising revenue generated. By replacing a human-piloted aircraft with autonomous aircraft having lower operating costs, the contra-rotating electric helicopter offers the opportunity to both expand the profitability and overall market size for aerial advertising. Moreover, the low noise signature for the contra-rotating electric helicopter allows the aircraft to fly at lower altitudes, improving advertising visibility and enabling micro-targeting of advertising messages. In FIG. 29, the pair of contra-rotating electric helicopters 21300 and 21301 may, as an example, hold the banner 21306 in a fixed position over a large public gathering, hovering for an extended period of time. While the lower and upper rotors of each helicopter continue to spin in contra-rotation throughout flight, the exemplary embodiment includes passive swivel joints 21302 and 21303 at the base of each helicopter. These swivel joints include ball-bearings arranged in a manner allowing the joint to spin freely, even under the load of the tethers 21304 and 21305, the suspended banner 21306, and the banner weights 21307 and 21308. Because the banner 21306 is held taut by a slightly outward cyclic response of the helicopter pair, the swivel joints 21302 and 21303 tends to remain in a stationary position relative to the banner 21306. Thus, FIG. 29 illustrates a case of creating a stationary frame of reference by attaching a swivel joint to a fixed object.

Figure 30A:
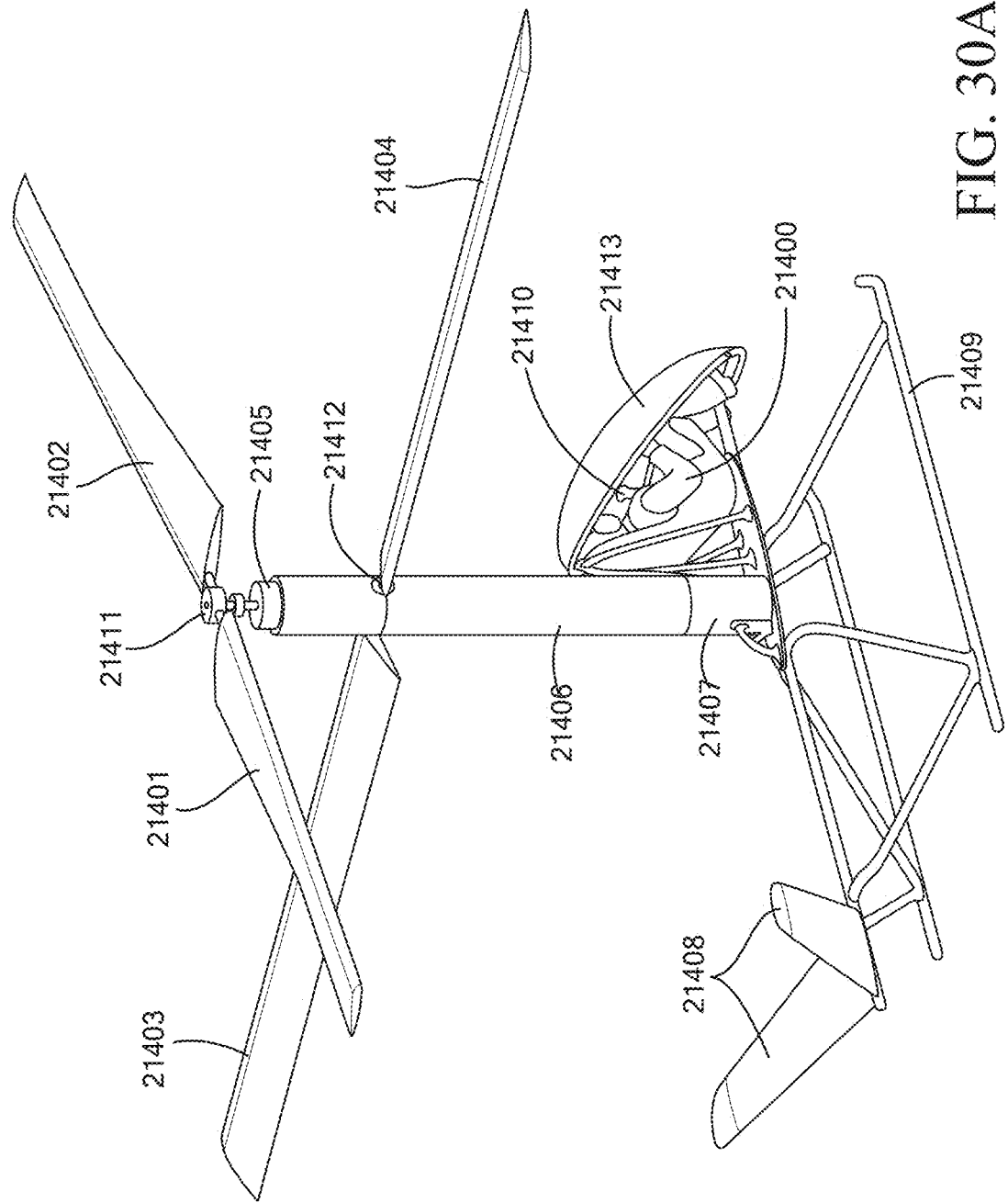
FIGS. 30A and 30B illustrate an exemplary FAA Part 103 ultralight contra-rotating electric helicopter, including rotory bearing and stabilizer fin, allowing the fuselage to remain forward facing during flight in accordance with an embodiment of the present invention.
Figure 30B:
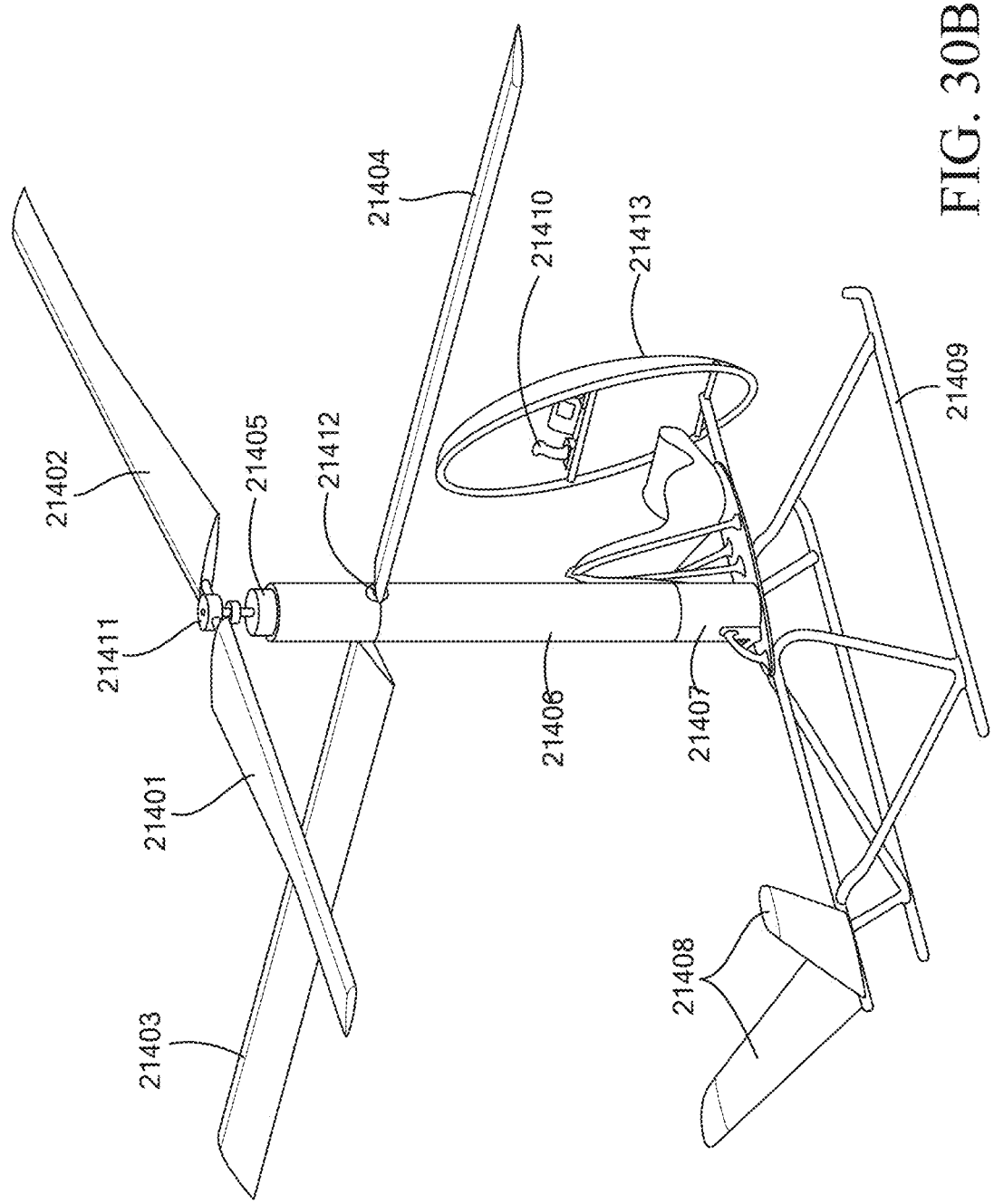

FIGS. 30A and 30B illustrate an exemplary FAA Part 103 ultralight contra-rotating electric helicopter, including rotory bearing and stabilizer fin, allowing the fuselage to remain forward facing during flight, in accordance with an embodiment of the present invention. This embodiment satisfies the US FAA 14 CFR Part 103 requirements as a single-person piloted ultralight aircraft. FIG. 30A illustrates the contra-rotating helicopter with a pilot 21400 onboard, and the canopy 21413 closed for flight. FIG. 30B illustrates the contra-rotating helicopter without the pilot onboard, and with the canopy 21413 open. As shown, the flight controls and instrument cluster are attached to the canopy 21413, easing the pilot ingress and egress. The total empty weight of the exemplary embodiment is 240 pounds, slightly less than the regulatory limit of 254 pounds. Within the lower portion of central cylinder 21406, a battery module composed of lithium-ion batteries, with a total weight of 120 pounds, serves as the power source. As with previously described embodiments, cyclic control is applied to the lower rotor, with blades 21403 and 21404 sharing a common cyclic shaft 21412, while the upper rotor hub 21411, coupled with blades 21401 and 21402, is passive. Both rotors have a diameter of 23.7 feet. For analysis, the pilot 21400 is presumed to weigh 200 pounds. Thus, the exemplary embodiment has a disk loading of 1.0 pounds-per-square-foot. Designed to achieve a rotor merit factor of 80%, the resulting hover power is 10.8 kW. With a cruise speed of 36 mph (55 knots maximum speed limit, per US FAA Part 103), the exemplary helicopter can sustain flight for 74 minutes, covering a distance of 44 miles.

The upper rotor, composed of rotor blades 21401 and 21402, turns in a counter-clockwise direction, powered by electric drive motor 21405. As previously described, this embodiment of the contra-rotating electric helicopter adopts a tapered planform for the upper rotor blades, as this reduces the detrimental effect of the downwash on cyclic authority provided by the lower rotor. The lower rotor, which includes the central cylinder 21406, turns in clockwise direction, driven by the counter-torque coupled through the base of electric drive motor 21405. The lower rotor blades 21403 and 21404 are designed with a constant chord, in contrast to the tapered planform of the upper rotor blades.

As with prior embodiments, all components necessary to produce thrust and cyclic control are contained within the rotating central cylinder 21406. These components include the main drive motor 21405, cyclic mechanism, motor drivers, flight control computer, power management subsystems, and battery modules. A short-range wireless link is established between a telemetry transceiver in 21406 and a telemetry transceiver contained within the fuselage central section 21407. An auxiliary battery system within 21407 provides the power for the flight controls, including throttle 21410, onboard avionics, short-range telemetry transceiver, running lights, and other electronics. The pilot 21400 has flight controls, which are coupled to the electronics within 21407, relaying the commands to the flight control computer contained with the central cylinder 21406.

At the base of the central cylinder 21406, the embodiment in FIGS. 30A and 30B includes a passive swivel joint, coupling the central cylinder 21406 with the fuselage central section 21407. The swivel joint is designed with a pair of conical roller bearings, similar to the wheel of an automobile, which allows it to support both lateral and axial loads, with minimal friction and wear. Thus, while the fuselage central section 21407 and coupled fuselage components are supported by the thrust produced by the rotor systems, the fuselage can rotate freely around the axis of the bearing, aligning itself based upon a combination of the aerodynamic and gravity forces acting upon it.

The center of gravity for the contra-rotating electric helicopter in FIG. 30A is set forward of the central cylinder 21406, influenced by the weight of the pilot 21400. During the takeoff phase of flight, cyclic must be applied, increasing the thrust on the forward portion of the rotor disk, to allow the helicopter to achieve a stable hovering condition. As the cyclic moves toward a neutral position, the helicopter begins to pitch forward, due to the moment of the center-of-gravity. Pitching forward causes the rotors to produce a forward thrust, in addition to vertical lift, and the helicopter begins to transition from a hovering state to forward flight. During the early transition to forward flight, the front of the rotor disks experience greater lift than the rear portion of the disks, owing to a higher angle of attack for the rotors passing through air without an induced vertical velocity. Depending upon the center of gravity and other conditions, the middle portion of transition to forward flight may require cyclic from the rear of the disk. Eventually, the entire rotor disk is receiving fresh air, and the thrust efficiency improves relative to hovering flight. With the advantageous position of the center-of-gravity, the attitude of the helicopter at the cruising speed reaches a trimmed condition with minimal fore-aft cyclic.

The V-tail 21408 serves two aerodynamic purposes. The projected vertical surfaces align the fuselage with respect to the direction of flight. While the forward position of the center of gravity provides a natural alignment, the V-tail greatly augments this effect. To the extent that the fuselage wanders in azimuth (yaw), the V-tail 21408 experiences a lateral force, which creates a moment to bring the overall fuselage back into alignment with the forward air velocity. The second purpose of the V-tail 21408 is to prevent undue pitching during cruising flight, lessening the need for continual cyclic stabilization. In this instance, the projected horizontal surfaces have an incidence angle chosen to align with the required fuselage pitch angle at the cruising speed. To the extent that the pitching angle differs from the aligned direction of the projected horizontal tail surfaces, an aerodynamic force and resulting moment tend to adjust the pitch attitude as necessary. Thus, the V-tail 21408 provides forward flight stabilization, both in yaw and pitch.

With the goal of minimizing the fuselage weight, while maximizing its strength, the frame of the fuselage is constructed from carbon fiber tubing, such as the skid 21409. The carbon fiber is joined with epoxy to anodized aluminum junctions. Windshield 21413 is constructed of thin polycarbonate, strengthened with a carbon fiber frame around the perimeter. With weight as a critical factor, the ultralight Part 103 helicopter embodiment in FIGS. 30A and 30B does not include other covered surfaces.

The upper rotor hub 21411 embodies innovations described by the inventor in his previous "Rotor System for Electrically Powered Rotorcraft," referenced above. These innovations include a spring actuated mechanism which reduces the incidence angle of rotor blades 21401 and 21402, when the applied torque of electric drive motor 21405 drops below a threshold value. This automatic mechanism ensures that the contra-rotating electric helicopter will immediately enter a state of autorotative descent upon the loss of power from electric drive motor 21405. In the absence of such a mechanism, rotor blades 21401 and 21402, having a nominal operating incidence angle of 12 degrees, would not sustain autorotation, as the driving portion of the rotor disk would generate insufficient power to balance the power consumed by the driven portion, resulting in a catastrophic loss of rotor speed and lift.

The upper rotor hub 21411 couples with rotor blades 21401 and 21402 through a teetering hinge, said hinge vertically offset to account for the preconing angle of 2.5 degrees. The incidence angles of the blades 21401 and 21402 are adjusted through linkages that couple both the teetering (flapping) angle and the aforementioned spring actuated mechanism. The coupling of the teetering angle, commonly known as Delta-3, results in the incidence angle of the lifted blade being reduced, while the incidence angle of the lowered blade being increased. Concurrently, the spring actuated mechanism reduces the blade incidence of both blades by approximately 12 degrees upon a loss of drive power from electric motor 21405. Thus, whether the blades have the nominal operating incidence angle of 12 degrees, or the nominal autorotative incidence angle of 0 degrees, the Delta-3 coupling remains effective.

The Delta-3 coupling of upper rotor hub 21411 has the effect of reducing the dissymmetry of lift during forward flight, as the lift of the advancing side of the rotor becomes less pronounced relative to the lift of the retreating side. For single-rotor helicopters, Delta-3 is an essential requirement. For the contra-rotating electric helicopter depicted in FIGS. 30A and 30B, the advancing side of the upper rotor is on the right, while the advancing side of the lower rotor is on the left, effectively balancing the dissymmetry of lift in forward flight. As published research has shown, operating with "lift offset" in a contra-rotating helicopter actually improves the rotor efficiency. However, the improved efficiency comes with a price, namely a pronounced increase in vibration, and a risk of mechanical failure. Hence, the application of Delta-3 for the contra-rotating electric helicopter is applied judiciously to moderate the effects of vibration and stress, while achieving greater rotor efficiency than possible with a single-rotor helicopter of the same diameter.

We now turn our attention to the third case of creating a fixed fuselage frame of reference, cited earlier. Consider a variant to the embodiment depicted in FIGS. 30A and 30B, replacing the V-tail 21408 with a single vertical tail, and an electric motor to articulate said tail about the fore-to-aft axis of the connecting shaft. During hover, the rotor system produces an average induced velocity of 10 mph, increasing with radial position. At the location of the stabilizing tail, the velocity of the vertical column of air reaches 14 mph. In a hovering state without wind, there is negligible flow of air over a vertically-disposed tail in the horizontal plane. However, when the tail is articulated to a positon other than vertical, the flow of air can apply sufficient force to rotate the fuselage in azimuth. The concept of using downdraft on a tiltable tail for yaw control is not new. In fact, it was first disclosed by Nolan, resulting in the issuance of U.S. Pat. No. 5,791,592, on Aug. 11, 1998. As applied to the novel contra-rotating electric helicopter, it provides a simple means to control the azimuthal orientation of the fuselage while in hover.

Figure 31A:
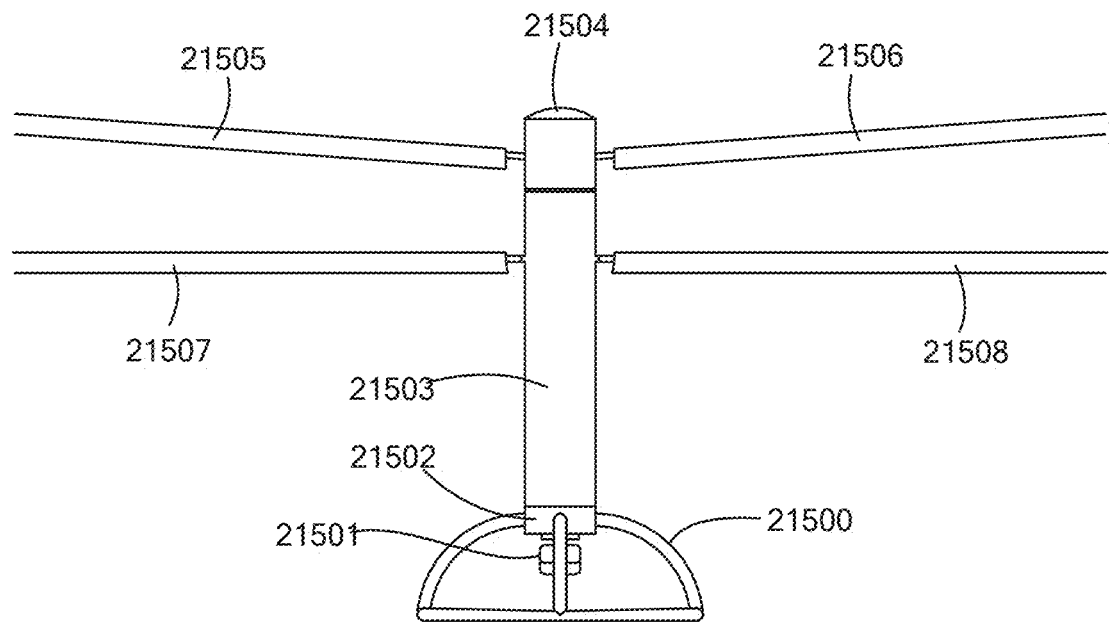
FIGS. 31A and 31B are side and isometric views respectively of an exemplary contra-rotating electric helicopter with electric gimbal motor (establishing a stationary camera platform), and landing base, in accordance with an embodiment of the present invention.
Figure 31B:
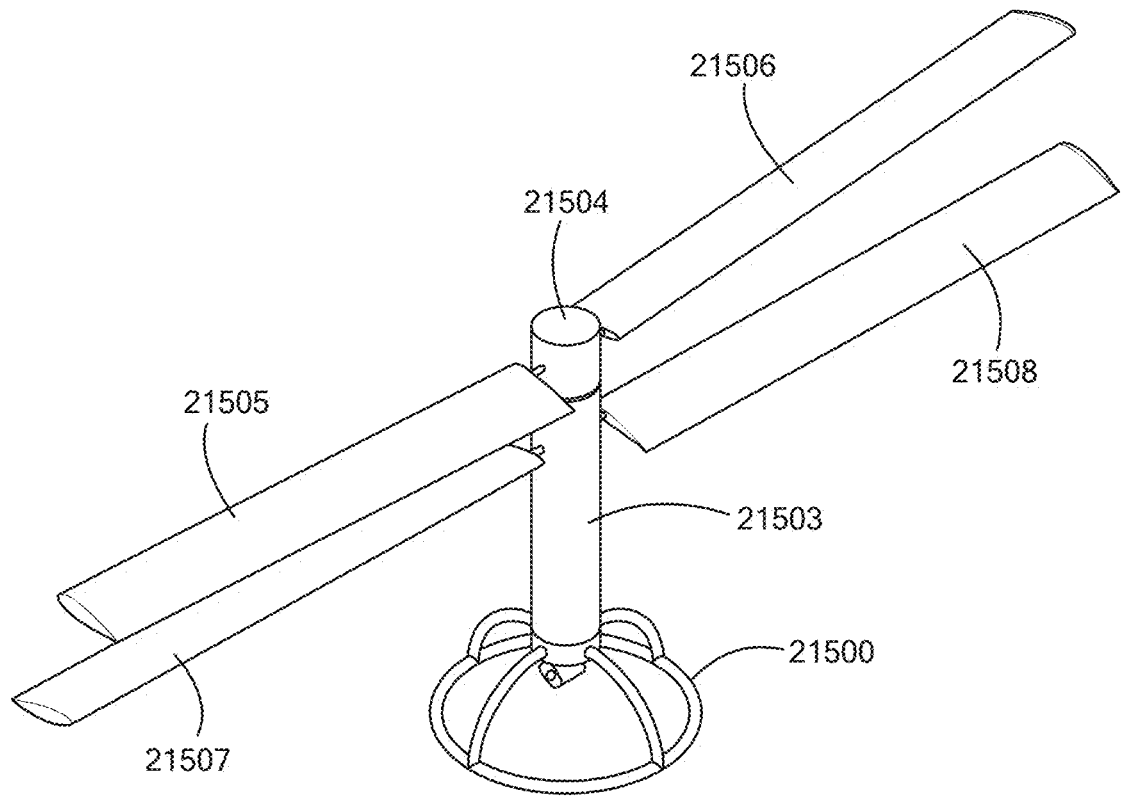

FIGS. 31A and 31B are side and isometric views, respectively, of an exemplary contra-rotating electric helicopter with electric gimbal motor (establishing a stationary camera platform), and landing base, in accordance with an embodiment of the present invention. Here we consider a fourth architecture to achieve a fixed fuselage frame of reference for the contra-rotating electric helicopter. The depicted embodiment includes an upper rotor hub 21504, with rotor blades 21505 and 21506. The lower rotor section 21503 is coupled with rotor blades 21507 and 21508. In this instance, the exemplary embodiment resembles the embodiment of FIGS. 23A and 23B, though now including a base frame 21500 with base hub 21502, that serves as a landing gear, and a central mount for a surveillance camera 21501. The base hub 21502 is coupled to the lower rotor section 21503 through a gimbal motor. The axis of rotation for the gimbal motor is coincident with the axes of rotation for the main drive motor and both rotors. Power is provided to the gimbal motor from a motor controller, which resides in the frame of reference of the lower rotor. As with prior embodiments, the lower rotor includes the battery power source and all electronics, avoiding the need to transfer power between rotating frames of reference. The flight control computer employs a magnetometer to serve as the primary sensor to synchronize cyclic control. Having a direct means to sense the azimuthal orientation of the lower rotor section 21503, the magnetometer also informs the flight control computer how to rotate the gimbal motor such that the base hub 21502 maintains a desired heading. The gimbal motor position relative to the lower rotor section 21503 is informed through the inclusion of an absolute rotary encoder. Under autonomous control or from a ground-based pilot, the base hub 21502, including the camera 21501, is rotated to an arbitrary position on the azimuth, allowing photography over 360 degrees of perspective. For the illustrious embodiment, the gimbal motor is a CubeMars G30. This BLDC motor offers very high torque-to-weight performance, while integrating both the motor driver and absolute encoder within an 83 gram package. As with the geared drive motor described in the earlier embodiment, control of the CubeMars G30 occurs over a CAN-bus interface, simplifying the overall electrical design of the exemplary embodiment. Various related embodiments include a fuselage of large or small size and a gimbal motor to actively position that fuselage below the novel contra-rotating electric helicopter. Some such embodiments include a fuselage large enough to carry human passengers.

The fifth architecture to create a stationary frame of reference is another variant of the embodiment illustrated in FIGS. 30A and 30B. Augmenting the role of the V-tail 21408, the fuselage central section 21407 now includes a gimbal motor/generator, mechanically coupled to the rotary connection to the central cylinder 21406, and electrically coupled with the auxiliary battery system in the fuselage central section 21407. Rather than acting as a passive swivel interface, the gimbal motor/generator allows for the fuselage frame to induce or extract torque from the rotating central cylinder 21406. During hovering conditions without wind, when there is little or no horizontal airflow over V-tail 21408, the fuselage frame of reference will have a tendency to wander in azimuth, without substantial torque acting on the mass suspended from the swivel interface. However, many applications of the contra-rotating electric helicopter require the pilot 21400 to control the heading azimuth while in hover. With the inclusion of a gimbal motor/generator, torque can be induced or extracted, operating at an angular rate that is slightly greater or less than the angular rate of the central cylinder 21406. Such torque translates through the entire fuselage frame, coupled to the base of the gimbal motor/generator, causing the fuselage to yaw either counterclockwise (induced torque) or clockwise (extracted torque). When torque is induced from the fuselage frame to the rotating central cylinder 21406 frame, the gimbal motor/generator is acting as a motor, extracting power from the auxiliary battery system in the fuselage central section 21407. When torque is extracted from the rotating central cylinder 21406 frame, the gimbal motor/generator is acting as a generator, transferring electrical energy into the auxiliary battery system in the fuselage central section 21407.

Once the exemplary contra-rotating electric helicopter transitions to forward flight, the role of the gimbal motor/generator changes. For a given direction of travel, the fuselage will naturally align itself with the V-tail 21408 in the downwind direction, like the tail on a weathervane. There may be instances when the pilot 21400 wishes to fly with the fuselage facing sideways. However, the aerodynamic force exerted on V-tail 21408 will be great enough to overwhelm the available torque of the gimbal motor/generator, preventing the pilot from turning more than 10 degrees or so from the direction of travel. For this exemplary embodiment, the overwhelming torque produced by the V-tail 21408 in cruising flight is used for advantage. To the extent that the auxiliary battery system in the fuselage central section 21407 is not fully charged, the gimbal motor/generator can extract torque from the rotating central cylinder 21406, generating electrical power to recharge the auxiliary battery system. During this period, the fuselage frame will not rotate in a clockwise direction, because the V-tail 21408 creates an anchoring effect. As soon as the gimbal motor/generator begins to extract torque from the clockwise rotating central cylinder 1406, the fuselage will begin to yaw in a clockwise direction. As the V-tail 21408 angle of attack increases with respect to the airflow, the torque induced by the V-tail 21408 upon the fuselage frame increases, to the limit of the stall angle of the airfoil chosen. Once the torque from the V-tail 21408 reaches the value of the torque extracted from the rotating central cylinder 21406, a trimmed state of flight will be reached, with the heading of the fuselage somewhat offset clockwise from the direction of the incoming air. Recognizing that the increased drag on V-tail 21408 extracts additional energy from the primary battery modules in central cylinder 21406, the process described effectively transfers power from the primary battery module in the central cylinder 21406, to the auxiliary battery system servicing the fuselage frame, contained in fuselage central section 21407. The advantage of this approach is the ability to charge only the primary battery modules in central cylinder 21406 during ground operations, and eliminating the need for slip rings or a rotary transformer to transfer electrical power during flight.

What is claimed is:

1. A rotor system for a contra-rotating rotorcraft comprising:
 a rotor hub coupled to an electric drive motor, a first set of rotor blades, and a second set of rotor blades;
 a cyclic pitch adjustment mechanism coupled to the first set of rotor blades and configured to cause adjustment of the cyclic pitch of the first set of rotor blades;
 a torque activated biasing mechanism configured to cause mechanical adjustment of a collective pitch of the second set of rotor blades based on a function of a torque applied to the rotor hub by the electric drive motor; wherein the function has a threshold torque such that when the applied torque is greater than the threshold torque adjustment of the collective pitch of the second set of rotor blades occurs.

2. The rotor system according to claim 1, wherein the threshold torque is based on a required torque to drive the second set of blades at a specific rotations per minute.

3. The rotor system according to claim 2, wherein the specific rotations per minute is the rotations per minute average during forward flight.

4. The rotor system according to claim 1, wherein the function has an upper threshold such that when the applied torque is at the upper threshold an increase of the applied torque will not cause adjustment of the collective pitch of the second set of rotor blades.

5. The rotor system according to claim 1, wherein the function is non-linear.

6. The rotor system according to claim 5, wherein the function is designed such that the increase in pitch causes an increase in thrust proportional to the applied torque raised to the two thirds power.

7. The rotor system according to claim 1, wherein the torque activated mechanism is a torsion spring.

8. The rotor system according to claim 1, further comprising a set of linkages configured to articulate a set of blade mount stems to cause the mechanical adjustment of the collective pitch of the second set of blades.

9. The rotor system according to claim 1, further comprising an electric pitch motor configured to drive the cyclic pitch adjustment mechanism.

10. The rotor system according to claim 9, further comprising a cyclic control computer, configured to cause the cyclic pitch adjustment of the first set of rotor blades.

11. A method of operating a contra-rotating rotorcraft having a rotor hub coupled to an electric drive motor, a first set of rotor blades, and a second set of rotor blades, the method comprising:
 adjusting a cyclic pitch of the first set of rotor blades to cause an adjustment of the attitude of the rotorcraft;
 causing, by a torque activated biasing mechanism, a mechanical adjustment of a collective pitch of the second set of rotor blades based on a function of a torque applied to the rotor hub by the electric drive motor, wherein the function has a threshold torque such that when the applied torque is greater than the threshold torque, adjustment of the collective pitch of the second set of rotor blades occurs.

12. The method according to claim 11, wherein the threshold torque is based on a required torque to drive the second set of blades at a specific rotations per minute.

13. The method according to claim 12, wherein the specific rotations per minute is the rotations per minute average during forward flight.

14. The method according to claim 11, wherein the function has an upper threshold such that when the applied torque is at the upper threshold an increase of the applied torque will not cause adjustment of the collective pitch of the second set of rotor blades.

15. The method according to claim 11, wherein the function is non-linear.

16. The method according to claim 15, wherein the function is designed such that the increase in pitch causes an increase in thrust proportional to the applied torque raised to the two thirds power.

17. The method according to claim 11, wherein the torque activated mechanism is a torsion spring.

18. The method according to claim 11, further comprising a set of linkages configured to articulate a set of blade mount stems to cause the mechanical adjustment of the collective pitch of the second set of blades.

19. The method according to claim 11, wherein adjusting the cyclic pitch of the first set of rotor blades comprising operating an electric pitch motor to drive the cyclic pitch adjustment mechanism.

20. The method according to claim 19, wherein adjusting the cyclic pitch of the first set of rotor blades further comprises controlling, by a cyclic control computer, the electric pitch motor.

\* \* \* \* \*